US010829259B2

(12) United States Patent
Nehus et al.

(10) Patent No.: US 10,829,259 B2
(45) Date of Patent: Nov. 10, 2020

(54) DEVICE AND METHOD FOR DISPENSING PRODUCT FROM A FLEXIBLE PACKAGE

(71) Applicant: MARS, INCORPORATED, McLean, VA (US)

(72) Inventors: Uwe Nehus, Verden (DE); Stefan Eberhardt, Verden (DE); Davide Ronchi, Carnago (IT)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 16/498,841

(22) PCT Filed: Mar. 29, 2018

(86) PCT No.: PCT/US2018/025205
§ 371 (c)(1),
(2) Date: Sep. 27, 2019

(87) PCT Pub. No.: WO2018/183719
PCT Pub. Date: Oct. 4, 2018

(65) Prior Publication Data
US 2020/0115092 A1    Apr. 16, 2020

(30) Foreign Application Priority Data

Mar. 29, 2017   (GB) .................................. 1705025.3
Mar. 29, 2017   (GB) .................................. 1705031.1
(Continued)

(51) Int. Cl.
B65B 69/00      (2006.01)
A01K 5/01       (2006.01)
(Continued)

(52) U.S. Cl.
CPC .......... *B65B 69/005* (2013.01); *A01K 5/0114* (2013.01); *A01K 5/0275* (2013.01);
(Continued)

(58) Field of Classification Search
CPC . B65B 69/0005; B65B 57/04; B65B 69/0008; A01K 5/0114; A01K 5/0275; B65D 35/285
(Continued)

(56) References Cited

U.S. PATENT DOCUMENTS 1,784,752 A * 12/1930 Ries ..................... B65D 35/285
                                                      222/102
1,793,787 A *  2/1931 Ertola ................. B65D 35/285
                                                      222/102
(Continued)

FOREIGN PATENT DOCUMENTS

AU      2015100162      3/2015
CN      202697446 U     1/2013
(Continued)

Primary Examiner — Patrick M. Buechner
Assistant Examiner — Michael J. Melaragno
(74) Attorney, Agent, or Firm — Baker Botts L.L.P.

(57) ABSTRACT

Dispensing devices and methods are provided. A dispensing device comprises an opening defining an insertion path extending through an internal chamber thereof, two fragmentation rollers aligned with each other within the internal chamber, with the insertion path extending therebetween, a sensor configured to sense the package within the insertion path, a first securing device having opposing surfaces configured to secure the package within the insertion path, a second securing device having opposing surfaces configured to secure the package within the insertion path, a cam operatively connecting the first and second securing devices, and an opener configured to provide an opening in the package to allow the product to leave the package. A method
(Continued)

US 10,829,259 B2

Page 2 of dispensing a product from a flexible package is also provided.

23 Claims, 31 Drawing Sheets

(30) Foreign Application Priority Data

| Mar. 29, 2017 | (GB) | ................................. | 1705032.9 |
| Mar. 29, 2017 | (GB) | ................................. | 1705033.7 |
| Mar. 29, 2017 | (GB) | ................................. | 1705035.2 |
| Mar. 29, 2017 | (GB) | ................................. | 1705043.6 |

(51) Int. Cl.
  *A01K 5/02* (2006.01)
  *B65B 57/04* (2006.01)
  *B65D 35/28* (2006.01)

(52) U.S. Cl.
  CPC .......... *B65B 57/04* (2013.01); *B65B 69/0008* (2013.01); *B65D 35/285* (2013.01)

(58) Field of Classification Search
  USPC ........................................ 222/101, 102, 103
  See application file for complete search history.

(56) References Cited

U.S. PATENT DOCUMENTS

| 1,841,275 | A | * | 1/1932 | Baptiste | ............... | B65D 35/285 |
| | | | | | | 222/96 |
| 1,859,174 | A | | 5/1932 | Sassano et al. | | |
| 1,989,713 | A | * | 2/1935 | Smith | ................... | B65D 35/285 |
| | | | | | | 222/96 |
| 2,306,426 | A | * | 12/1942 | Bundy | ................ | B65B 69/0008 |
| | | | | | | 414/412 |
| 2,496,004 | A | | 1/1950 | Pierce et al. | | |
| 2,567,767 | A | | 9/1951 | Ditmanson et al. | | |
| 2,571,781 | A | * | 10/1951 | Sutch | ................... | B65B 69/0008 |
| | | | | | | 414/412 |
| 2,576,492 | A | * | 11/1951 | Vogel | ................... | B65B 69/0008 |
| | | | | | | 30/296.1 |
| 2,780,390 | A | * | 2/1957 | Holland | ................. | B65D 35/28 |
| | | | | | | 222/103 |
| 3,297,205 | A | | 1/1967 | Sumner et al. | | |
| 3,467,267 | A | * | 9/1969 | Van Elten | ........... | B65B 69/0008 |
| | | | | | | 414/412 |
| 3,667,373 | A | | 6/1972 | Sicher et al. | | |
| 3,993,220 | A | * | 11/1976 | Troy | ..................... | B65B 69/005 |
| | | | | | | 222/82 |
| 4,008,657 | A | | 2/1977 | Yamamura et al. | | |
| 4,034,715 | A | | 7/1977 | Arner | | |
| 4,034,877 | A | * | 7/1977 | Bennison | ............ | B65B 69/0008 |
| | | | | | | 414/412 |
| 4,077,360 | A | | 3/1978 | Figlia | | |
| 4,181,097 | A | | 1/1980 | Betsuno | | |
| 4,401,056 | A | | 8/1983 | Cody et al. | | |
| 4,532,892 | A | | 8/1985 | Kuzara | | |
| 4,574,982 | A | | 3/1986 | Dehart et al. | | |
| 4,627,781 | A | * | 12/1986 | Borgner | .............. | B65B 69/0008 |
| | | | | | | 414/412 |
| 4,706,849 | A | | 11/1987 | Ryan | | |
| 4,899,911 | A | | 2/1990 | Rohde et al. | | |
| 4,961,508 | A | | 10/1990 | Weimer et al. | | |
| 5,000,350 | A | * | 3/1991 | Thomsen | ............... | B65D 35/28 |
| | | | | | | 222/103 |
| 5,016,572 | A | | 5/1991 | Weber et al. | | |
| 5,140,134 | A | | 8/1992 | Reusche et al. | | |
| 5,398,643 | A | | 3/1995 | McElrath et al. | | |
| 5,400,699 | A | | 3/1995 | Cailbault | | |
| 5,490,613 | A | | 2/1996 | Taylor et al. | | |
| 5,649,801 | A | * | 7/1997 | White | ................. | B65B 69/0008 |
| | | | | | | 414/412 |
| 5,762,463 | A | * | 6/1998 | Bielagus | ............. | B65B 69/0008 |
| | | | | | | 414/412 |
| 5,893,485 | A | | 4/1999 | McGill | | |
| 5,918,767 | A | | 7/1999 | McGill | | |
| 5,927,352 | A | * | 7/1999 | Wouters | ............... | B65B 69/0008 |
| | | | | | | 141/330 |
| 6,055,932 | A | | 5/2000 | Weber | | |
| 6,196,420 | B1 | * | 3/2001 | Gutierrez | ............. | B67D 1/0001 |
| | | | | | | 222/101 |
| 6,273,297 | B1 | * | 8/2001 | Schalow | ............... | B67D 7/0216 |
| | | | | | | 222/103 |
| 6,296,150 | B1 | * | 10/2001 | Farris | .................. | A61M 1/0078 |
| | | | | | | 222/102 |
| 6,358,546 | B1 | | 3/2002 | Bebiak et al. | | |
| 6,557,597 | B2 | | 5/2003 | Riesterer | | |
| 6,576,280 | B2 | | 6/2003 | Bebiak et al. | | |
| 6,662,971 | B1 | * | 12/2003 | Nguyen | ............... | B65D 35/285 |
| | | | | | | 222/101 |
| 6,705,818 | B2 | | 3/2004 | Sagaya et al. | | |
| 7,278,555 | B2 | | 10/2007 | McGill | | |
| 7,334,704 | B1 | * | 2/2008 | Bynum | ................ | B65D 35/285 |
| | | | | | | 222/101 |
| 7,669,735 | B1 | * | 3/2010 | Alleyne | ............... | B65D 35/285 |
| | | | | | | 222/102 |
| 7,720,567 | B2 | | 5/2010 | Dugat et al. | | |
| 7,878,108 | B2 | | 2/2011 | Mock et al. | | |
| 8,038,032 | B2 | | 10/2011 | Faller et al. | | |
| 8,100,084 | B1 | | 1/2012 | Abramson | | |
| 8,220,413 | B2 | | 7/2012 | Lard | | |
| 8,678,236 | B2 | * | 3/2014 | Burke | .................. | B67D 7/0216 |
| | | | | | | 222/101 |
| 9,192,142 | B2 | | 11/2015 | Jackson et al. | | |
| 9,232,769 | B1 | | 1/2016 | Wolf et al. | | |
| 9,668,609 | B2 | * | 6/2017 | Herbert | ................ | B67D 1/0043 |
| 9,717,264 | B2 | * | 8/2017 | Herbert | ................ | B01F 15/0205 |
| 10,017,371 | B2 | * | 7/2018 | Vulpitta | ................. | B67D 1/108 |
| 10,420,355 | B2 | * | 9/2019 | Vulpitta | .................... | A23G 9/28 |
| 2003/0015144 | A1 | | 1/2003 | Bennett et al. | | |
| 2003/0026875 | A1 | | 2/2003 | Aguilar et al. | | |
| 2003/0026876 | A1 | | 2/2003 | Albuja et al. | | |
| 2003/0192480 | A1 | | 10/2003 | Bennett | | |
| 2004/0115317 | A1 | | 6/2004 | Doglioni | | |
| 2006/0213922 | A1 | | 9/2006 | Lodter et al. | | |
| 2006/0255065 | A1 | * | 11/2006 | Crosby | .................... | A47K 1/09 |
| | | | | | | 222/102 |
| 2006/0255066 | A1 | | 11/2006 | Kannar et al. | | |
| 2007/0029343 | A1 | * | 2/2007 | Sanfilippo | ............... | G01F 11/32 |
| | | | | | | 222/102 |
| 2008/0196668 | A1 | | 8/2008 | Clark et al. | | |
| 2008/0290117 | A1 | * | 11/2008 | Schroeder | ................ | A23G 9/28 |
| | | | | | | 222/95 |
| 2008/0314923 | A1 | * | 12/2008 | Faller | ..................... | G07F 13/00 |
| | | | | | | 222/101 |
| 2009/0302057 | A1 | * | 12/2009 | Matzel | .................... | B65D 35/40 |
| | | | | | | 222/102 |
| 2010/0299074 | A1 | | 11/2010 | Chang et al. | | |
| 2013/0247829 | A1 | | 9/2013 | Taneja et al. | | |
| 2014/0175124 | A1 | * | 6/2014 | Nathan | ................. | B65B 69/005 |
| | | | | | | 222/107 |
| 2014/0238305 | A1 | | 8/2014 | Wurth | | |
| 2015/0053138 | A1 | | 2/2015 | Ramsey et al. | | |
| 2015/0129611 | A1 | * | 5/2015 | Vulpitta | .................... | A23G 9/28 |
| | | | | | | 222/101 |
| 2015/0250139 | A1 | | 9/2015 | Vatn | | |
| 2016/0114928 | A1 | * | 4/2016 | Eggersmann | ....... | B65B 69/0008 |
| | | | | | | 414/412 |
| 2016/0192620 | A1 | | 7/2016 | Hu et al. | | |
| 2017/0113844 | A1 | * | 4/2017 | Vaughan | ................ | B65B 3/12 |
| 2017/0280745 | A1 | * | 10/2017 | Herbert | ............... | B01F 15/0237 |
| 2018/0099772 | A1 | * | 4/2018 | Lee | .......... | B26B 11/00 |

FOREIGN PATENT DOCUMENTS

| CN | 203486232 U | 3/2014 |
| CN | 204393067 | 6/2015 |
| CN | 106475396 A | 3/2017 |
| DE | 1223765 B | 8/1966 |

(56) References Cited

FOREIGN PATENT DOCUMENTS

| | | |
|---|---|---|
| DE | 2539529 A1 | 3/1977 |
| EP | 819921 | 1/1998 |
| EP | 1462375 A1 | 9/2004 |
| EP | 2466558 | 6/2012 |
| FR | 2629810 | 10/1989 |
| GB | 1315853 A | 5/1973 |
| GB | 2258986 | 3/1993 |
| JP | 03002493 | 1/1991 |
| JP | H03214296 | 9/1991 |
| JP | H1035628 | 2/1998 |
| JP | H10338249 | 12/1998 |
| JP | H1191746 | 4/1999 |
| JP | 2001002089 A | 1/2001 |
| JP | 2001122231 A | 5/2001 |
| JP | 3325860 | 9/2002 |
| JP | 2004244089 | 9/2004 |
| KR | 1012880120000 | 7/2013 |
| KR | 201400469 | 1/2014 |
| MX | 2010007516 A | 1/2012 |
| RU | 835409 | 6/1981 |
| RU | 928125 | 5/1982 |
| RU | 1219465 | 3/1986 |
| WO | 0213601 | 2/2002 |
| WO | 2013130546 | 9/2013 |
| WO | 2013134275 | 9/2013 |
| WO | 2013157939 A1 | 10/2013 |
| WO | 2015176994 | 11/2015 |

\* cited by examiner

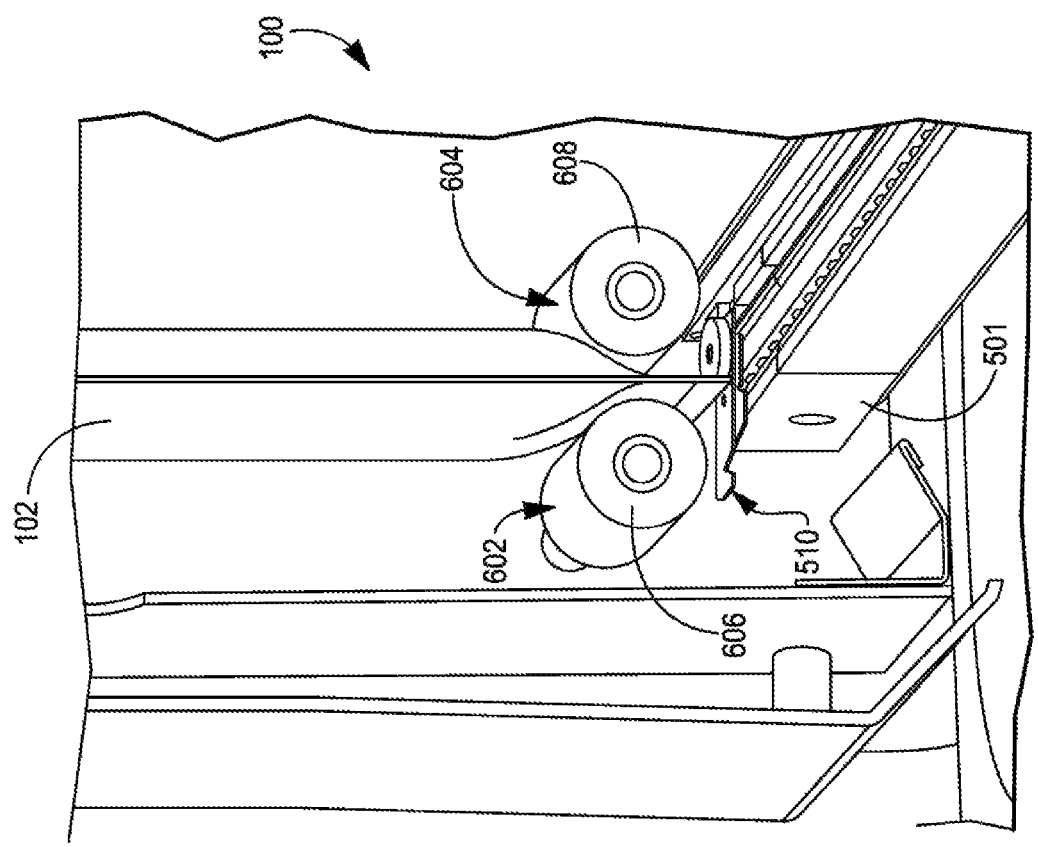
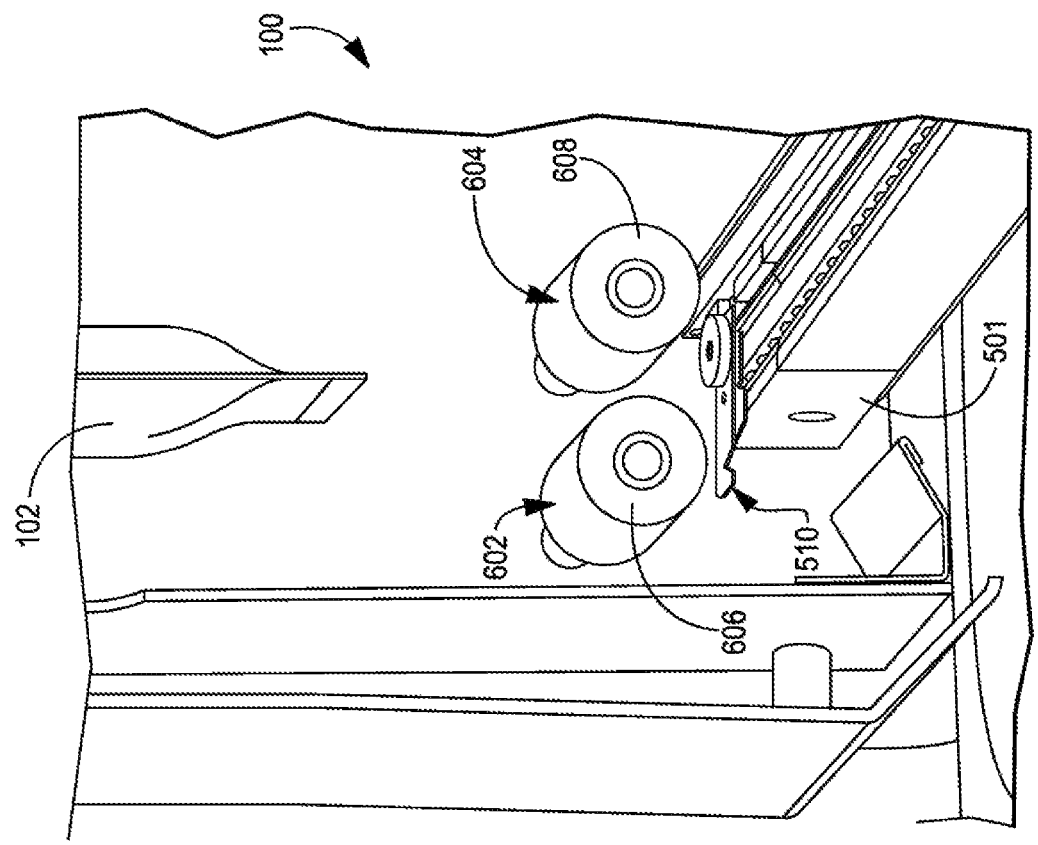

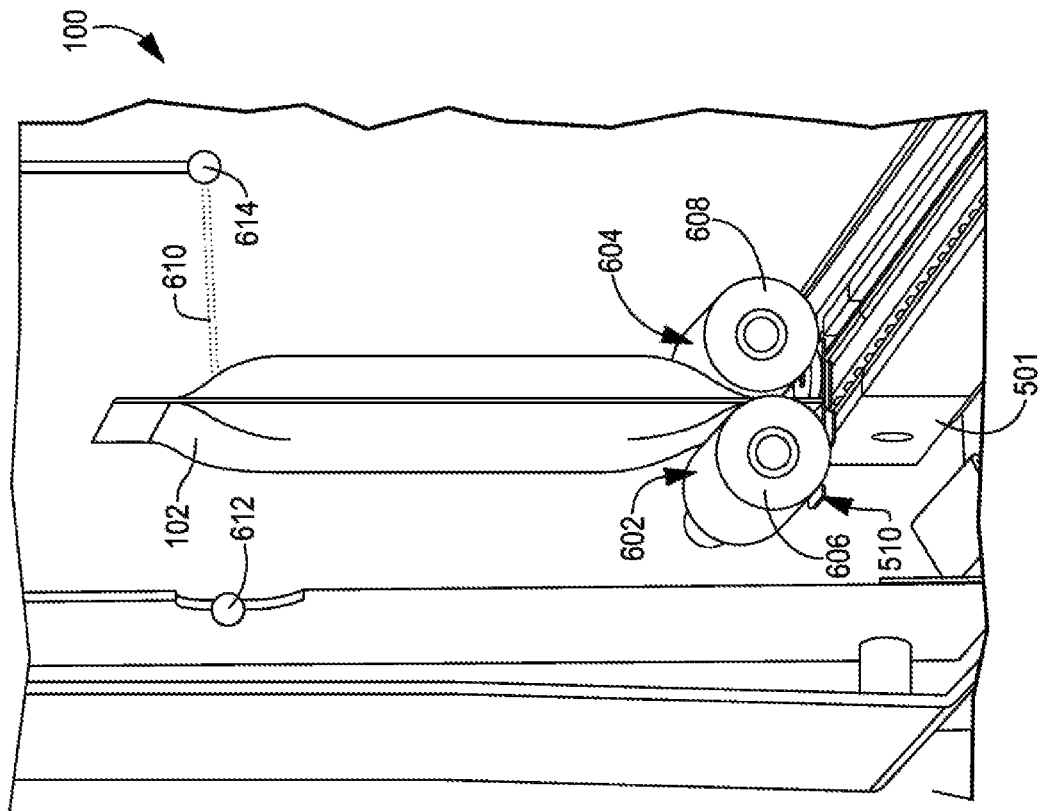
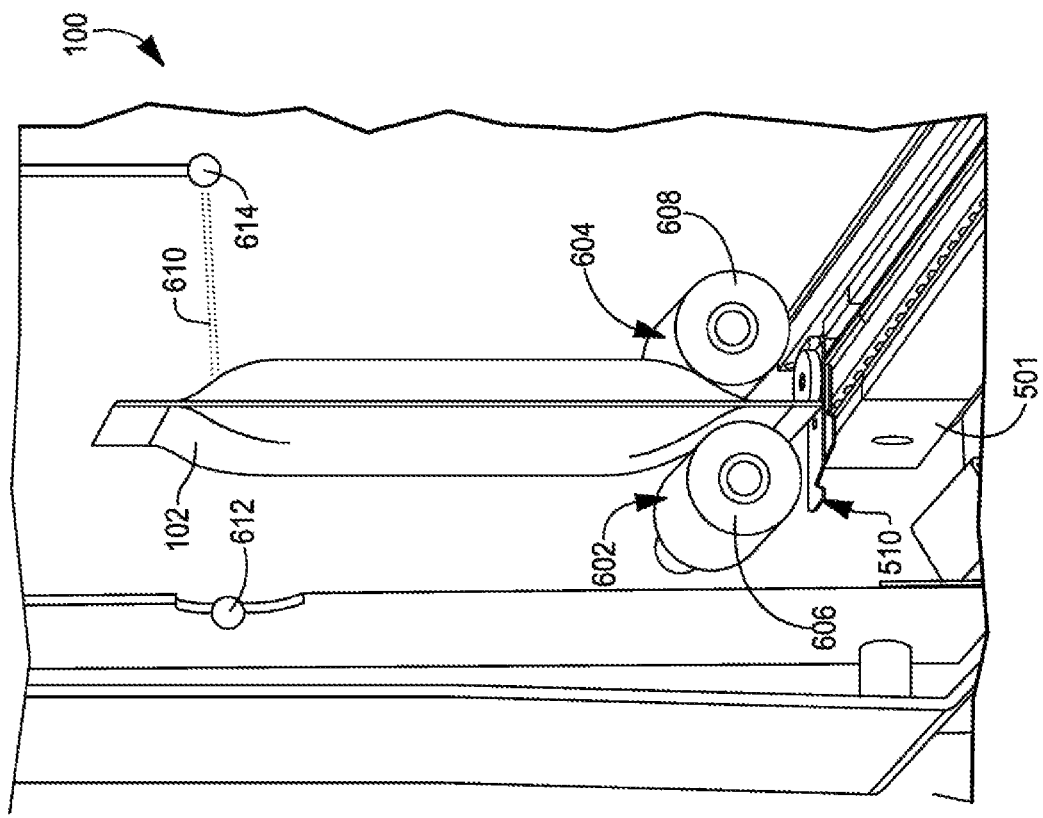

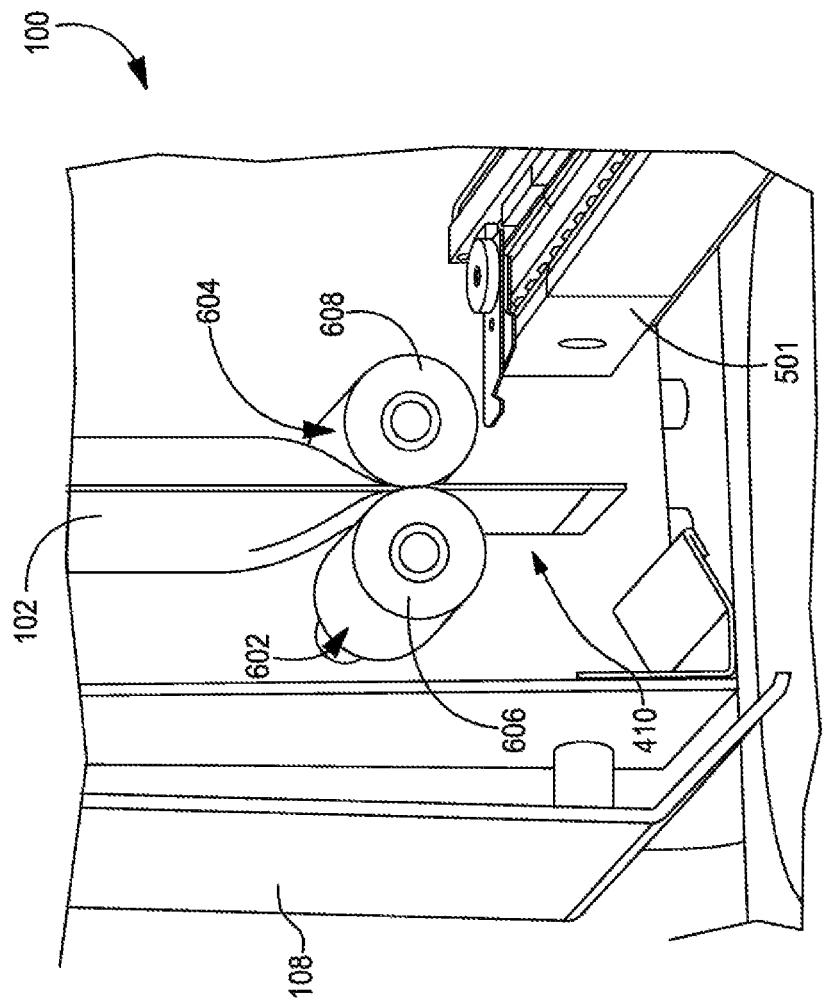
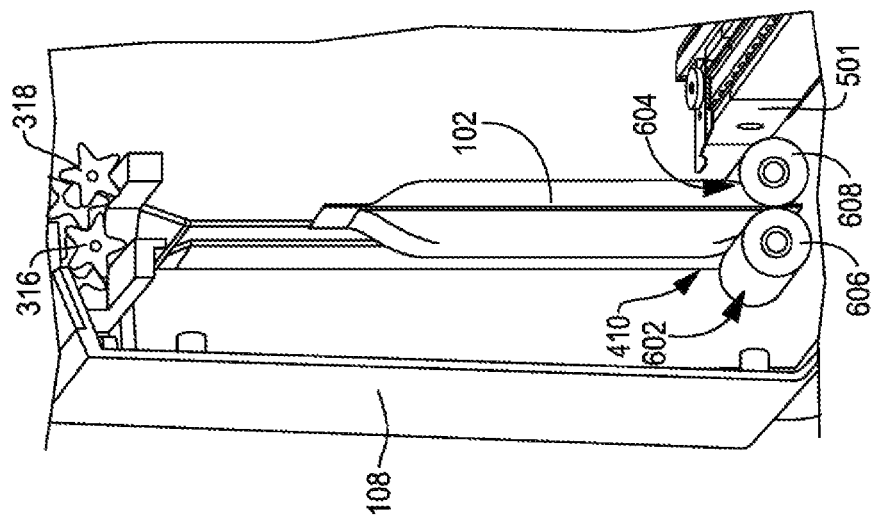
FIG. 8B
FIG. 8A

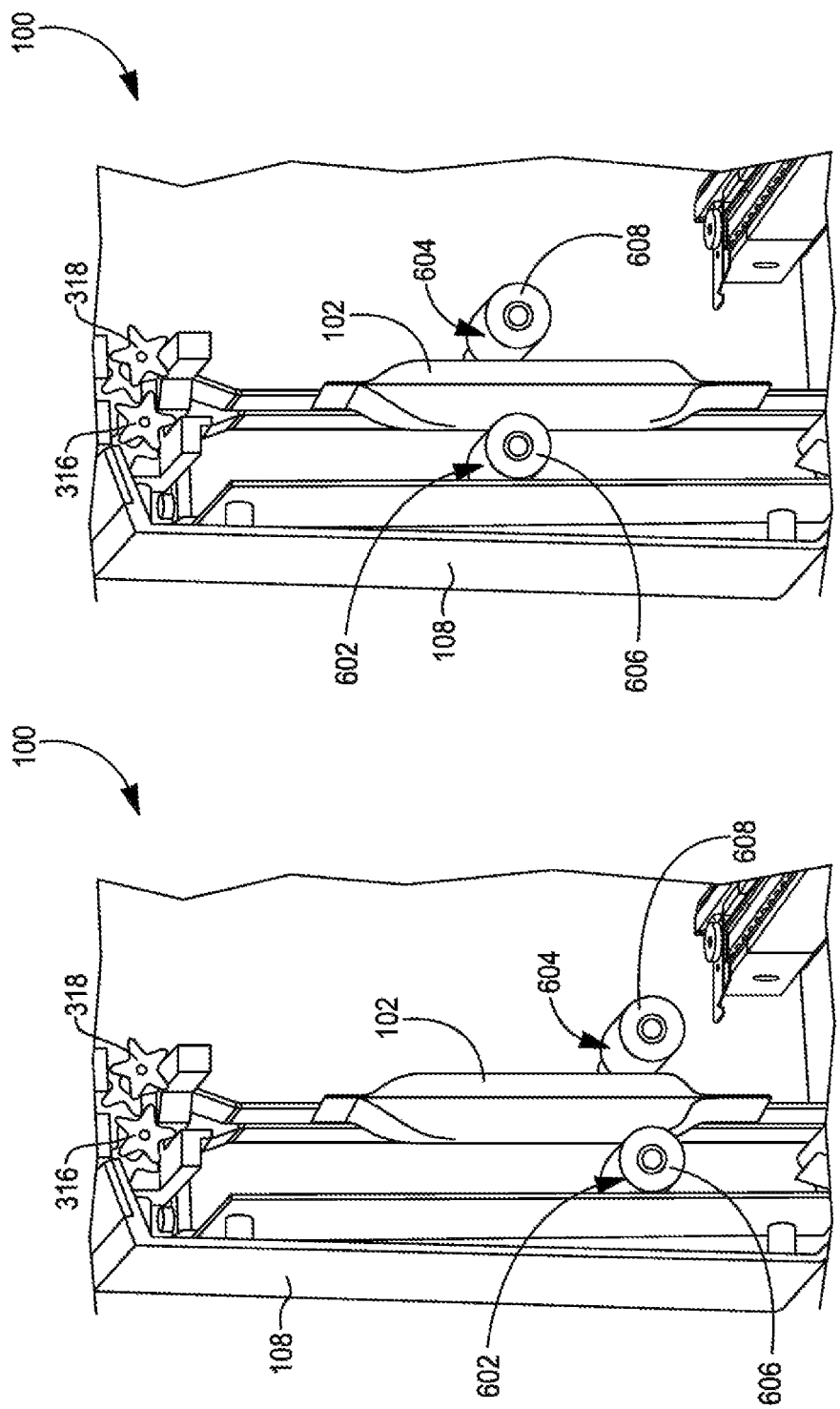

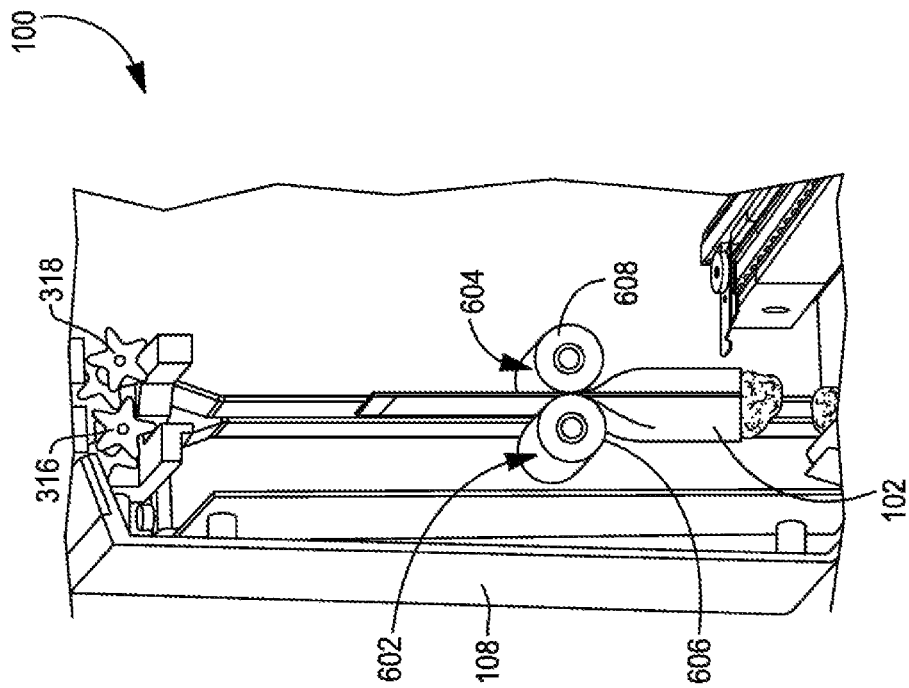
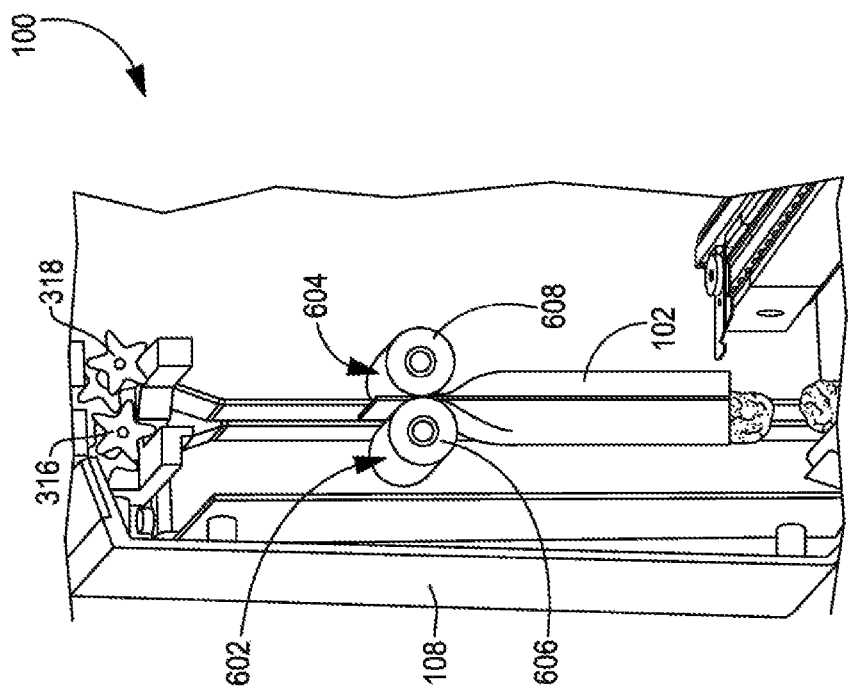
FIG. 12A
FIG. 12B

DEVICE AND METHOD FOR DISPENSING PRODUCT FROM A FLEXIBLE PACKAGE

CROSS-REFERENCE TO RELATED APPLICATIONS

This patent application is a U.S. National Stage Patent Application under 35 U.S.C. § 371 of International Application No. PCT/US2018/025205, filed on Mar. 29, 2018, which claims priority to each of UK Patent Application Numbers GB1705032.9, GB1705035.2; GB1705043.6; GB1705025.3; GB1705031.1; and GB1705033.7, which were all filed on Mar. 29, 2017, the contents of which are hereby incorporated by reference in their entirety, and to which priority is claimed.

BACKGROUND

Flexible packages, such as pouches, are commonly used to hold human and animal food as well as other products. The product contained in such a package can be a "dry" product, or a "wet" product. Dry product is typically relatively hard and brittle, often comprising numerous small pieces and/or powder. Wet product can range from pure liquid (e.g., water) to a more viscous (e.g., gelatinous) substance. Often times, wet viscous product can include solid chunks suspended in a viscous liquid.

Such flexible packages are easy and economical to manufacture; however, they are not without drawbacks in use. In particular, consumers are perennially displeased if it is difficult to remove all of the product from the flexible package, as can happen with viscous or sticky products. Some consumers may find direct contact with food products distasteful, or unsanitary. Furthermore, flexible packages can be difficult to open and the material being removed therefrom can be difficult to place and so, removing product from flexible packages can be messy, which is a further source of consumer frustration.

Devices that assist in the removal of a food product from a pouch are known, but for a variety of reasons are suboptimal and do not address certain needs in the art. For example, some such devices may not include a means to open the package, instead relying on the induced failure of the package to provide an opening, e.g., as by applying force to a weakened area or seam. Such devices are reliant on the consistent manufacture of the packages on which they are intended to operate, and may not function consistently. Further, openings so provided may not be regularly sized, shaped and or placed and as a result, product dispensed from a package in this manner may not be placed accurately. Misdirected product can be deposited within the dispenser, requiring excessive maintenance and cleaning.

Devices that provide an opening means tend to lack reproducibility and control over where the opening is made within the package, which can also result in inaccurate placement and/or food deposition within the dispenser. Or, once an opening is so provided, lack the ability to efficiently remove substantially all of the product from the package. Inaccurate placement and/or incomplete dispensation can also be an issue when conventional dispensing devices are used to dispense multi-textured products, such as food products that comprise solid portions or chunks within a gravy, jelly, sauce or soup base. Such products may tend to congeal into a solid mass upon storage, and when dispensed, can remain substantially in the shape or size of the package. This is not only unappealing from the perspective of the user of the dispensing device and/or consumer of the food dispensed, but again can result in inaccurate placement and/or debris within the dispensing device. Finally, many conventional food dispensation devices do not provide for the efficient removal of emptied packages, or parts thereof, a place to store packages prior to use, or the ability to manage the temperature of the products once dispensed.

There is thus a desire for a device that can perform the task of removing product from a flexible package. In particular, there is a need for a dispensing device and methods that dispense a pet food product contained therein cleanly and completely, i.e., leaving very little product or residue in the package or dispensing device. Provision of an efficient means for cleaning and maintenance of the device, as well as easy and efficient means by which to remove emptied packages would provide further benefit.

BRIEF DESCRIPTION

Dispensing devices and methods providing such advantages are provided herein. The dispensing devices and methods described provide for the efficient and accurate dispensation of food products packaged in flexible packaging. Use of the devices and methods results in the accurate placement of the food product, in some embodiments into a provided serving receptacle, with minimal, or substantially no, food product being misdirected into the interior of the dispensing device. Temperature control may be provided in conjunction with a serving area or receptacle, thereby providing added functionality to the dispensing device. And, warming a dispensed food product prior to serving may enhance the palatability thereof. An opener is provided to create openings in food packages and may be controlled by a sensor to accurately position and place an opening in the package, and/or retract the opener when not in use for safety and cleanliness purposes. Such a sensor can also operate to sense the position of a package, thereby controlling the position of the opening.

In one aspect, a dispensing device is provided. The dispensing device comprises an opening accessing an internal chamber thereof, opposing surfaces configured to compressively contact a package inserted into the internal chamber of the dispensing device while moving across the package in at least two directions; and an opener configured to create an opening in the package. A method for dispensing product from a flexible package is also provided. The method comprises holding the package in a dispensing device in an orientation such that a longitudinal axis of the package is approximately vertical; compressing a portion of the package between two opposing surfaces, wherein the portion includes a portion at or below a lower edge of the package, wherein at least one of the two opposing surfaces comprises a roller; rolling the roller upwards along the package while pressing the roller against the opposing surface to move product away from the lower edge of the flexible package; maintaining compression on the flexible package to hold the product away from the lower edge of the flexible package; cutting off a lower portion of the package above the lower edge of the package to create an opening into package; and compressing package to dispense product from the package through the opening.

In a second aspect, a dispensing device is provided comprising a stop movable between a position within an insertion path of the device and a position outside of the insertion path; at least one sensor configured to sense a package within the insertion path; and one or more securing devices configured to move or hold a package within the insertion path in response to communication of information sensed by the at least one sensor. A method for dispensing product from a flexible package using the dispensing device is also provided.

In a third aspect, a dispensing device is provided comprising a first clamp having a first pair of opposing surfaces; a second clamp having a second pair of opposing surfaces, the second pair of opposing surfaces disposed in parallel with the first pair of opposing surfaces; and at least one cam mechanically connected to the first and second clamps. A method for dispensing a product from a flexible package is also provided. The method comprises engaging one longitudinal seal of the flexible package with a first clamp and engaging a second longitudinal seal of the flexible package with a second clamp; and compressing an enclosed space of the flexible package, the enclosed space enclosing a product, between a pair of opposing surfaces in between the first and second clamps.

In a fourth aspect, a dispensing device is provided and comprises an opening defining a beginning of an insertion path extending through an internal chamber thereof; at least two fragmentation rollers disposed on opposite sides of the insertion path and configured to contact a package in the insertion path, wherein at least one of the fragmentation rollers comprises projections that extend radially from an axis of the fragmentation roller; and an opener configured to provide an opening in a package after the package has been contacted by the at least two fragmentation rollers. A method for dispensing a product from a flexible package is also provided. The method comprises passing the flexible package between at least two fragmentation rollers, at least one of the fragmentation rollers comprising projections that extend radially from an axis of the fragmentation roller; and opening the package.

In a fifth aspect, a dispensing device is provided. The dispensing device comprises at least one securing member configured to hold a flexible package in an upright orientation without engaging a lower opening region thereof; and an opener configured to bend the lower opening region of the flexible package out of a vertical plane defined by the flexible package, and further configured to cut off a distal portion of the opening region of the flexible package. A method for dispensing a product from a flexible package is also provided. The method comprises securing the flexible package in a vertical plane; bending an edge portion of the flexible package out of the vertical plane; and cutting the bent edge portion while outside the vertical plane of the flexible package.

In a sixth aspect, a dispensing device is provided. The dispensing device comprises a dispensing mechanism; and a dispensing surface configured to impart heat to a serving receptacle operatively disposed relative thereto wherein the dispensing mechanism is configured to dispense a product into the dispensing surface. A method for dispensing a product from a flexible package using the dispenser is also provided.

The presently disclosed subject matter discloses a dispensing device comprising an opening accessing an insertion path thereof, two opposing surfaces configured to compress a flexible package inserted into the insertion path while moving across the flexible package in two directions, and an opener configured to bend an opening region of the package out of a plane defined by the flexible package and further configured to cut a distal portion of an opening region of the flexible package. In certain embodiments, the two directions comprise a direction away from an opening region of the flexible package and a direction toward the opening region of the flexible package. In certain embodiments, the dispensing device further comprises a dispensing surface in the plane defined by the flexible package, configured to impart heat to a serving receptacle. In certain embodiments, the dispensing surface is moveable between a first dispensing position and a second feeding position. In certain embodiments, the dispensing device can further comprise a processing unit configured to heat and move the dispensing surface. In certain embodiments, the dispensing surface comprises a ferromagnetic material, or an inductive heating element.

In certain embodiments, at least one of the opposing surfaces is on a roller, or each of the opposing surfaces is on a roller. In certain embodiments, the rollers can be configured to simultaneously roll along opposite sides of the flexible package compressed therebetween. In certain embodiments, each roller comprises a pin extending outward from opposite ends of an axis of rotation of the roller, wherein each pin is moveably engaged between a set of rails including an outer track and an inner track connected at a junction within which each pin may move between the inner and outer track.

In certain embodiments, the opener can be configured remove at least a portion of the opening region of the flexible package. In certain embodiments, the opener comprises a blade, a laser, an air knife, or a combination thereof. In other embodiments, the opener comprises a blade and an opposing surface, the opposing surface oriented at an angle with respect to plane defined by the flexible package. In certain embodiments, the opposing surfaces are configured to maintain compressive contact with the package after moving in a direction away from an opening region of the flexible package. In certain embodiments, the compressive contact is configured to keep product out of the opening region, and occurs during opening of the package.

In certain embodiments, the internal chamber is configured to accept the package in an orientation such that a longitudinal axis of the package is vertical. In certain embodiments, the two directions comprise a vertically upward direction and a vertically downward direction, and the first and second surfaces are configured to temporarily maintain compressive contact after moving in the upward direction. In certain embodiments, the dispensing device further comprises a serving receptacle intersecting the vertical plane defined by the flexible package. In certain embodiments, the dispensing device further comprises a catch tray disposed out of the vertical plane defined by the package configured to catch the distal portion of the opening region of the package after cutting, wherein the maintenance of compressive contact is configured to occur during opening of the package. In certain embodiments, the dispensing device comprises a catch tray disposed out of the plane defined by the package configured to catch the distal portion of the opening region of the package after cutting.

In one embodiment, the dispensing device comprises a catch tray disposed out of the plane defined by the package configured to catch the distal portion of the opening region of the package after cutting, and further comprises a dispensing device intersecting the plane defined by the flexible package configured to impart heat to a serving receptacle, wherein the internal chamber is configured to accept the package in an orientation such that a longitudinal axis of the package is vertical, and wherein the two directions comprise a vertically upward direction and a vertically downward direction, and wherein the opposing surfaces are configured to maintain compressive contact with the package after moving the vertically upward direction, wherein the maintenance of compressive contact is configured to occur during opening of the package.

The presently disclosed subject matter also discloses methods of dispensing product. In certain embodiments, a method of dispensing product from a flexible package comprises inserting the flexible package into an insertion path within an internal chamber of a dispensing device, compressively contacting the flexible package between two opposing surfaces while moving across the flexible package in a first direction, bending an opening region of the package out of a plane defined by the flexible package, cutting a distal portion of an opening region of the flexible package, and compressively contacting the flexible package between the two opposing surfaces while moving across the flexible package in a second direction.

In certain embodiments of the method, the two directions comprise a direction away from an opening region of the flexible package and a direction toward the opening region of the flexible package. In certain embodiments, the method further comprises heating, by a dispensing surface, a serving receptacle in the plane defined by the flexible package, and dispensing the product into the serving receptacle. In certain embodiments, at least one of the opposing surfaces is on a roller. In certain embodiments, each of the opposing surfaces is on a roller, and the rollers simultaneously roll along opposite sides of the flexible package compressed therebetween.

In certain embodiments, the method further comprises removing at least a portion of the opening region of the flexible package. In certain embodiments, the opening step is performed by a blade, a laser, an air knife, or a combination of these. In certain embodiments, the opening step is performed by a blade and an opposing surface, the opposing surface oriented at an angle with respect to plane defined by the flexible package. In certain embodiments, the cutting step comprises moving a blade along an edge of the flexible package in a linear path. In certain embodiments, moving across the flexible package in the first direction begins at a lower edge of the flexible package. In certain embodiments, moving across the flexible package in the second direction pushes product out of the flexible package.

In certain embodiments, the method further comprises maintaining compressive contact with the package after moving in a direction away from an opening region of the flexible package. In certain embodiments, the temporary maintenance of compressive contact keeps the product out of the opening region during opening of the package. In certain embodiments, the method further comprises holding the flexible package such that the flexible package defines a vertical plane. In certain embodiments, the two directions comprise a vertically upward direction and a vertically downward direction and the first and second surfaces temporarily maintain compressive contact after moving in the upward direction. In certain embodiments, the method further comprises dispensing the product into a serving receptacle intersecting the vertical plane defined by the flexible package.

In certain embodiments, the method further comprises maintaining compressive contact after moving in a first direction and during opening, and catching, in a catch tray disposed out of the vertical plane defined by the package, the distal portion of the opening region of the package. In certain embodiments, the method comprises catching, in a catch tray disposed out of the vertical plane defined by the package, the distal portion of the opening region of the package.

In one embodiment, the method of dispensing product comprises holding the flexible package such that the flexible package defines a vertical plane; maintaining compressive contact with the package after moving in a direction away from an opening region of the flexible package; catching, in a catch tray disposed out of the vertical plane defined by the package, the distal portion of the opening region of the package, heating, by a dispensing surface, a serving receptacle in the plane defined by the flexible package; and dispensing the product into the serving receptacle.

The presently disclosed subject matter also discloses a dispensing device comprising an opening defining an insertion path extending through an internal chamber thereof, two fragmentation rollers aligned with each other within the internal chamber, with the insertion path extending therebetween, a sensor configured to sense the package within the insertion path, a first securing device having opposing surfaces configured to secure the package within the insertion path, a second securing device having opposing surfaces configured to secure the package within the insertion path, a cam operatively connecting the first and second securing devices, and an opener configured to provide an opening in the package to allow the product to leave the package.

In certain embodiments, the dispensing device further comprises a stop moveable between a first position within the insertion path and a second position out of the insertion path. In certain embodiments, the sensor comprises a light sensor. In certain embodiments, the dispensing device further comprises a processing device. In certain embodiments, the stop is configured to move between the first and second positions in response to communication generated by the sensor. In certain embodiments, the dispensing device further comprises a light emitter disposed such that light projects from the emitter, across the insertion path, and is received by the sensor.

In certain embodiments, the cam is configured to operate the first and second securing devices in response to a signal from the sensor. In certain embodiments, the first and second securing devices are configured to move the package within the insertion path. In certain embodiments, the insertion path is downward, and the first and second securing devices are configured to clamp the package at longitudinal sides. In certain embodiments, each of the fragmentation rollers comprises projections that extend radially from an axis thereof. In certain embodiments, the projections of the fragmentation rollers are misaligned. In other embodiments, the projections of the fragmentation rollers are aligned. In certain embodiments, the projections of the fragmentation rollers are star shaped. In certain embodiments, the fragmentation rollers are caused to rotate and drive the package into the insertion path. In other embodiments, the package imparts rotational motion to the fragmentation roller. In certain embodiments, each of the fragmentation rollers comprise projections that extend radially from an axis thereof.

In certain embodiments, the opener comprises a safety mechanism in communication with the sensor. In certain embodiments, the first securing device comprises a first clamp. In certain embodiments, the second securing device comprises a second clamp. In certain embodiments, the dispensing device further comprises a lever mechanically coupled to the first and second clamps. In certain embodiments, the first and second clamps are configured to engage a first and second longitudinal seals of the flexible package. In certain embodiments, the dispensing device further comprises a pair of rollers configured to progressively compress the package, with the progressive compression occurring in the area between the first and second clamps.

In one embodiment, the first and second securing devices are first and second clamps, and are configured to engage a first and second longitudinal seals of the flexible package in response to a signal from the sensor, and the insertion path is downward, and each of the fragmentation rollers comprises projections that extend radially from an axis thereof, and are misaligned with respect to each other, and the dispensing device further comprises a pair of rollers configured to progressively compress the package, with the progressive compression occurring in the area between the first and second clamps.

The presently disclosed subject matter also discloses a method of dispensing a product from a flexible package, comprising inserting the package into an insertion path within an internal chamber of a dispensing device; fragmenting, by two fragmentation rollers aligned with each other within the internal chamber, the product in the package; sensing, by a sensor in the dispensing device, the package within the insertion path; clamping, with first and second securing devices operatively connected by a cam, a first and second edge of the package; opening the package; and removing the product from the package.

In certain embodiments, the method further comprises stopping movement of the package along the insertion path, by a stop moveable between a first position within the insertion path and a second position out of the insertion path. In certain embodiments, the sensor comprises a light sensor. In certain embodiments, the method further includes processing, by a processing device. In certain embodiments the stop is moves between the first and second positions in response to communication generated by the sensor. In certain embodiments, the sensor senses light emitted by a light emitter disposed across the insertion path. In certain embodiments, the cam operates the first and second securing devices in response to a signal from the sensor.

In certain embodiments, first and second securing devices move the package within the insertion path. In certain embodiments, the insertion path is downward, and wherein the first and second securing devices clamp the package at longitudinal sides. In certain embodiments, each of the fragmentation rollers comprises projections that extend radially from an axis thereof. In certain embodiments, the projections of the fragmentation rollers are misaligned. In other embodiments, the projections of the fragmentation rollers are aligned. In certain embodiments, the projections of the fragmentation rollers are star shaped.

In certain embodiments, the fragmentation rollers are caused to rotate and drive the package into the insertion path. In other embodiments, the package imparts rotational motion to the fragmentation roller. In certain embodiments, each of the fragmentation rollers comprise projections that extend radially from an axis thereof. In certain embodiments, the first securing device comprises a first clamp. In certain embodiments, the second securing device comprises a second clamp. In certain embodiments, the method further comprises clamping the package between the first and second clamps by operation of a lever. In certain embodiments, the first and second clamps engage a first and second longitudinal seals of the flexible package. In certain embodiments, the method further comprises a pair of rollers configured to progressively compress the package, with the progressive compression occurring in the area between the first and second clamps.

In one embodiment, the first and second securing devices are first and second clamps that engage a first and second longitudinal seals of the flexible package in response to a signal from the sensor, and the insertion path is downward, and each of the fragmentation rollers comprises projections that extend radially from an axis thereof, and are misaligned with respect to each other, and the method further comprises progressively compressing the package by a pair of rollers, with the progressive compression occurring in the area between the first and second clamps.

DESCRIPTION OF THE DRAWINGS

Implementations of the disclosure may be better understood when consideration is given to the following detailed description. Such description makes reference to the following figures wherein:

FIG. 5A is a cross-sectional view of the dispenser of FIG. 1A showing the flexible package in a position during travel along an insertion path within the dispenser;

FIG. 5B is a cross-sectional view of the dispenser of FIG. 5A showing the flexible package in a position against a stop disposed across the insertion path;

FIG. 6A is a cross-sectional view of the dispenser of FIG. 5B showing the flexible package in a position against the stop and a sensor sensing the package in the insertion path;

FIG. 6B is a cross-sectional view of the dispenser of FIG. 6A showing the opposing surfaces compressing the flexible package at a location above lower edge thereof;

FIG. 8A is a cross-sectional view of the dispenser of FIG. 6E showing the flexible package in a dispensing position and exemplary opposing surfaces applying pressure to the flexible package near a lower edge thereof;

FIG. 8B is a cross-sectional view of the dispenser of FIG. 6E showing the opposing surfaces after they have moved upwards along the flexible package while applying pressure thereto;

FIG. 11A is a cross-sectional view of the dispenser of FIG. 9C showing the opposing surfaces separated after creating the opening in the flexible package;

FIG. 11B is a cross-sectional view of the dispenser of FIG. 11A showing the opposing surfaces separated and in a position while moving upwards towards the upper edge of the flexible package;

FIG. 12A is a cross-sectional view of the dispenser of FIG. 11C showing the opposing surfaces brought into a contacting relationship with the flexible package near the upper edge thereof;

FIG. 12B is a cross-sectional view of the dispenser of FIG. 11C showing the opposing surfaces applying pressure to the flexible package and in a position midway down the flexible package;

DETAILED DESCRIPTION

Figure 1A:
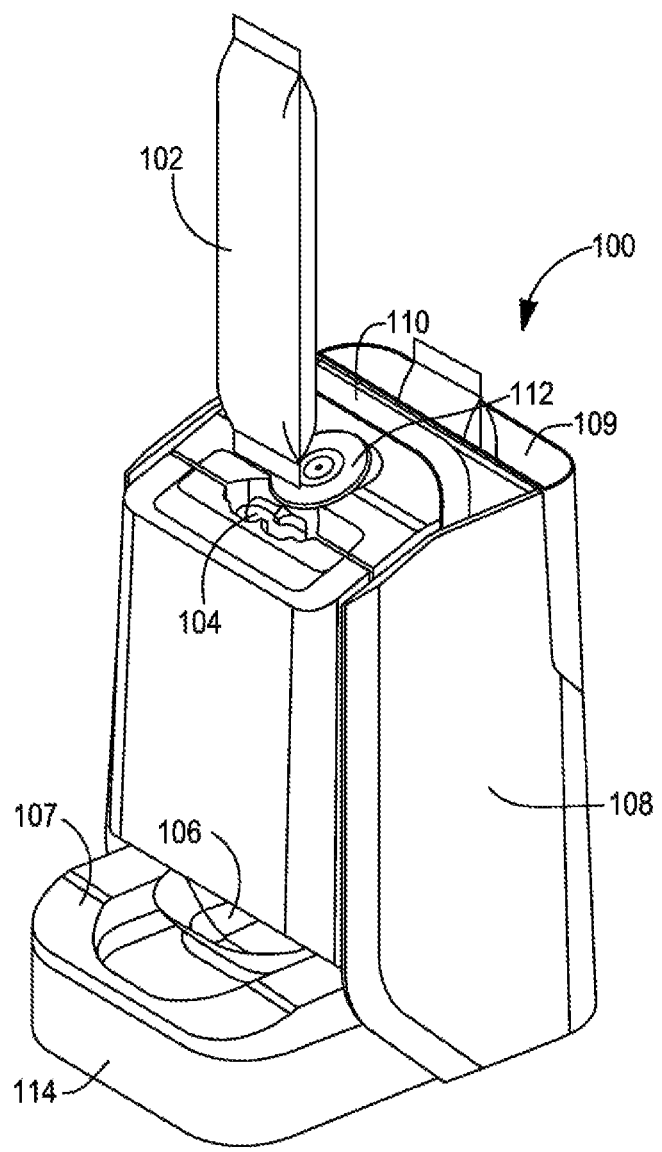
FIG. 1A is a perspective view of one embodiment of a dispensing device, with a flexible package containing a product positioned to be inserted therein.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

Reference throughout the specification to "one example" or "an example" means that a particular feature, structure, or characteristic described in connection with an example is included in at least one embodiment. Thus, the appearance of the phrases "in one example" or "in an example" in various places throughout the specification does not necessarily indicate reference to the same embodiment. Further, the particular features, structures or characteristics may be combined in any suitable manner in one or more embodiments.

As used herein, an apparatus is "configured" to perform an action by including the physical member(s) that perform (s) the action, as well as the corresponding mechanism to move the physical member(s) to perform(s) the action. In addition, an apparatus that is configured to perform an action includes one or more processing devices coupled to one or more storage media, wherein the storage media includes instructions which, when executed by the one or more processing devices, cause the one or more processing devices to send appropriate signals to the appropriate mechanism(s) of the apparatus to cause the mechanism(s) to perform the action.

There is provided a device for cleanly and efficiently removing a product from a flexible package. Generally, the device includes an orifice or opening for receiving a flexible package comprising food, opposing surfaces arranged to movingly contact the flexible package once within the device. The device includes an opener for creating an opening in the flexible package and once opened, the opposing surfaces apply pressure to the flexible package at a position distal to the opening and while moving towards the opening so that the food product therein is forced out of the package.

The device thus provides a mechanism for efficiently removing substantially all of the food from within a flexible package, i.e., so that less than 20 wt %, or less than 15 wt %, or less than 10 wt %, or less than 5 wt %, or even less than 1 wt % of the food remains within the package after the device has operated upon the package, based upon the total weight of food within the flexible package before it is opened and operated on by the device. In some embodiments, less than 0.5 w % of the food product may remain in the package.

As a flexible package is held in a fixed position within the device while the food is being removed therefrom, the device also provides for the accurate placement of food from the flexible package on or within the receptacle from which the food is to be served. That is, in use, less than 1 wt %, or less than 0.5 wt %, or less than 0.1 wt %, or less than 0.01 wt % of the food product dispensed from the flexible package is retained within the device, i.e., as by missing the serving receptacle, or retained on the opener. The apparatus thereby reduces the waste and mess that may be associated with the use of flexible packages of food and may increase the consumer acceptance thereof.

Further, the device provides a fully contained and automated way of removing food from a flexible package thereby reducing the frustration that may be associated with the use of such flexible packages thereby also increasing consumer acceptance thereof. Consumers that have difficulty manipulating flexible packages are thus benefited, and the device may assist in rendering pet ownership more accessible for such consumers, as well as avoiding direct physical contact with the food product that some consumers find distasteful or unsanitary.

FIG. 1A is a perspective view of one embodiment of a dispensing device 100 along with an example flexible package 102 containing product. Generally, dispensing device 100 comprises outer case 108, opening 104, lever/handle 110, status indicator 112, serving receptacle 106, tray 107, storage space 109 and moveable base 114. In use, one or more flexible packages 102 may be stored in storage space 109, and be provided to the dispensing device 100 as desired. The dispensing device 100 (also referred to herein as "dispenser 100") dispenses product from the flexible package 102.

Figure 1B:
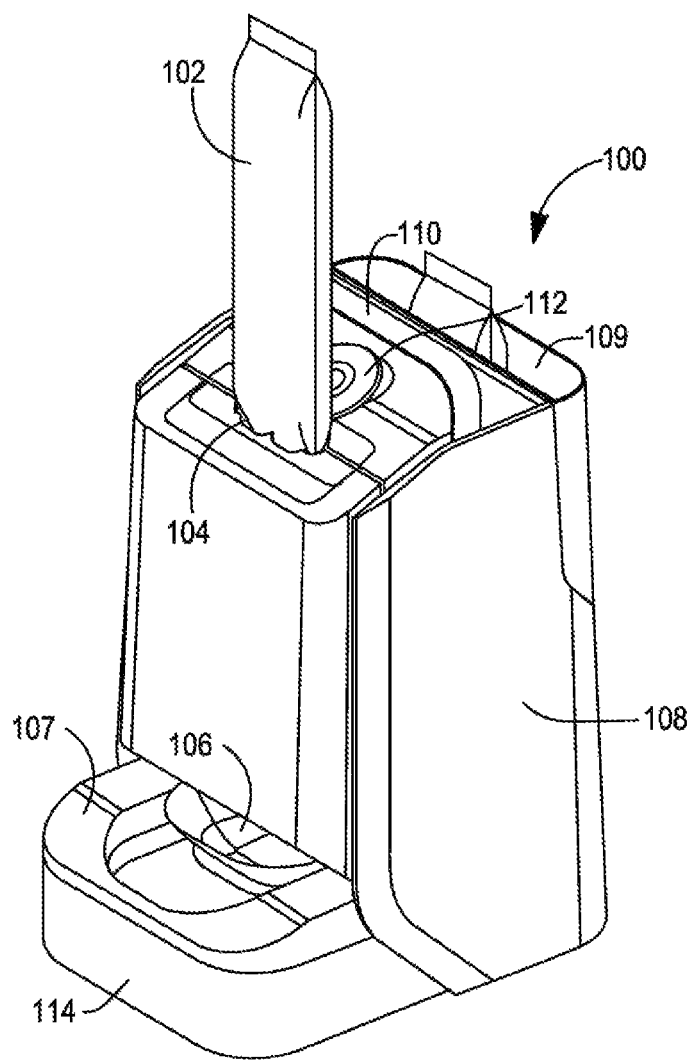
FIG. 1B is a perspective view of the embodiment of the dispensing device shown in FIG. 1A with the flexible package being inserted therein.
Figure 1C:
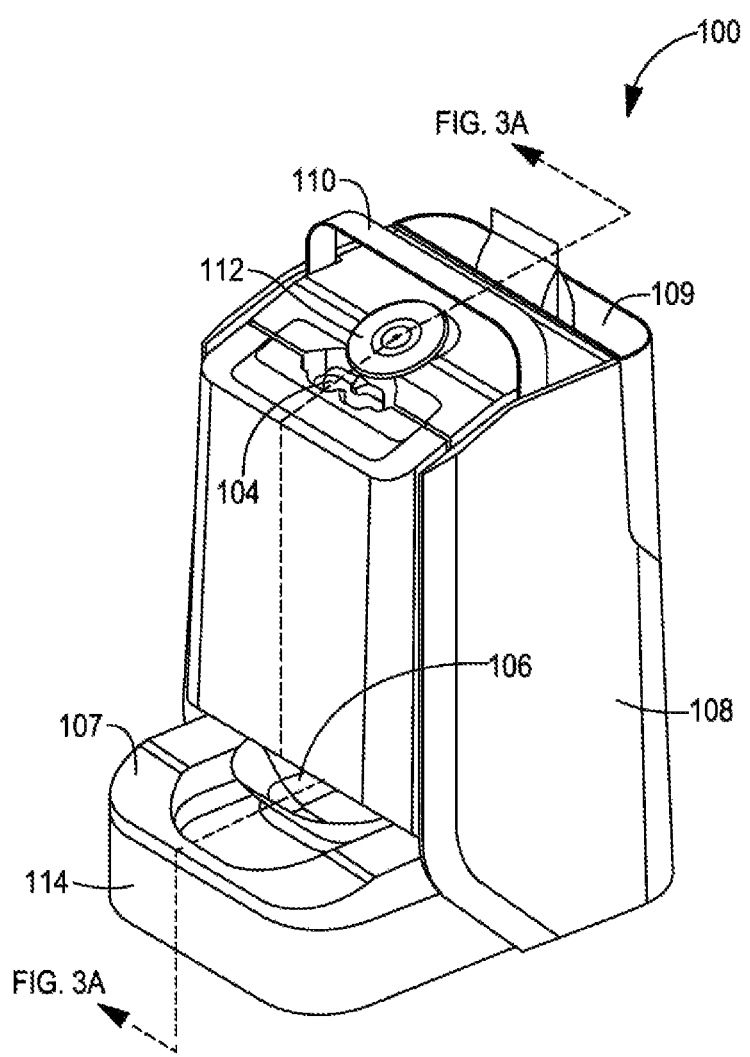
FIG. 1C is a perspective view of the embodiment of the dispensing device shown FIG. 1A with the flexible package fully inserted therein.

The example dispenser 100 shown in FIG. 1A has an opening 104 having dimensions corresponding to the flexible package 102. Opening 104 can be provided in any other shape or size in order to adapt various sizes and shapes of flexible packages. The opening 104 provides an aperture for the flexible package 102 to be inserted through the outer case 108 of the dispenser 100 into an internal space in communication with the opening 104. In use, a consumer inserts the flexible package 102 into the opening 104 for operation thereon by the dispenser 100. FIG. 1B is a perspective view of the dispenser 100 showing the flexible package 102 partially inserted into the opening 104, and FIG. 1C is a perspective view of the dispenser 100 with the flexible package 102 fully inserted through the opening 104.

The dispenser 100 is configured to accept an un-opened flexible package. The dispensing device 100 is configured to dispense product from the package 102 once the flexible package 102 is disposed in the internal space within the dispenser 100. The dispenser 100 can dispense product from the flexible package 102 by causing the product in the flexible package 102 to exit the package onto a serving receptacle 106, such as a tray, plate, bowl, or the like. In some embodiments, the dispenser 100 may be provided with a heating element operatively disposed to couple with the serving receptacle 106 when the serving receptacle is positioned to receive food product dispensed from the package 102.

Figure 2A:
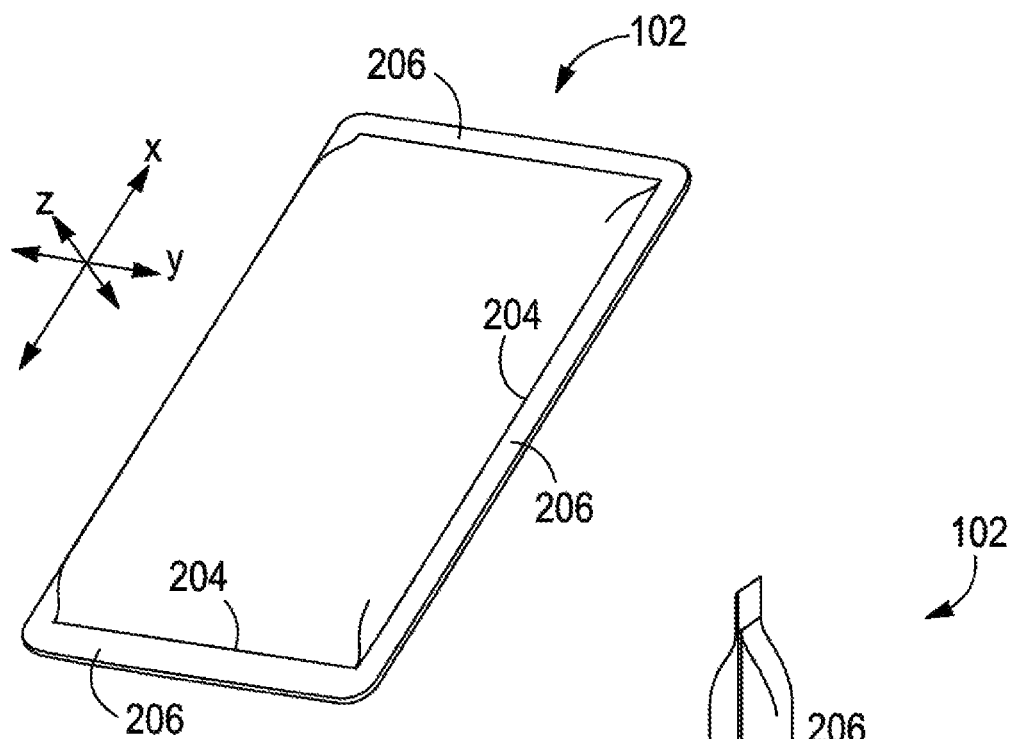
FIGS. 2A and 2B are perspective views of the flexible package of FIG. 1A.
Figure 2B:
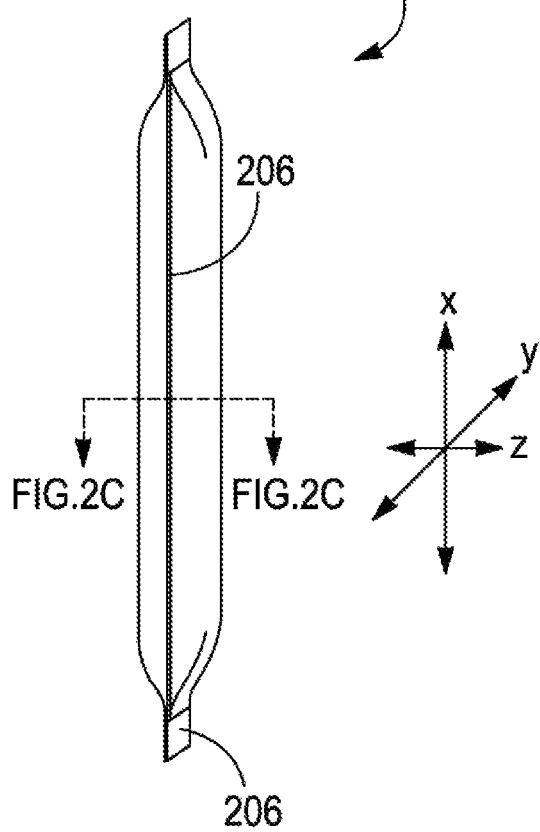

FIGS. 2A and 2B are perspectives view of the flexible package 102 having product therein. The flexible package 102 defines an enclosed space 202 which contains the product. The enclosed space 202 can be hermetically sealed to prevent the food (e.g., pet food) product therein from spoiling.

The walls of the package 102 are flexible. As used herein, "flexible" means that the walls of the package 102 and the package 102 as a whole provide little resistance to a user bending the package 102 in any direction, and allows such manipulation in a substantially elastic manner. That is, the package 102 is not stiff in the hands of a user.

The material of package 102 is desirably suitable for retorting or sterilization. To be suitable for retorting, the material from which package 102 is formed must be able to maintain an airtight seal for the enclosed space 202 through the retort process. In an example, package 102 is composed of a single sheet of plastic or a laminate including at least one layer of plastic. Suitable plastics that can be included in the walls include polypropylene, polyester, polyethylene, polyamide and/or a bio-based/bio-degradable plastic. In many instances, package 102 may comprise a laminate (e.g., 2 ply, 3 ply, 4 ply) including at least one layer of plastic. In a particular example, package 102 comprises a laminate including a layer of polyethylene terephthalate (PET) for the outside of the package 102 and a layer of aluminum for the inside of the package 102. Other materials, combinations and number of layers are also possible, such as a 3-layer wall comprising a laminate of a layer of PET on the outside, a layer of aluminum in the middle, and a layer of polypropylene on the inside.

In one embodiment, the geometry of the flexible package 102 is generally planar, wherein two of the perpendicular dimensions, X, Y, of the package 102 are each substantially larger (e.g., at least 3 times larger) than the third perpendicular dimension, Z, when a product is within the package 102. Since the package 102 is flexible it can be manipulated or contorted into various geometries, including non-planar ones. The geometry of the package 102, however, refers to the geometry assumed by the package 102 while the package 102 is enclosing the product and the longitudinal (x-dimension) surface of package 102 is resting on a horizontal surface. In other examples, the flexible package can have other geometries including, triangular, trapezoidal, cylindrical and conical. An example of a gusseted flexible package suitably used in dispenser 100 is shown in FIG. 2D.

As a generally planar body, the enclosed space 202 is defined by one or more edges 204, which are at the lateral (Y dimension) and longitudinal (X dimension) extents of the enclosed space 202. Edges 204 are defined by a corresponding seal 206. The seals 206 can be any appropriate seal known in the art of flexible packaging including one or any combination of a permanent, an easy-open, or a re-closable seal, including one or any combination of a heat seal, a cold seal, or a pressure sensitive seal. The seals 206 can be formed between any appropriate walls of the flexible package 102 and between any appropriate material of those walls. In the example shown in FIGS. 2A and 2B, the flexible package 102 consists of two walls having identical geometries which are superposed against one another. The edges of the two walls are sealed together to form the seals 206 around the enclosed space 202 shown in FIG. 2C. The two walls can be part of a single sheet of material or each wall can be a distinct sheet of material. In some examples, one or more of the edges 204 can be defined by a fold in the material (e.g., in a doubled-back configuration) rather than a seal 206. In other examples, the flexible package 102 can include a gusset, such as the package 102 shown in FIG. 2D.

In some examples, the package 102 can include one or more flaps extending outward from any or all sides of the enclosed space 202. Such flaps include portions of a wall of the material that are not sealed to an opposing wall or have no opposing wall to seal to. Flexible packages 102 designed for a user to open by pulling apart one of the seals of the package 102 may typically incorporate such flaps for this purpose. In such a design, the user can grasp the flaps and pull the flaps apart in order to break the seal and open the package 102.

Figure 2C:
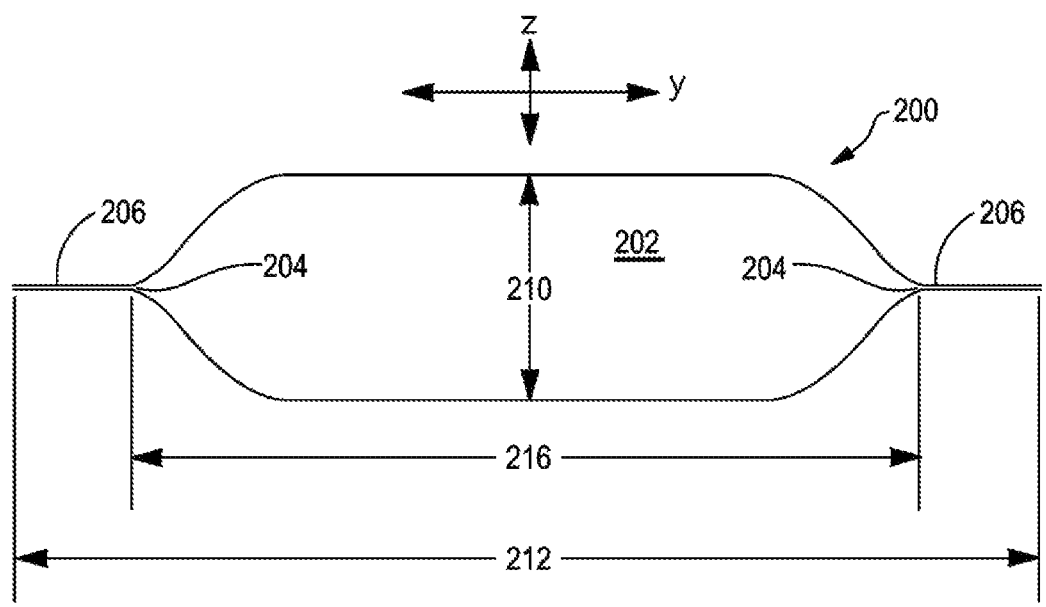
FIG. 2C is a cross-sectional view of the flexible package of FIG. 1A.
Figure 2D:
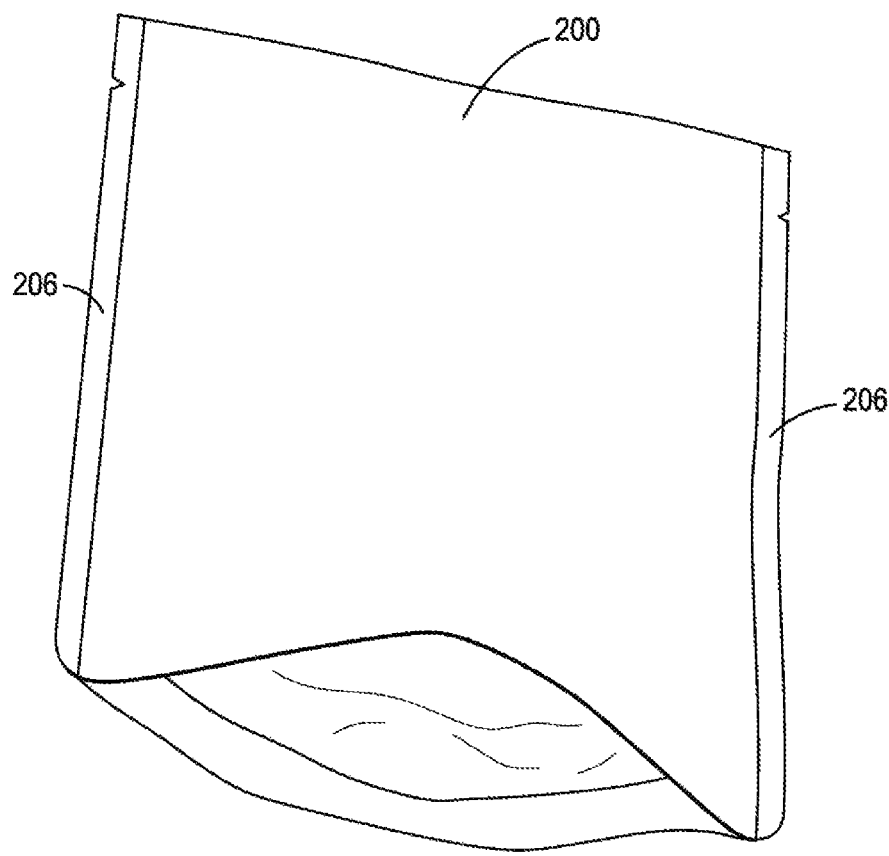
FIG. 2D is a perspective view of an additional embodiment of a flexible package.

FIG. 2C is a cross-sectional view of the package 102 with product in the enclosed space 202. The embodiment of the package 102 shown in FIG. 2C has approximately a 12 mm depth 210 (Z dimension) and approximately a 95 mm width 212 (Y dimension). Because package 102 is flexible, shifting of the product within the package 102 can result in changes to the dimensions thereof. Generally speaking, product shifting that results in an increase in the Z dimension will result in a decrease in the X or Y dimension and a maximum Y dimension in a position of package 102 will result in a minimum Z dimension and vice versa. The seals 206-1 and 206-2 on the edges of the package 102 are each approximately 6 mm in width (Y dimension), resulting in a width 214 for the enclosed space 202 of approximately 83 mm. Packages having other dimensions and geometries can also be used.

The path that the package 102 travels during insertion into the dispenser 100 is referred to herein as the "insertion path". In the examples shown in FIGS. 1A-1C, the insertion path is downward, i.e., package 102 travels downward during insertion. In such embodiments, the package 102 travels down the insertion path and is operated on by the dispenser 100 in an upright orientation. As used herein an "upright orientation" refers to an orientation of a package 102 having a generally planar geometry, in which the shortest dimension (i.e., the Z axis) of the package 102 is oriented horizontally. Other orientations and travel directions can be used. The package 102 can be manually pushed or pulled along the insertion path, or can be moved via a combination of the action of the dispenser and the action of the operator, or can be moved, after insertion and until after dispensing, solely by the dispenser.

The dispenser 100 can include guides that guide the package 102 along the insertion path during insertion and operation of the dispenser 100. For example, opening 104 can act as a guide by virtue of the shape thereof. That is, opening 104 can have a shape that corresponds to a cross-sectional profile of the package 102, e.g., such as that shown in FIG. 2C. In such embodiments, opening 104 can include a wide midsection flanked by two slits. The dimensions of the midsection of the opening 104 can correspond to the enclosed space 202 of the package 102. The two slits of the opening 104 extend from the midsection and have dimensions that may correspond generally to the seals 206 on the left and right longitudinal edges of the package 102. As such, the opening 104 is shaped to accept package 102 when inserted therein an upright orientation, and acts as an initial guide for the package 102 into dispenser 100.

Upon storage, products packaged within flexible packages can tend to solidify into a form approximating that of the flexible package, particularly if stacked or otherwise subjected to pressure. Although the products may remain safe and palatable for consumption when solidified, any such solidification can render the products difficult to use. That is, it may be difficult to dispense a solidified product from a package accurately and/or without causing undesirable splattering or mess. It may be desirably to manipulate packages prior to use or dispensation of the product therefrom in order to break up or fragment any solidified portions of food product therein into pieces or into the form the product in which the product was intended to be provided. Further, providing the product in smaller pieces, rather than a solidified mass, can make the product more visually appealing, and easier to consume without mess. It can, however, be difficult for some users to impart a desired degree of manipulation to the package. And too much manipulation may result in package failure, whereas too little may not have the desired result.

And so, some embodiments of the dispenser 100 can be provided with fragmenting rollers 316, 318. Fragmenting rollers 316 and 318 are desirably operably disposed relative to each other so as to be capable of accommodating a flexible package 102 moving therebetween. Fragmentation rollers 316, 318 are aligned with respect to each other and within dispenser 100 such that the insertion path of the package 102 begins at opening 104 and proceeds through the space between the fragmentation rollers 316, 318. That is, the package 102 is inserted through the opening 104, and as the package 102 travels down the insertion path, the package 102 travels through the space defined between the fragmenting rollers 316, 318.

One or both of fragmentation rollers 316, 318 comprise a plurality of projections 322 that extend radially outward from an axis 320 thereof. Further, fragmentation rollers 316, 318 are each configured to rotate about an axis 320 of each. The axes 320 of fragmentation rollers 316, 318 extend perpendicularly to the direction of travel of the package 102 along the insertion path such that fragmentation rollers 316, 318 contactingly rotate along the passing surface of the package 102 as it moves along the insertion path. The fragmentation rollers 316, 318 can have opposing pressure applied thereto such that the contact and engagement of fragmentation rollers 316, 318 with the moving package 102 imparts rotational motion to the fragmentation rollers 316, 318, or, fragmentation rollers can be otherwise caused to rotate and the same, or a different, speed as the linear speed of package 102 along the insertion path.

In use, the projections 322 of fragmentation rollers 316, 318 contact the package 102 and impinge upon the package 102 in an opposing fashion as the package 102 moves between fragmentation rollers 316, 318. In particular, the projections 322 of fragmentation rollers 316, 318 are operatively disposed to contact the area of the package 102 defining enclosed space 202 as the package 102 moves between the fragmentation rollers 316, 318. As shown in FIG. 2A, the enclosed space portion of the package 102 is demarcated by the edges 204 and the seals 206.

Fragmentation rollers 316, 318 and the projections 322 thereof act upon package 102, pushing against the product within the enclosed space 202 of package 102, thereby breaking up any portions of the product that may have solidified within the package. Fragmentation of the product in this way not only renders the product more easily, cleanly and accurately dispensed, but may also increase the visual appeal of the dispensed product. Further, in those embodiments of the dispenser 100 wherein the serving receptacle 106 is desirably warmed in order to warm the product dispensed therein, a more fragmented product may lend itself to more efficient heating than larger solidified chunks of product.

Fragmentation rollers 316, 318 are configured to contact opposing sides of package 102. Though embodiments are contemplated wherein only one of fragmentation rollers 316, 318 includes projections 322, the provision of projections 322 on both fragmentation rollers 316, 318 can provide for greater fragmentation of the product within package 102 and can be preferred in cases wherein substantial solidification of the product within package 102 is anticipated or probable.

Further, while in those embodiments wherein both fragmentation rollers 316, 318 include projections 322 they may be configured within dispenser 100 so that the projections 322 of each are aligned such that they would contact each other if package 102 were not therebetween, it has been discovered that greater fragmentation of a product within package 102 can result when this is not the case. And so, in some embodiments, fragmentation rollers 316, 318 are configured within dispenser 100 so that the projections 322 thereof are misaligned and would not come into contact if fragmentation rollers 316, 318 were brought into contact without package 102 therebetween.

Fragmentation rollers 316, 318 are considered to be misaligned as that term is used herein when the plane in which a projection 322 of one fragmentation roller 316, 318 resides does not coincide with, or is spaced apart axially from, the plane in which a projection 322 of a second fragmentation roller 316, 318 resides. Desirably, when fragmentation rollers 316, 318 are misaligned within dispenser 100, the planes in which their respective projections 322 reside are spaced apart axially by a distance larger than a width of the projections, such that the projections of fragmentations rollers 316, 318 would not come into contact with each other if fragmentation rollers 316, 318 were brought together without package 102 therebetween.

In such a configuration, the projections of fragmentation rollers 316, 318 do not contact opposing surfaces of package 102 directly opposite to each other. As a result of this misalignment, the projections 322 on fragmentation roller 316 will impinge upon one side of package 102 in a first plurality of locations while the projections 322 on fragmentation roller 318 will impinge upon the other side of package 102 in a second plurality of locations that are not directly reverse of the first plurality of locations. This causes the product in the package 102 to be pushed a first direction in the first plurality of locations and pushed the opposite direction in the second plurality of locations. This back-and-forth pushing of the product aids in breaking-up the product.

Figure 3A:
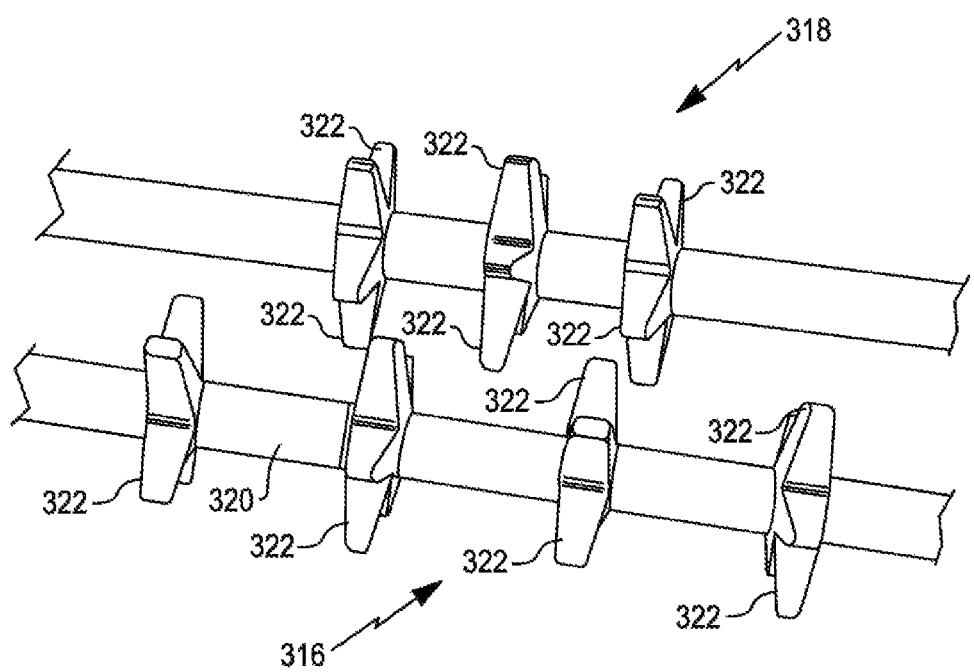
FIG. 3A-3E are perspective views of several embodiments of the fragmentation rollers that may be included in some embodiments of the dispensing device.
Figure 3B:
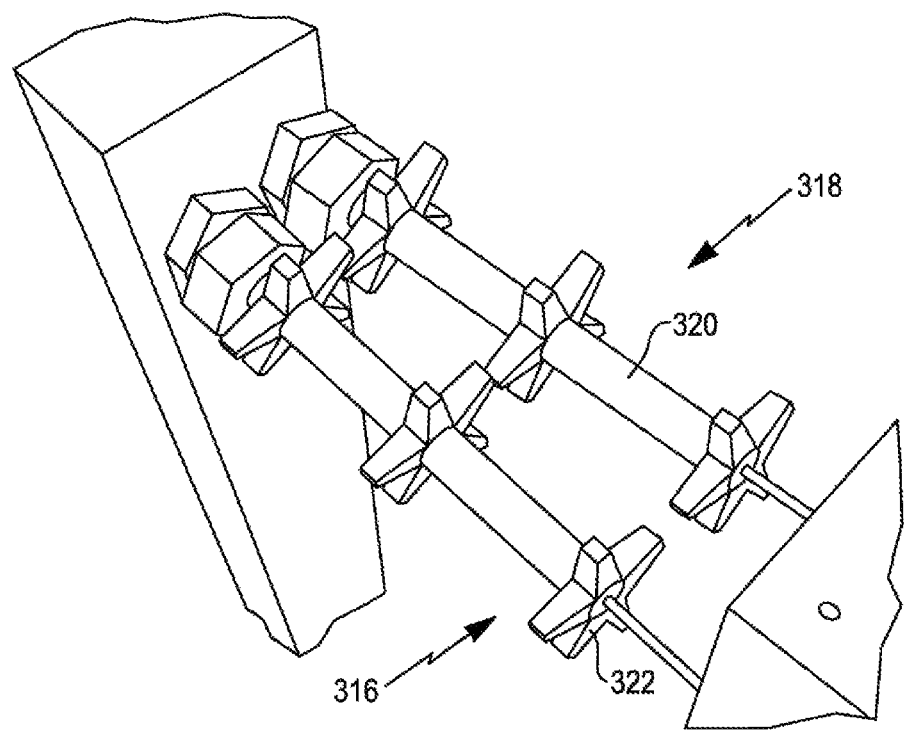

Several embodiments of suitable configurations of fragmentation rollers 316, 318 are shown in FIG. 3A-3E. In the example shown in FIG. 3A, fragmentation roller 316 includes a plurality of star shaped projections 322 extending from an axis 320 of rotation of fragmentation roller 316. Similarly, fragmentation roller 318 includes a plurality of star shaped projections 322 extending from an axis 320 of rotation of fragmentation roller 318. Fragmentation rollers 316, 318 are shown misaligned in FIG. 3A, so that the projections 322 of each would contact opposite sides of a package 102 passing therebetween, whereby the first plurality of locations contacted by projections 322 of fragmentation roller 316 would not be directly opposite the second plurality of locations contacted by projections 322 of fragmentation roller 318. An aligned configuration of fragmentation rollers is shown in FIG. 3B, and may be suitable for use with products for which substantial solidification or congealing is not a concern.

Figure 3C:
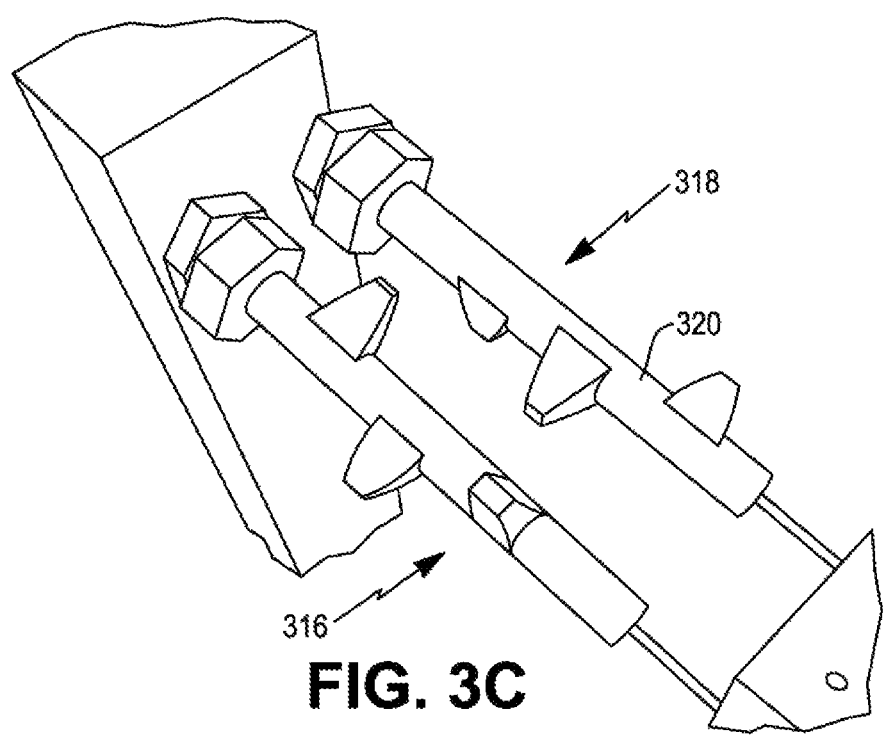
Figure 3D:
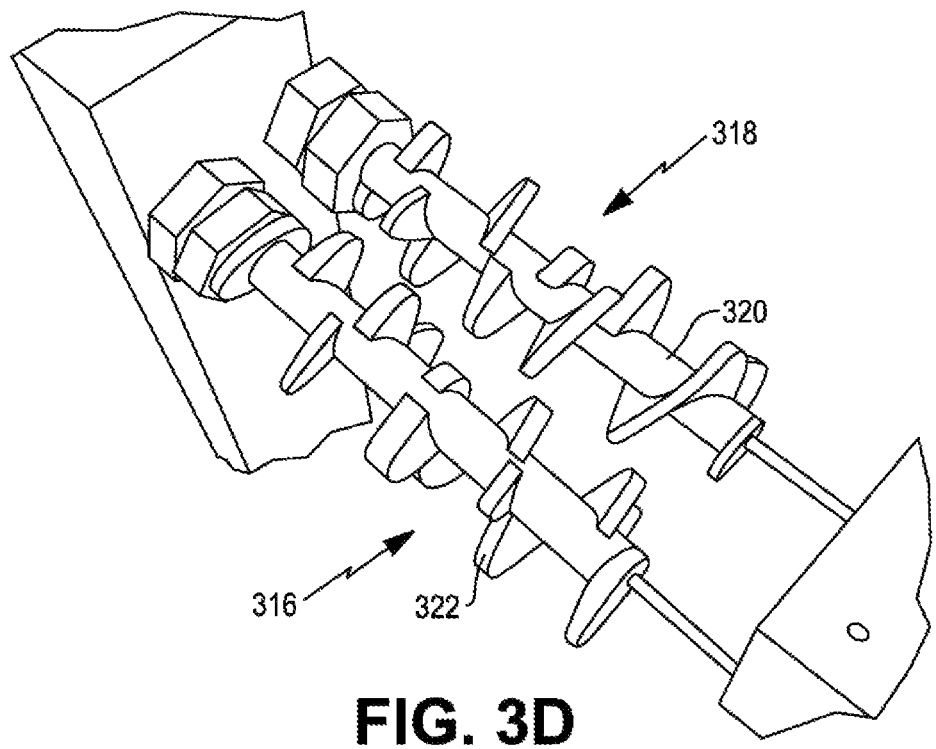
Figure 3E:
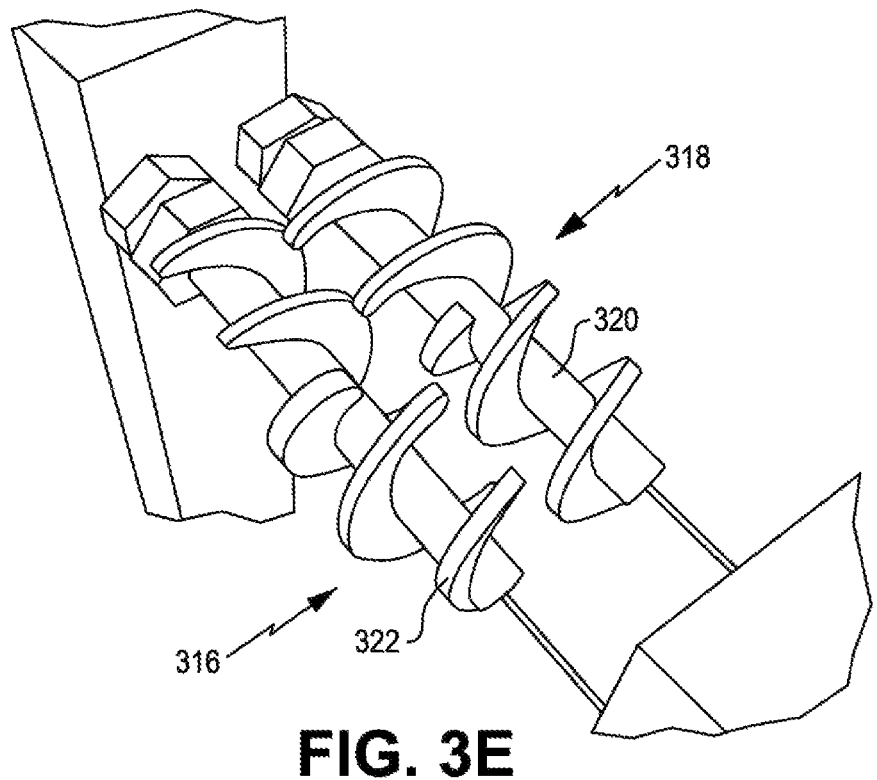

Though star shaped features/projections are shown in FIGS. 3A and 3B, any suitable number or configuration of projections 322 on fragmentation rollers 316, 318 may be used. For example, trapezoidal projections 322 are shown in FIG. 3C and generally helical projections are shown in FIGS. 3D and 3E. Desirably, whatever the number, shape or configuration of the projections 322 thereupon, fragmentation rollers 316, 318 will allow the package 102 to travel therebetween and along the insertion path while also providing sufficient contact to fragment the product within package 102.

Figure 4A:
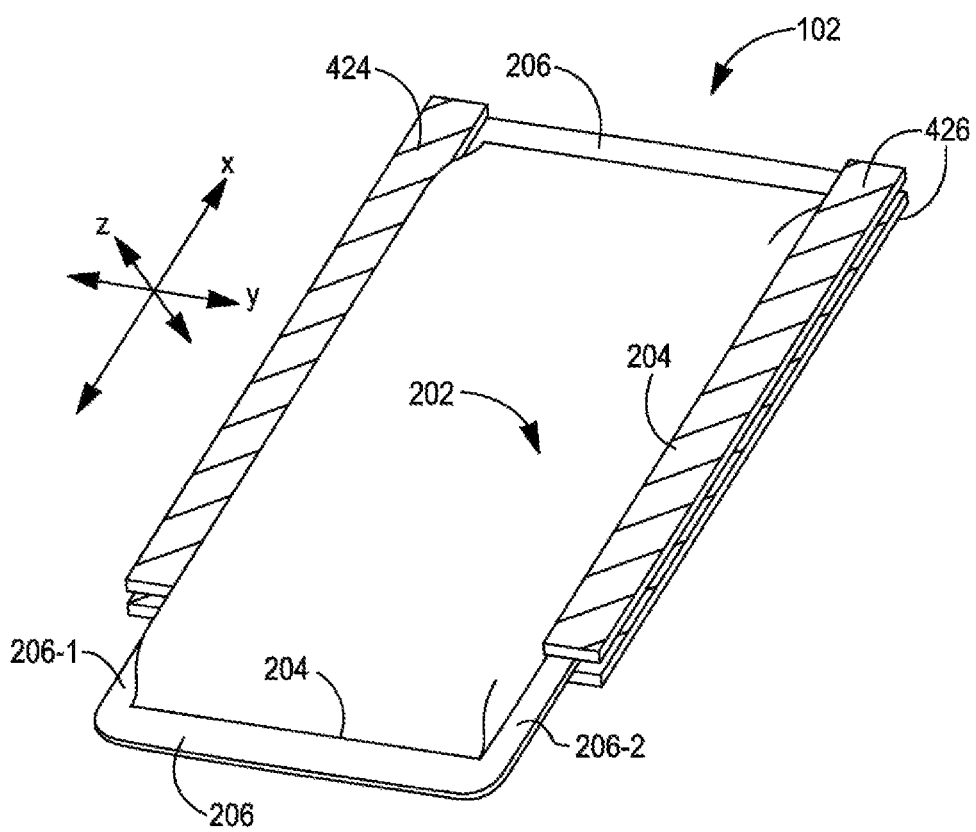
FIG. 4A is a perspective view of the flexible package of FIG. 2A disposed with its longitudinal edge seals in between internal guides.
Figure 4B:
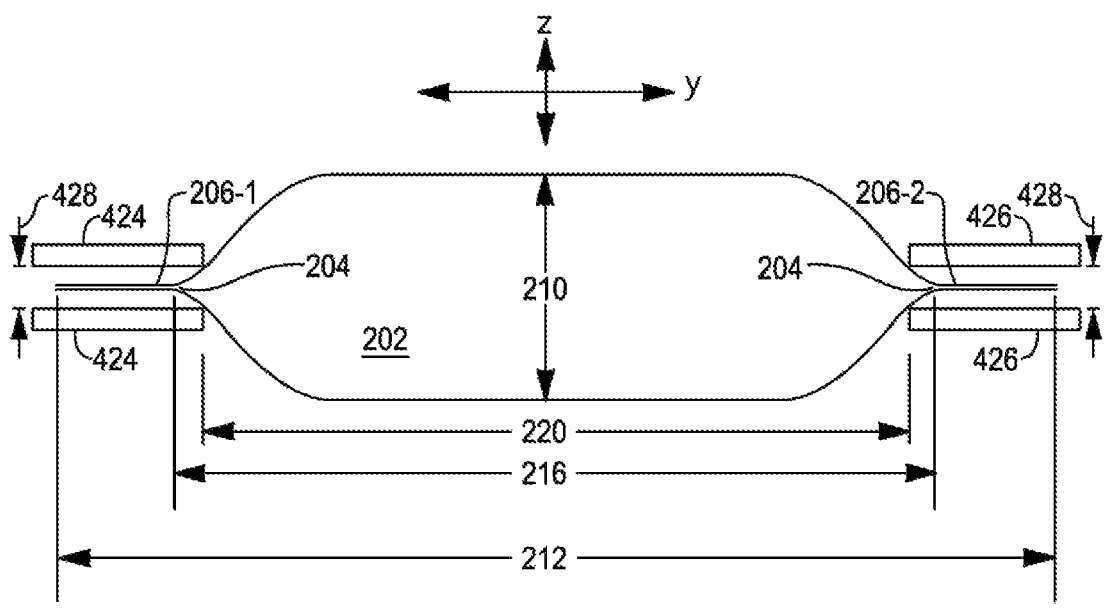
FIG. 4B is a cross-sectional view of the flexible package of FIG. 2A disposed with its longitudinal edge seals in between internal guides.
Figure 4C:
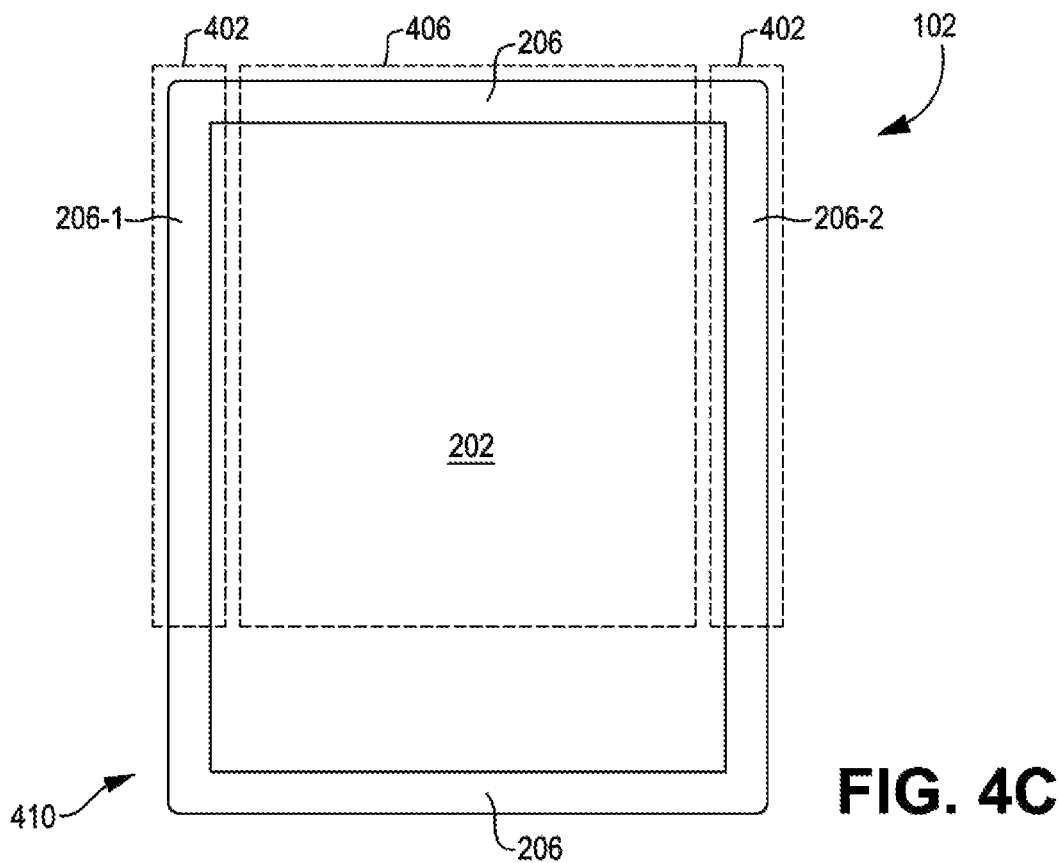
FIG. 4C is a front view of the flexible package of FIG. 2A showing the areas of the package that are within internal guides and the area that may be contacted by the opposing surfaces.

The insertion path of dispenser 100 can also include internal guides 424, 426 such as those shown in FIGS. 4A-4C. That is, the internal guides 424, 426 can be aligned with, connected to, or otherwise operably disposed relative to the slits of opening 104 such that when the package 102 is inserted through opening 104, the seals 206-1, 206-2 of the package 102 are guided to the space between the respective opposing surfaces 428 of the internal guides 424, 426. By keeping the seals 206 within their respective guides 424, 426, the guides 424, 426 can guide the path of the seals 206-1, 206-2, and therefore the path of package 102 as a whole, along the insertion path within the dispenser 100.

The internal guides 424, 426 can comprise two sets of parallel opposing surfaces 428, each set 428 including a first surface and opposing second surface separated by a distance that may advantageously correspond to a feature of the package to be inserted into dispenser 100. Desirably, internal guides 424, 426 have dimensions that allow them to accept seals 206-1, 2062 of package 102.

Suitable distances between the opposing surfaces 428 of a respective set of internal guides 424, 426 will be determined by the dimensions of the package desirably acted upon by the dispenser. Package 102, for example, when filled with a product, can have a depth 210 (z-dimension in FIG. 4B) of 12 mm, in which case, or similar cases, the opposing surfaces 428 of guides 424, 426 are desirably spaced less than 10 mm, or less than 7 mm, or less than 5 mm apart.

Guides 424, 426 are disposed a distance 220 apart from each other sufficient to accept the enclosed space 202 of the package 102 therebetween. Guides 208 and 209 are desirably close enough together such that package 102 cannot readily shift within dispenser 100 such that a seal 206 moves outside of guides 424, 426. The distance between guides 424, 426 may desirably correspond to and generally depend upon the dimensions of the package to be operated on by dispenser 100. For package 102, and packages with similar dimensions, guides 208 and 209 may be a distance 220 of 78 mm apart. Generally speaking, guides 424, 426 may desirably be within 10 mm or 5 mm of the filled space of a package being operated on by the dispenser 100.

In operation of dispenser 100, guides 424, 426 guide the package 102 from the opening 104 along the insertion path toward a moveable stop 510. Movement of the package 102 along the insertion path is stopped by stop 510. The dispenser 100 can include a movable stop 510 disposed to contact the package 102 and stop movement of the package 102 when the package 102 reaches a desired position within the dispenser 100. FIG. 5A is a cross-sectional view of the dispenser 100 showing a package 102 traveling along the insertion path. FIG. 5B is a cross-sectional view of the dispenser 100 showing the package 102 with a lower edge thereof resting against the stop 510.

The stop 510 can have any suitable geometry. In this example, the stop 510 is a rectangular, planar surface disposed generally perpendicular to the insertion path and the plane of the package 102. Although FIG. 5A shows stop 510 provided in conjunction with opener 903, discussed further below, this is not necessary the case, and in certain advantageous embodiments, the stop may be physically independent from the opener 903. In other embodiments, opener 903 can provide both the function of opening the package 102, and also act as a stop for package 102. In yet other embodiments, a sensor can be used in place of surface 510 and stop motion of package 102 based upon its sensed position.

FIGS. 6A-6E are cross-sectional views of the dispenser 100, with a package 102 in the stop position and showing the movement of certain components of the dispenser 100 to engage package 102 in a stop or dispensing position. In the embodiment shown in FIG. 6A-6E, a sensor 612 is used in combination with stop 510 to stop movement of the package 102 and initiate dispensing actions thereupon.

More specifically, in the embodiment shown in FIGS. 6A-6E, the dispenser 100 can include sensor 612 that indicates the presence or absence of a package 102 at a location within the dispenser 100, in some cases, by receiving a signal from an emitter 614. In some embodiments, the sensor 612 is an optical sensor that senses a focused beam of light from emitter 614. However, any other suitable emitter, sensor or combination thereof may be used, such as, e.g., radiation, microwave, heat or motion detectors.

In the embodiment shown, the emitter 614 and the sensor 612 are disposed such that the signal projects from the emitter 614, across the insertion path, and is received and sensed by the sensor 612. If a package is between the emitter 614 and the sensor 612, the signal will be blocked by the package 102 and not received by sensor 612.

When the sensor 612 ceases receiving signal from the emitter, thereby indicating the disruption of the signal as may be caused by the presence of a package, the sensor 612 may send a signal to one or more processing devices of the dispenser 100 in communication with the sensor, and optionally the emitter 614. The dispenser 100 also includes one or more storage devices coupled to the one or more processing devices. The one or more storage devices include instructions which, when executed by the one or more processing devices, cause the one or more processing devices to perform the actions of the dispenser 100 herein. In particular, the instructions can cause the one or more processing devices to send and receive appropriate signals with appropriate items of the dispenser 100 in order to perform the actions herein.

When the one or more processing devices receive an indication from the sensor 612 that a flexible package 102 has been sensed in the insertion path, the one or more processing devices can send a signal to the securing device to secure the package 102.

As shown in FIG. 6A, once the package 102 has reached a desired, or stop, position, the dispenser 100 secures the package 102 in the desired position by compressing the package between opposing surfaces 602, 604, as may comprise rollers 606, 608. Although FIG. 6A shows opposing surfaces 602, 604 and rollers 606, 608 compressing a particular position of the package, this position is not critical, and package 102 may be held in place in any suitable location, by any suitable means. In some embodiments, package 102 may be held in place by clamps or other positioning devices operably disposed relative to guides 424, 426, in which case the clamps or positioning devices may contact the edges of package 102 rather than traversing the width of package 102. Such embodiments may be advantageous in that any area of the package may be contacted/compressed to hold package 102 in a desired position, without regard to future operations.

Figure 6D:
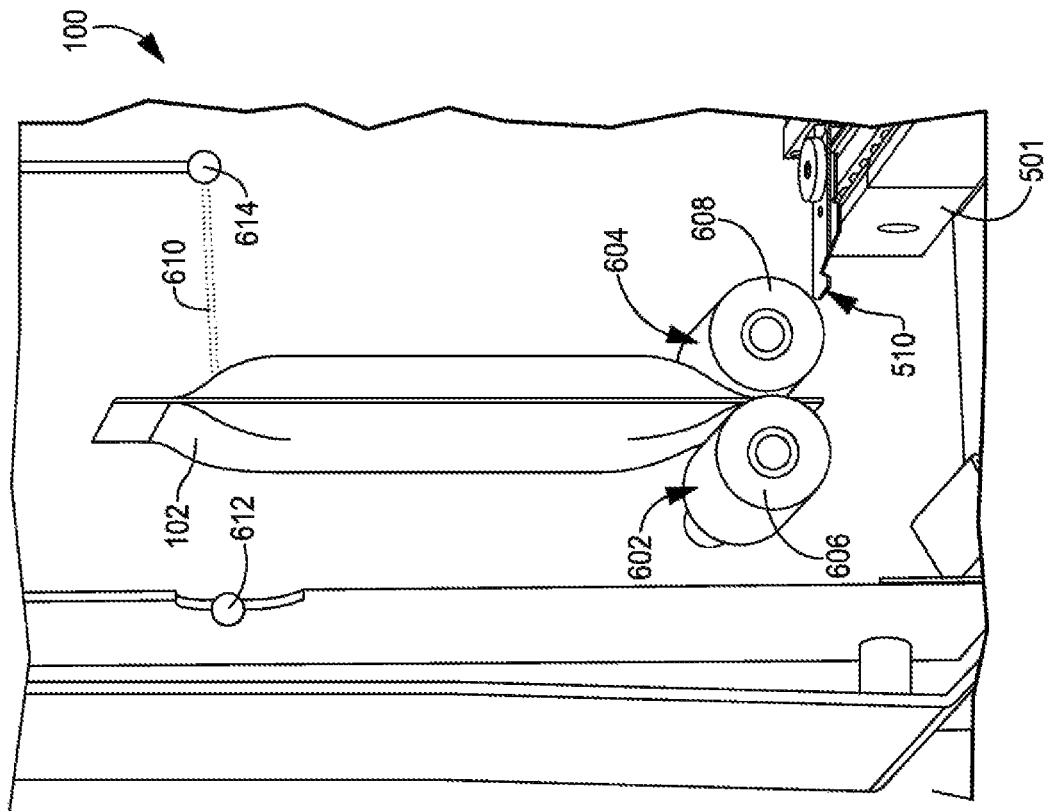
FIG. 6D is a cross-sectional view of the dispenser of FIG. 6A showing the opposing surfaces bringing the flexible package farther along the insertion path and the sensor sensing the package in the insertion path.
Figure 6C:
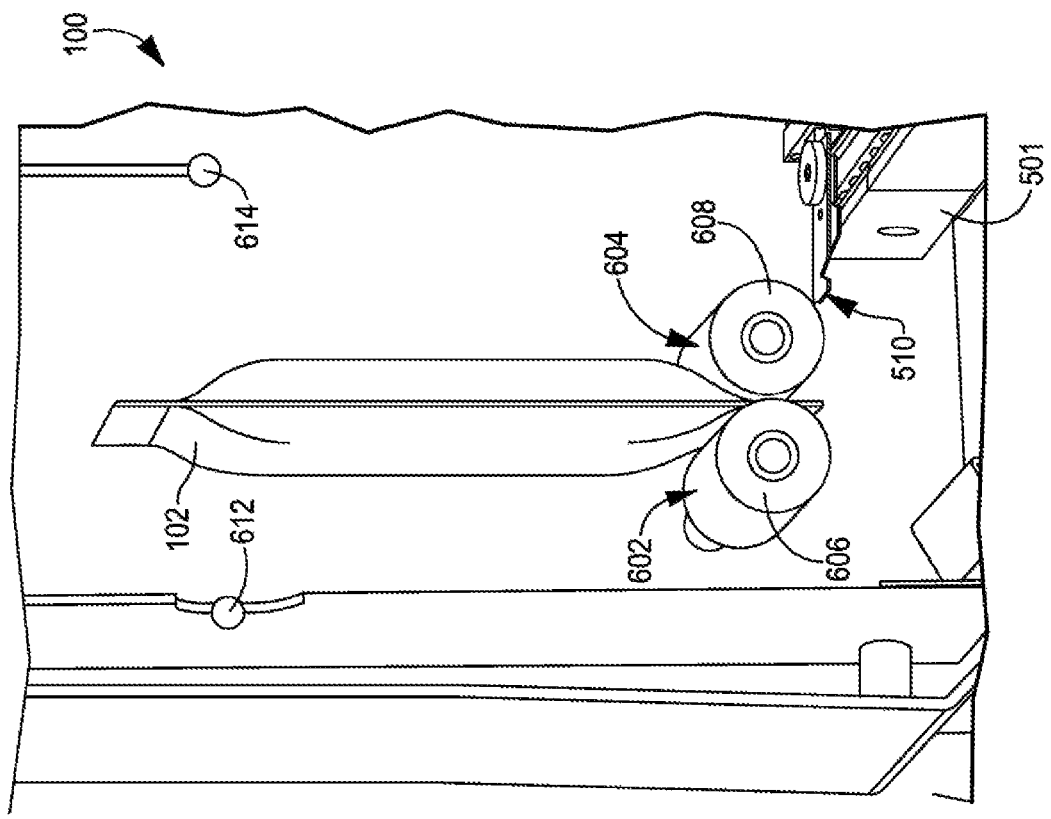
FIG. 6C is a cross-sectional view of the dispenser of FIG. 6 showing the stop moved out of the insertional path.

As shown in FIG. 6C, once the package 102 is secured in a desired position, the stop 510 can be moved out of the insertion path of the package 102 to allow the package 102 to travel further along the insertion path, past the stop position. The stop 510 can be movable by being disposed on a movable member 501 that moves between a first position within the insertion path of package 102, and a second position, out of the insertion path of package 102.

Figure 6E:
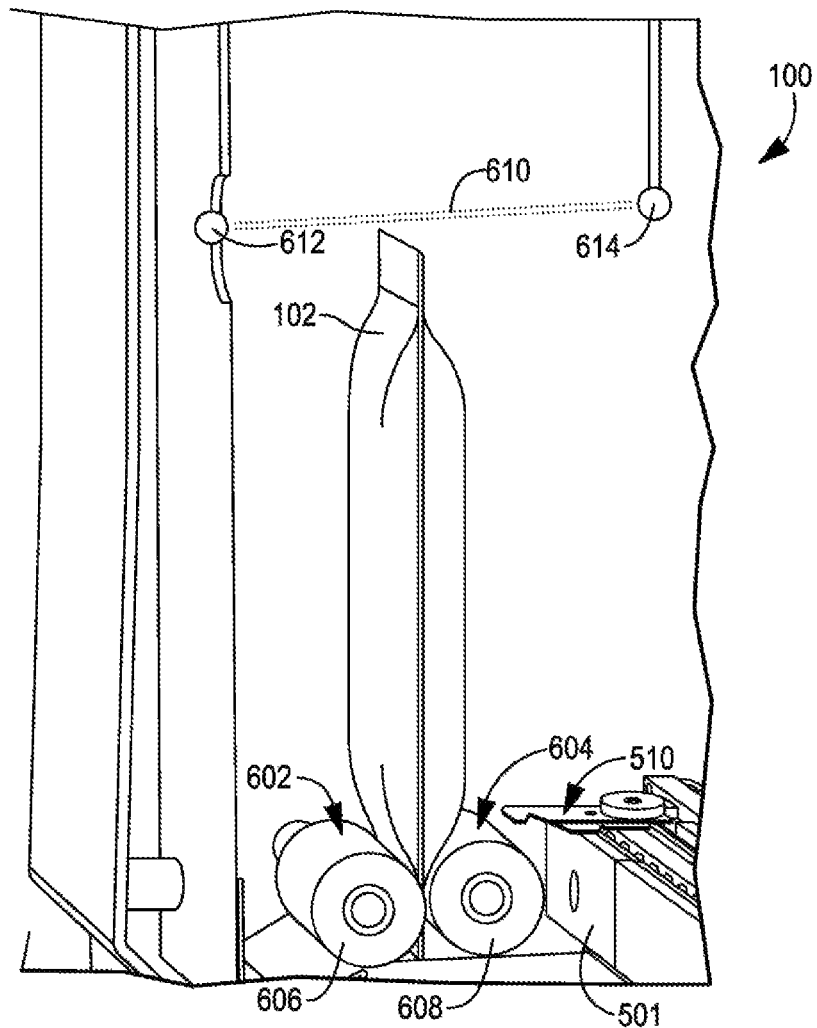
FIG. 6E is a cross-sectional view of the dispenser of FIG. 6A showing the flexible package in a dispensing position wherein the sensor no longer senses a presence of the flexible package.

Once the stop 510 is in its second position, out of the insertion path, the dispenser 100 can move the package 102 from a stop position into an opening/dispensing position. That is, while compressing the package 102 between opposing surfaces 602, 604, the dispenser 100 can move the opposing surfaces 602, 604, and thereby move the package 102, until the package 102 reaches the dispensing position. FIG. 6E is a perspective view of the package 102 in the dispensing position within dispenser 100.

The dispenser 100 may desirably be configured to sense when the package 102 reaches the dispensing position. Sensor 612 and emitter 614 may desirably be used for this purpose. As shown in FIG. 6E, once package 102 reaches the desired dispensing position, the signal 610 emitted by emitter 614 is again received by sensor 612, indicating that package 102 is no longer between sensor 612 and emitter 614 as may correspond to package 102 having reached the desired dispensing position. Sensor 612 may communicate with processing device (not shown), which may in turn, communicate with opposing surfaces 602, 604, or other components of dispenser, to stop movement of the package 102 along the insertion path, such that the package 102 is held stationary in the dispensing position.

In the embodiment shown in FIG. 6A-6E, a sensor 612 and emitter 614 are advantageously used to determine both when the package 102 is in the stop position and when the package 102 is in the dispensing position. This is not necessarily the case however, and additional sensors can be used to detect one or more positions of the package 102 within the dispenser 100.

During operations of the dispenser 100, such as once package 102 has reached the dispensing position, the package 102 can be held in place using any appropriate means. Dispenser 100 may do so in any suitable manner, using any acceptable means. Desirably, dispenser 100 will be configured to hold package 102 in a substantially still and stiff position to enable dispenser 100 to open package 102 without also causing substantial movement of package 102. Substantial, and thus undesirable, movement of package 102 could include, e.g., disengaging seals 206-1 and/or 206-2 from guides 424, 426. In one embodiment, dispenser 100 is configured to secure package 102 by clamping package 102 along the longitudinal seals 2061, 206-2 thereof.

In such embodiments, the dispenser 100 can include clamps corresponding to each seal of a package to be secured. In the instance of package 102, e.g., dispenser 100 desirably includes a first clamp configured to clamp package 102 within at least a portion of the length of first longitudinal seal 206-1 and a second clamp configured to claim package 102 within at least a portion of longitudinal seal 206-2.

In some advantageous embodiments, guides 424, 426 can be configured to also operate as clamps. That is, the first internal guide 424 can also be configured to act as a first clamp, with the opposing surfaces of the first internal guide 424 acting as opposing surfaces of the first clamp. Likewise, the second internal guide 426 can also be configured to act as the second clamp. Such embodiments are advantageous in the use of one feature for multiple purposes, thereby rendering manufacture and operation of dispenser more 100 efficient.

Although FIG. 4A and FIG. 4C show guides/clamps 424, 426 having a length generally corresponding to the length of package 102, excluding an opening region thereof, this is not required, and guides/clamps 424, 426 can be configured to engage a lesser or greater portion of longitudinal seals 206-1 and 206-2.

For example, in some embodiments, the clamps/guides 424, 426 can have a length corresponding to at least half, or at least 75%, of the length (X-dimension of package 102) of the longitudinal seal 206-1, 206-2 they desirably engage. Clamps/guides 424, 426 can be sized such that each engages at least 3 mm, or substantially all, of the width of the respective longitudinal seals 206-1, 206-2 therebetween. Moreover, the clamps/guides 424, 426 can have a size and be configured such that they do not substantially impinge upon, or do not impinge at all upon, the enclosed space 202 portion of the package 102. For example, the clamps/guides 424, 426 can have a size and be configured such that they extend into the edge regions of the enclosed space 202 a distance of 20 mm or less, 10 mm or less, or 5 mm or less from the respective longitudinal edge 204 of the enclosed space 202.

Further, the clamps, or other securing means need not be provided in the form of a single clamp or means of securing each seal length having a continuous length generally corresponding to the length of the package. Instead, in some embodiments, multiple clamps of shorter lengths can be provided. In such embodiments, or others wherein the same may be desired, a securing means can be provided configured to engage with the horizontal seams of package 102, e.g., such as to engage with seam 206 as shown in FIG. 4C.

In the embodiment(s) shown in FIGS. 4A and 4C, longitudinal seals 206-1, 206-2 are generally linear, and extend in parallel with each other and in parallel with the X-axis of the package 102. In such embodiments, clamps/guides 424, 426 corresponding to seals 206-1 and 206-2 would thus also desirably be linear and can extend in parallel with one another and be configured to align and engage with seals 206-1 and 206-2 when package 102 is in the dispensing position. The clamps are provided within dispenser 100 to allow the movement of package 102 along the internal path of the dispenser 100 when the clamps are open and to secure the package 102 at a desired position along the internal path of the dispenser 100 when the claims are closed. That is, once closed, one clamp, or multiple clamps, can securely engage longitudinal seal 206-1 and one clamp, or multiple clamps, can securely engage longitudinal seal 206-2, thereby holding package 102 firmly in a desired position within dispenser 100.

Regardless of whether the clamps are also used as guides 424, 426, the opposing surfaces of the clamps can be linear flat surfaces that face one another. In other embodiments, the opposing surfaces of clamps/guides 424, 426 can be textured or roughened. In either case, whether flat or roughened, clamps/guides 424, 426 can be provided with a coating to assist the ability of clamps/guides 424, 426 to engage with longitudinal seals 206-1, 206-1.

Figure 7A:
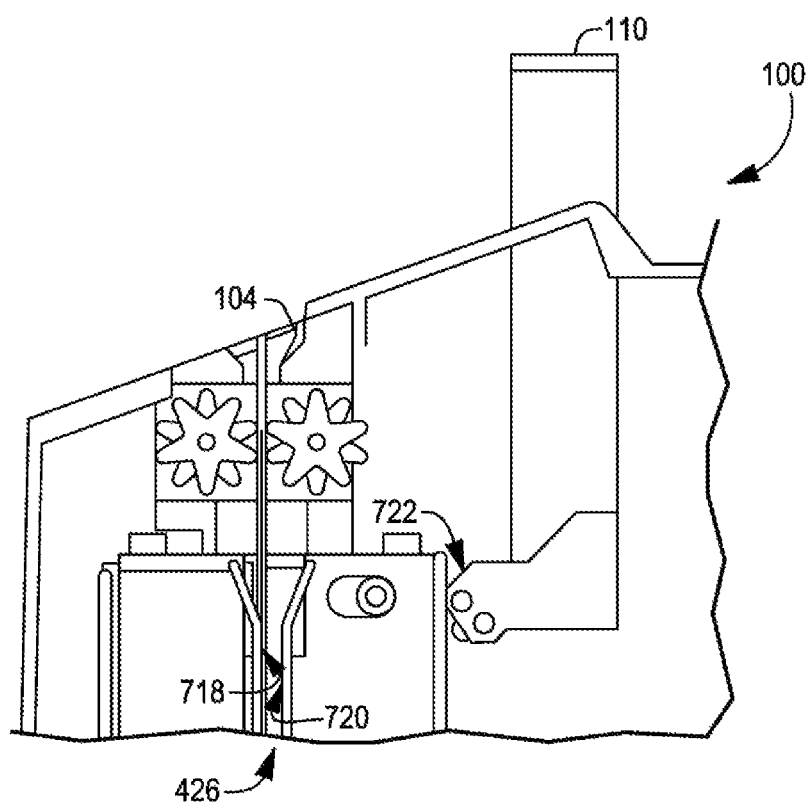
FIGS. 7A-7C are cross-sectional views of the dispenser of FIG. 1A illustrating an example lever and example opposing surfaces of a clamp for securing the flexible package in the dispenser.
Figure 7B:
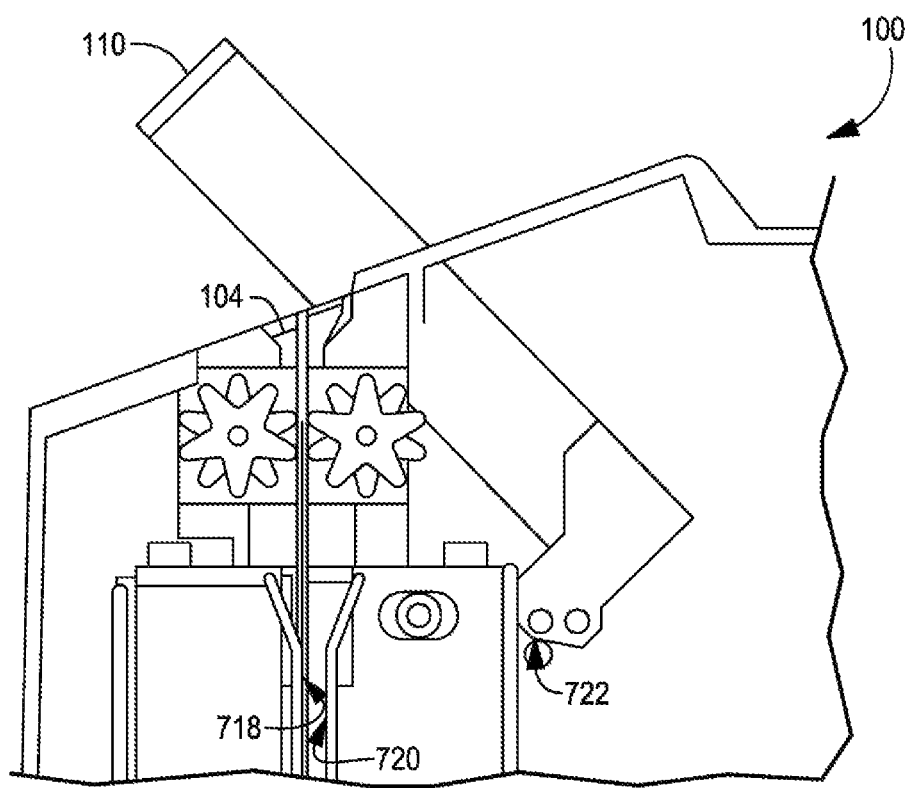
Figure 7C:
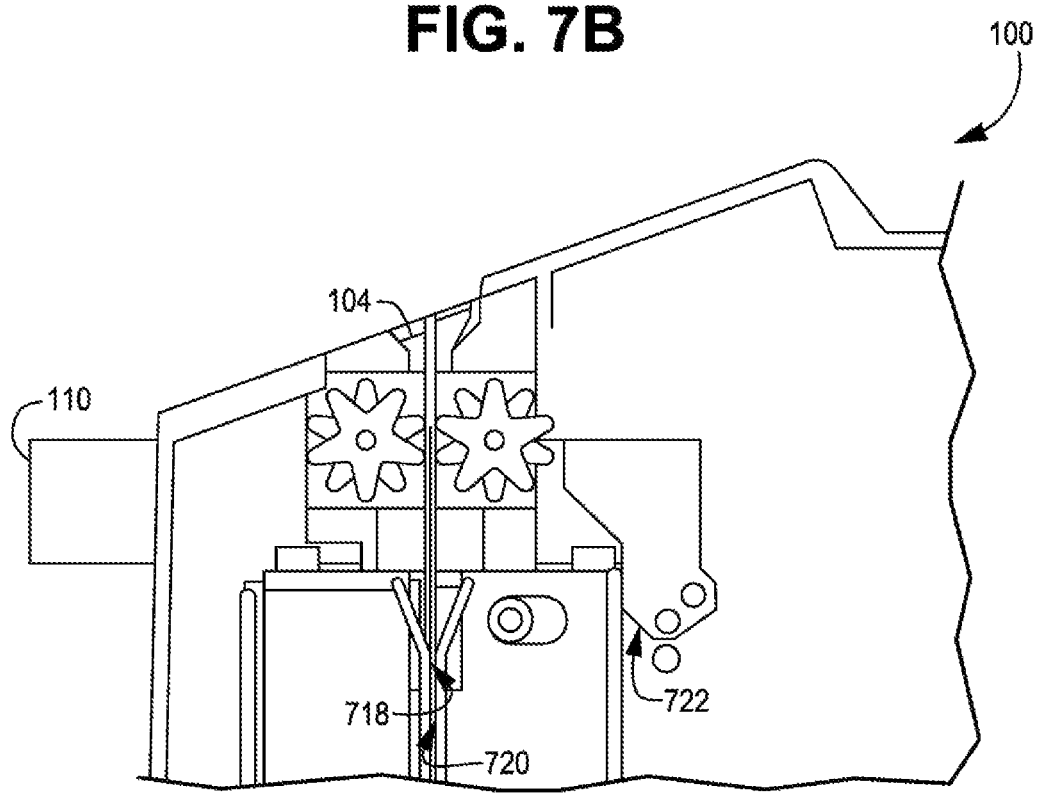

The respective sets of opposing surfaces of clamps/guides 424, 426 can be configured to come together to engage the longitudinal seals 206-1, 206-2 in any suitable manner. In one embodiment, the opposing surfaces can be mechanically coupled to a handle or lever 110 provided on the dispenser 100 such that movement or pivoting of the lever 110 moves one or both opposing surfaces into engagement with each other and/or package 102 within clamps/guides 424, 426. FIGS. 7A-7C are cross-sectional views of the dispenser 100 illustrating an example of such a lever 110 operably disposed relative to clamp 426, comprising opposing surfaces 718, 720. Although FIGS. 7A-7C illustrate only clamp 426, it is to be understood that clamp 424 may also be provided and would desirably be cooperatively arranged within dispenser 100 to engage with the opposite longitudinal seal of package 102.

One end of the lever 110 extends out of the external case of the dispenser 100 allowing a user to grasp and move the lever 110. The other end of the lever 100 includes a cam 722 disposed to slide against a surface attached to the second opposing surface 720 of the clamp 426. As the lever 110 pivots, the cam 722 translates the motion of the lever 110 into linear motion and pushes against the surface that is attached to the second opposing surface 720. The second opposing surface 720 is thus moved towards the first opposing surface 718. The cam 722 is configured such that when the lever 110 is fully pivoted, the second opposing surface 720 is moved towards the first opposing surface 718 such that the second longitudinal seal 2061 can be secured therebetween. When lever 110 is fully pivoted, the removable front portion of outer case 108 is prevented from being removed, and so in essence, the rotation of lever 110 prevents access to the internal chamber of dispenser 100 when the dispenser is operating.

In an example, the second opposing surface 720 is disposed at least 3 mm, or at least 5 mm apart from the first opposing surface 718 while the clamp is "open", that is, while the clamp/guide 426 is not securing the longitudinal seals 206-1 of the package 102 (e.g., while the first and second opposing surfaces 718, 720 are acting as guides). FIG. 7A shows the lever 110 and opposing surfaces 718, 720 in the open position. FIG. 7B shows the lever 110 and opposing surfaces 718, 720 in a partially closed position. FIG. 7C shows the lever 110 and opposing surfaces 718, 720 in a closed position, which is the position in which the opposing surfaces 718, 720 secure the longitudinal seal 206-1 therebetween.

The lever 110, opposing surfaces 718, 720, and cam 722 on the other side of the dispenser 100 can be the same as the lever 110, opposing surfaces 718, 720, and cam 722 described above and shown in FIGS. 7A-7C. The ends of each lever 110 extend out of the external case of the dispenser 100 and are connected together so that lever 110 operates on clamps 424 and 426 simultaneously.

Once sensor 612 determines that package 102 is in a dispensing position, the dispenser 100 can be configured to provide notification of the same to a user. The user, in response to receiving the notification, can pivot the lever(s) 716, thereby securing the package 102 with the clamps 424, 426. The notification to the user can be provided in any suitable manner, e.g., via status indicator 112, or other visible electronic message provided on the outer case of dispenser 100, or via an audible cue or verbal message.

In other embodiments, the opposing surfaces of the clamps can be brought together in other manners, such as by one or more electronic actuators in the dispenser 100, that can act in response to the communication of information from sensor 612, or an additional sensor, or be caused to act by a user in response to a notification provided by status indicator 112 of dispenser 100.

In the embodiments shown herein, the package 102 is held in the dispenser 100 in an upright orientation. As used herein an "upright orientation" refers to an orientation of a package 102 having a generally planar geometry, in which the shortest dimension (i.e., the Z axis) of the package 102 is oriented horizontally. In other examples, other orientations can be used. With the package 102 held in an upright orientation, the product in the package 102 typically may fall or settle to an opening region 410 of the enclosed space 202. Opening the package 102 may thus cause an opener 903 of the dispenser 100 to come into contact with any product in the opening region 410.

Further, the act of opening the package 102, can create forces that may direct any product exiting the package 102 during creation of the opening in an undesirable direction. Thus, any product in proximity to the opening, i.e., within opening region 410, during its creation can be splattered around inside the dispenser 100. In order to reduce or eliminate splatter within the device, and/or contact between the opener 903 and the product, product may initially be moved away from the opening region 410.

As used herein, the phrase "opening region" indicates a portion of the enclosed space 202 that is in proximity to a current or intended future opening into that enclosed space 202 of the enclosed space 202 and more generally of the package 102. Ideally, little or no product is present in the opening region 410 of the enclosed space 202 when the opening is created. Minimizing contact between the opener and the product within the package can assist maintaining sanitary conditions within the dispenser 100 and reduce required cleaning and/or maintenance of dispenser 100.

To move product out of the opening region 410 of the enclosed space 202, the dispenser 100 can press the outside of the enclosed space 202 of the flexible package 102 to move product within the enclosed space 202 by pressing a portion of the opposing walls defining the enclosed space 202 inward toward and against each other. In particular, the dispenser 100 can compress one portion of the enclosed space 202 without corresponding pressure on other portions in order to push product (e.g., a substantial portion of the product) that is in the compressed portion from the compressed portion into the other, non-compressed portions of the enclosed space 202.

In the embodiment of the dispenser 100 shown in FIGS. 8A-8C, opposing surfaces 602, 604 are configured to compress the enclosed space 202 of the package 102, thereby moving the food product therewithin. More specifically, to move product out of the opening region 410, dispenser 100 brings opposing surfaces 602, 604 together with the package 102 disposed between the two opposing surfaces 602, 604.

In an example, the opposing surfaces 602, 604 can be configured to compress the opening region 410 of the package 102 in a progressive manner, i.e., opposing surfaces 602, 604 can be configured to move from one position to another relative to the flexible package, while compressing the flexible package therebetween, thereby incrementally compressing adjacent portions of the opening region 410. The progressive compression of the package 102 can move in a direction parallel to the longitudinal axis (the X-axis) of the package 102. In those embodiments wherein clamps are used to secure the package in a dispensing position, this progressive compression will occur in the area 406 in between the areas 402, 404 pressed by the clamps 208, 209 (FIG. 4C).

If an additional clamp, or other securing means, has been used across a horizontal edge of the package 102 in order to secure the package during opening, such clamp may be used to deposit the removed portion of the package 102 in a desired area, and/or removed from the opening region 410 prior to creation of the opening. Those embodiments wherein horizontal clamps are not used are advantageous in that progressive compression of the package need not be encumbered thereby. In such embodiments, the opposing surfaces 602, 604 can progressively compress package 102 across substantially the entirety of the package 102, i.e., from one end of the package to the other, thereby assisting in more complete removal of the product from the opening area 410 and ultimately, from the package 102.

Desirably, the opposing surfaces 602, 604 can have a length such that they extend from near the seal on one edge to near the seal on the other edge. Such a configuration minimizes and desirably substantially prevents product from flowing around the opposing surfaces as they progressively compress the opening region 410. Desirably, the opposing surfaces 602, 604 can have a length such that they span at least 90%, or at least 95%, or at least 97% of the distance across the enclosed space 202 of the package 102. Stated another way, the opposing surfaces 602, 604 can have a dimension such that they can compress a region from within 10 mm, or within 5 mm, or within 3 mm of one edge to within 10 mm, or within 5 mm, or within 3 mm of the opposing edge of the enclosed space 202 (e.g., across the Y dimension).

In some embodiments, opposing surfaces 602, 604 may desirably span the entire distance across the enclosed space 202, such that the opposing surfaces 602, 604 extend to one edge 206-1 of the enclosed space 202 and to opposing edge 206-2 of the enclosed space 202, leaving only sufficient clearance between guides/clamps 424, 426 and opposing surfaces 602, 604 for opposing surfaces 602, 604 to operate. FIG. 4C is a front view of the package 102 showing the areas 402 of the package 102 that are engaged by the clamps 424, 426 and the area 406 of the package 102 considered to be operatively disposed to be compressed via opposing surfaces 602, 604. The area 406 in between the areas 402 engaged by the clamps 424, 426 desirably corresponds generally to the enclosed space 202 of the package 102.

FIG. 8A is a cross-sectional view of the dispenser 100 showing one embodiment of a pair of opposing surfaces 602, 604, including rollers 606, 608. Dispenser 100 is configured to compress package 102, and thus enclosed space 202, between opposing surfaces 602 and 604 to move product out of the opening region 410 and generally upwards, and to then create an opening in package 102.

As shown in FIG. 8A, surfaces 602, 604 can be brought together at or near a lower edge of package 102 to compress package 102 and thus enclosed space 202. Opposing surfaces are then moved upwards, or otherwise away from the opening region 410, as shown in FIG. 8B to progressively compress the package 102 and displace the product therein upwards. FIG. 8B is a cross-sectional view of the dispenser 100 showing an example position of the opposing surfaces 602, 604 after they have moved the product upwards within the enclosed space 202 and out of the opening region 410. If desired, the dispenser 100 can be operated to maintain the compression on the package 102, after pushing product out of the opening region 410, and before or during opening of the package 102.

In the embodiment of the dispenser 100 illustrated in FIGS. 8A-8B, the first opposing surface 602 is an outer surface of a first roller 606 and the second opposing surface 604 is an outer surface of a second roller 608. Each roller 606, 608 is configured to rotate (roll) freely about an axis of rotation, such that the opposing surface 602, 604 defined by the roller 606, 608 can roll along the outer surface of the package 102. The first roller 606 is disposed on a first side of the package 102 and the second roller 608 is disposed on a second side of the package 102, wherein the second side of the package 102 is reverse of the first side. Thus, the first roller 606 and its surface 602 are opposite the second roller 608 and its second surface 604, with the package 102 disposed between the two rollers 606, 608.

Each roller 606, 608 can have an axial length (parallel to an axis of rotation of the roller 606, 608) equal to the length of the opposing surfaces 602, 604. That is, each roller 606, 608 can have an axial length that extends at least 90% of the distance from one edge of the enclosed space 202 to the opposing edge of the enclosed space 202 at the location(s) of the package 102 that they contact. Although a single roller 606, 608 is shown in FIGS. 8A and 8B on each side of the package 102, it should be evident that multiple rollers could be used in place of each single roller 606, 608 could instead be multiple rollers could be used.

In an alternative example, the axis of rotation of the rollers 606, 608 is stationary. In such an alternative example, the rollers 606, 608 are disposed such that the outer surfaces thereof are disposed parallel to one another and near one another. The rollers 606, 608 are configured to rotate (roll) as the package 102 is moved between the rollers 606, 608. In such an alternative example, the package 102 can be moved relative to the rollers 606, 608 such that the enclosed space and the product therewithin is compressed thereby.

The opposing surfaces 602, 604 can have other configurations. For example, the first opposing surface can be on a roller on one side of the package 102 and the second opposing surface can be a flat surface on the opposite side of the package 102. To compress the package 102 in such an example, the dispenser 100 can be configured to bring the roller together with the flat surface (e.g., by moving one or both of the roller and the flat surface) such that the package 102 is compressed between the roller and the desired starting location of the compression. The dispenser 100 can then be configured to hold the flat surface stationary and move the roller along the flat surface with the package 102 therebetween, thereby compressing the package 102.

In yet another embodiment, the opposing surfaces 602, 604 can be elongated flat surfaces, and the dispenser 100 can be configured to slide the elongated flat surfaces along the opposite sides of the package 102 to progressively move product out of the opening region 410. In such an example, the opposing surfaces 602, 604 can have a low friction surface to aid in sliding the surface along the package 102.

In still another example, the opposing surfaces can be flat surfaces and the dispenser 100 can be configured to compress the package 102 by bringing the two flat surfaces together such that one edge of each of the flat surfaces comes together initially and the flat surfaces pivot towards each other to allow the remaining portions of the flat surfaces to come together. The pivoting action allows the flat surfaces to come together with one end first such that the flat surfaces can progressively compress the package 102 as they pivot and come fully together. In such an example, the flat surfaces would desirably be of a size approximately equivalent to the size of the desired opening region 410 so that when pressed together, the flat surfaces would act to move product out the opening region 410. In such an embodiment, one or both of the flat surfaces can include an opening to allow an opener to create an opening in the package.

Once the opposing surfaces 602, 604 have moved product upward in the package 102, away from the opening region 410 of the enclosed space 202, the dispenser 100 can open the package 102. Once this opening is created, product that is in the enclosed space 202 can exit, or be caused to exit, the package 102.

Figure 9A:
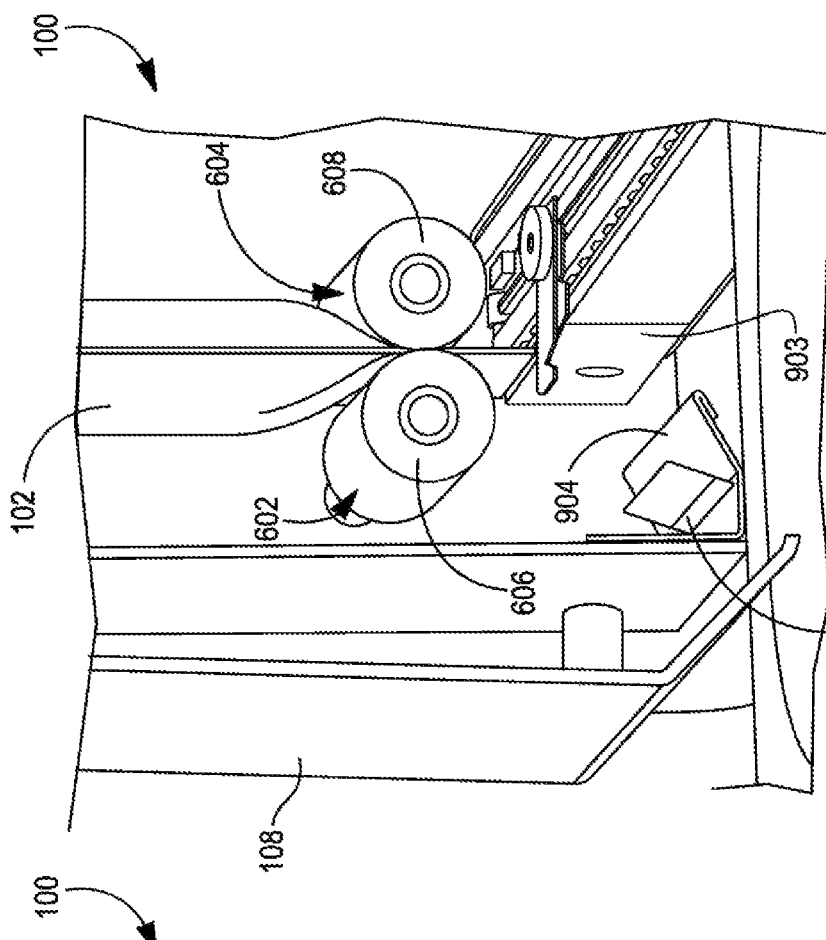
FIG. 9A is a cross-sectional view of the dispenser of FIG. 8B showing one embodiment of an opener positioned to create an opening in the flexible package.
Figure 9B:
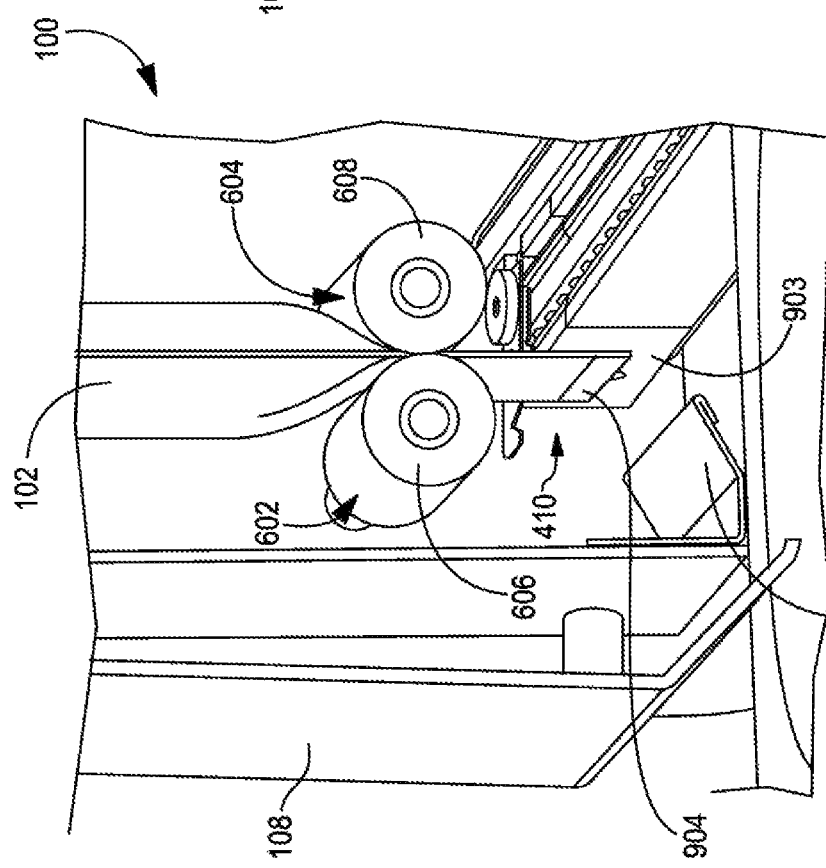
FIG. 9B is a cross-sectional view of the dispenser of FIG. 8B showing the flexible package after a lower portion thereof has been removed by the opener.
Figure 9C:
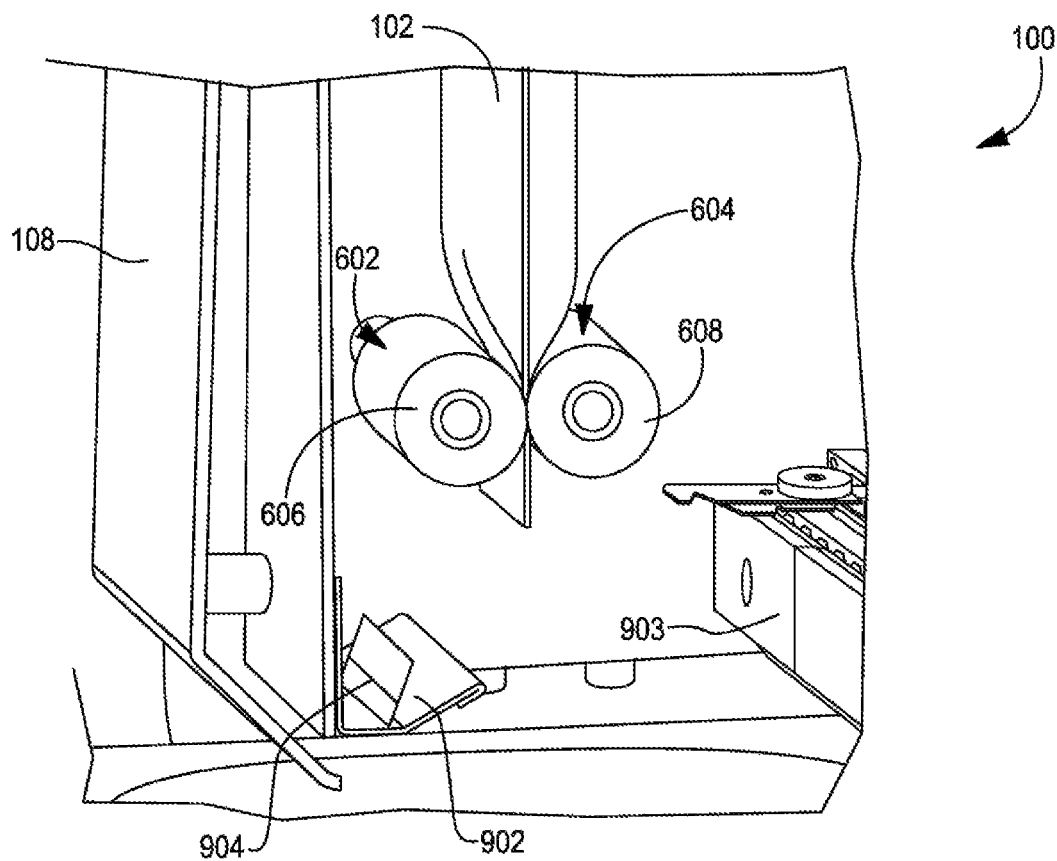
FIG. 9C is a cross-sectional view of the dispenser of FIG. 8B showing the opener positioned away from the flexible package after creating the opening therein.

FIGS. 9A-C are cross-sectional views of the dispenser 100, showing one embodiment of an opener 903 creating an opening into the opening region 410 of enclosed space 202 of the package 102. In the embodiment shown, the opener 903 creates the opening by cutting off a distal portion 904 of the opening region 410 of the package 102. The opener 903 is configured to cut through both walls of the package 102, at a location such that the cut extends into the enclosed space 202. This advantageously creates an opening the full width of the enclosed space 202 within the opening region 410 and separates the distal portion 904 from a remainder of the package 102. The opening is desirably is above a lower edge of the enclosed space 202, and may further desirably be created by a linear cut across the package 102.

In some embodiments, dispenser 100 may desirably be provided with a tray 902 to catch the distal portion 904 of package 102 removed to create the opening. Such embodiments may advantageously assist in the complete removal and accurate placement of product removed from package 102 by removing any potential impediment to such removal and placement.

As shown, the catch tray 902 can be a generally planar surface that extends at an angle toward the vertical plane defined by the package 102 and is disposed below a lower edge of the package 102 while the package 102 is in the dispensing position. The catch tray 902 may be moving or stationary. As shown in FIG. 10A, the catch tray 902 is stationary and does not move relative to the dispenser 100 as a whole. If desired, the catch tray can be caused to move to be within the vertical plane of the package during removal of the distal portion 904 of package 102, and once the distal portion 904 has been received therein, be moved to outside of the vertical plan of the package. In the embodiment shown in FIGS. 9A-9C, the catch tray 902 is nonmoving and is disposed out of the vertical plane defined by the package 102, such that when the product exits the package 102 out of the opening, the product passes by the catch tray 902 and into the serving receptacle 106.

The opener 903 is configured to direct the cut-off distal portion 904 out of the vertical plane defined by the package 102, such that the cut-off distal portion 904 falls onto a catch tray 902 of the dispenser 100. FIGS. 9B and 9C show the package 102 after the opener 903 of the dispenser 100 has cut the package to create an opening. Opener 903 does so by first bending the lower portion of the package 102, not constrained by guides/clamps 424, 426 and opposing surfaces 602, 604, during cutting to be out of the vertical plane of the package 102. In particular, the lower portion of the package 102 is bent to be disposed at an angle relative to the vertical plane. While the lower portion of the package 102 is bent at this angle, the opener 903 cuts off the distal portion 904 of package 102.

Opener 903 can be used to move or bend the distal portion 904 out of the vertical plane of the package at the same time the opener 903 is cutting the distal portion 904. As a result of a force being applied to distal portion 904 as it is being cut-off, distal portion 904 falls outside of the vertical plane of the package 102. And so, the catch tray 902 can be disposed out of the vertical plane of the package 102, but still receive cut-off portion 904, while yet reducing the likelihood of product falling into the catch tray 902 when the product exits the package 102.

FIG. 9C illustrates a cross-sectional view of the dispenser 100 after the opener 903 has created the opening and moved away from the package 102. As shown, the compression on the package 102 can be maintained until after the opener 903 has moved away from the package 102. This keeps the opener 903 out of the path of the product until after the compression is released by the opposing surfaces 602, 604, which allows the product in the enclosed space 202 to exit out of the opening without contacting the opener 903.

Figure 10:
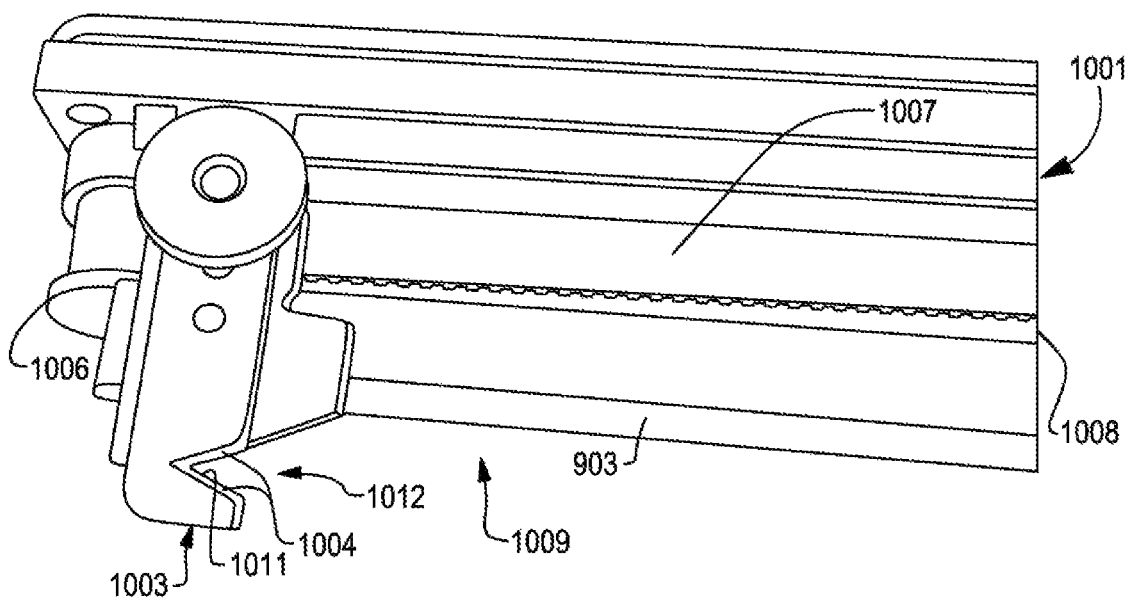
FIG. 10 is a cut-away top view of the embodiment of the opener of FIG. 9A showing an exemplary blade for creating the opening in the flexible package.

FIG. 10 is a top view of the opener 903 shown in FIGS. 9A-9C. The opener 903 can include support 1001 having a contact surface/stop (510, not shown in FIG. 11) and a blade 1003 mounted thereon. When the opener 903 is in its cutting position adjacent the package 102, a first side 1009 of the support 1001 is adjacent the package 102, i.e., is opposite and aligned with a side wall of the package 102. The blade 1003 includes a v-shaped notch 1012 having sharp edges 1004 disposed on both inner edges thereof. Sharp edges 1004 are configured to cut through the package 102 as the sharp edges 1004 contact the package 102.

The opener 903 also includes a contact surface 1011 disposed adjacent the blade 1003. The contact surface 1011 is disposed to contact the package 102 prior to the package 102 contacting the sharp edges 1004 of the blade 1003. The contact surface 1011 is a blunt surface that is disposed at an angle with respect to the vertical plane defined by the package 102. The angle of disposition of the contact surface 1011 is configured to direct the edge of the package 102 into the V-shaped notch 1012 of the blade 1103. That is, as the blade 1003 and contact surface 1011 move across the package 102, the package 102 initially contacts the contact surface 1011 which directs the package 102 into the V-shaped notch 1012 of the blade 1003.

The contact surface 1011 moves with the blade 1003 across the package 102, e.g., as by action of belt 1007. The contact surface 1011 and the blade 1003 move relative to the support 1001, from a first end 1006 to a second end 1008 thereof. Prior to cutting into the package 102, the contact surface 1011 and the blade 1003 are disposed at the first end 1006 of the support 1001, adjacent a vertical edge of the package 102. As the blade 1003 moves across the support 1001 to second end 1008, the contact surface 1011 directs the edge of the package 102 into the V-shaped notch 1012 where the edge of the package 102 is forced edgewise against sharp edges 1004, whereby the package 102 is cut.

In addition to directing the package 102 into the notch 1012, the contact surface 1011 is used to bend the lower portion of the package 102 out of the vertical plane while it is cut by the blade 1003. To accomplish this, the apex of the V-shaped notch 1012 is off-set from the vertical plane defined by the package 102 such that the edge of the package 102 is aligned along the Y-axis with a position that is a distance (e.g., 1-5 cm) from the apex of the V-shaped notch 1012. The contact surface 1011, however, extends through the vertical plane defined by the package 102 and is angled relative to that vertical plane. As the contact surface 1011 and blade 1003 move toward the package 102, the contact surface 1011 contacts the package 102, bending the distal portion 1004 of the package 102 out of the vertical plane, toward the apex of the V-shaped notch 1012. While the distal portion 1004 of the package 102 is being bent out of the vertical plane by the contact surface 1011, it is cut by the blade 1003.

By bending the lower portion of the package 102 out of the vertical plane, the falling path of the distal portion 904 is moved out of the vertical plane of the package 102. Moreover, by having the distal portion 904 cut off while, or immediately after being pushed towards the apex of the V-shaped notch 1012, the momentum acquired by the distal portion 904 of the package 102 during pushing by the contact surface 1011 can be maintained after the distal portion 904 is cut-off. This momentum can cause the distal portion 904 to fall along a path that brings the distal portion 904 further away from the vertical plane of the package 102. This enables the catch tray 1002 to be correspondingly disposed further away from the vertical plane of the package 102.

Though FIGS. 9-10 show a particular configuration of the opener, comprising a blade, the opener can be configured to create an opening in other manners such as by cutting with a single knife-like blade, piercing with a pin or needle, cutting with an air knife, or any other cutting mechanism known to those of ordinary skill in the art. In certain desirable embodiments, the opener employs a contactless cutter such as an air knife or laser.

Though any embodiment of the opener 903 that operates via contact with the package 102 may desirably be accessible for periodic cleaning, maintenance or sharpening, dispenser 100 may desirably also include any of a number of safety mechanisms to ensure that opener 903 is not accessed or contacted inadvertently by a user. Such mechanisms could include a retraction mechanism that acts to retract opener 903 to a non-accessible inner area of dispenser 100, a mechanism that sheaths opener 903 when not in use, or any other known safety mechanism. Any such safety mechanism can be in communication with sensor 612 and/or processor so that the safety mechanism is engaged when the interior of the dispenser 100 is accessed.

In some examples, the dispenser 100 can be configured to create the opening in other locations or to create an opening having other shapes or sizes. For example, the dispenser 100 can be configured to create an opening by creating a discontinuity in only one wall of the package 102 in the opening region 310. Such an example may be used when the lower edge of the enclosed space is defined by a fold in a sheet of material rather than a seal, or when the lower region of the enclosed space is defined by a gusset, as in a stand-up pouch. In such implementations, the lower edge/side of the enclosed space 202 is defined by a single wall of material, and the dispenser 100 can be configured to create an opening (e.g., a downward facing opening) in the bottom of the package 102 through that single wall of material.

Whatever is used to create the opening and/or however the opening is created, it can be desirable to have the opening extend the entire width of the package 102 as the same may assist in removing substantially all of the product from package 102, particularly when the product therein has a viscosity similar to a paste or gel. However, the dispenser 100 can be configured to create an opening that is less than the entire width of the enclosed space 202.

Figure 11C:
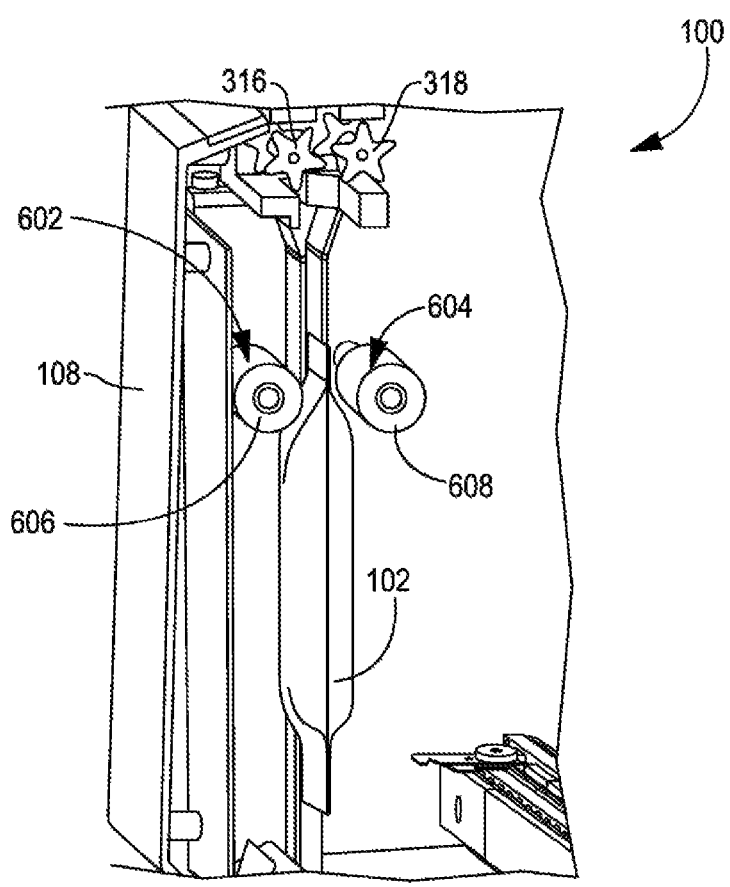
FIG. 11C is a cross-sectional view of the dispenser of FIG. 11A showing the opposing surfaces separated and in a position near the upper edge of the flexible package.

FIGS. 11A-11C illustrate the movement of the opposing surfaces 602, 604 from the lower end of package 102 to an upper end thereof after opening of the package 102, followed by the progressive compression of the package 102 in a downward motion by opposing surfaces 602, 604. More particularly, FIG. 11A is a cross-sectional view of the dispenser 100, showing the opposing surfaces 602, 604 releasing the package 102 after the opening is created. Once the opener 1003 is moved away from the opening, the dispenser 100 releases the compression on the package 102 by separating the opposing surfaces 602, 604.

FIGS. 11A-11C show the sides of the package 102 remaining close together after distal portion 904 is removed. This may occur due to air pressure within the package, stickiness of the product within the package, or a combination of these. It is to be understood, however, that a certain amount of product may dispense from package 102 after the opening is created, and before pressure is applied thereto, due to the action of gravity.

In any case, the dispenser 100 progressively compresses the package 102 from a top edge thereof toward the newly created opening. In the embodiment shown in FIG. 11A, the same opposing surfaces 602, 604 used for compressing package 102 to move product out of the opening region 410 prior to creating the opening, are used to compress package 102 to dispense product out of the opened package 102. This need not necessarily be the case, however, and additional opposing surfaces could be provided in dispenser 100 and used for this purpose.

In such an alternative example, the other opposing surfaces can be moved to a position on the package 102 distal to the opening as described above, or they may be provided in such a position. Such other opposing surfaces can be any suitable opposing surface including any of the opposing surfaces listed herein for opposing surfaces 602, 604.

As shown in FIG. 11A, after the opening in the package 102 is created, the opposing surfaces 602, 604 separate from one another. The separated opposing surfaces 602, 604 then move relative to the package 102, such that opposing surfaces 602, 604 are closer to the edge of the package 102 opposite the opening. FIG. 11B is a cross-sectional view of the dispenser 100 showing the opposing surfaces 602, 604 in a separated position during movement from the lower portion of the package 102 to the upper edge of the package 102. FIG. 11C is a cross-sectional view of the dispenser 100 showing the opposing surfaces 602, 604 in a separated position near the upper edge of the package 102.

With the opposing surfaces 602, 604 at a location of the package distal to the opening, the opposing surfaces 602, 604 can be brought together to compress the package 102 therebetween. In an example, the opposing surfaces 602, 604 are brought together at, or outside of, (e.g., above) the upper edge of the enclosed space 202 of the package 102. For example, the opposing surfaces 602, 604 can initially be brought together at the upper seal of the package 102. Once the opposing surfaces 602, 604 are brought together, the dispenser 100 can move the opposing surfaces 602, 604 along (e.g., down) the package 102, while holding the opposing surfaces 602, 604 together to push the product in the enclosed space 202 towards the opening.

For the example package 102 geometry and dimensions illustrated in FIGS. 2A-2C, the outer surfaces of the opposing surfaces 602, 604 can be configured to be at least 10 mm apart during non-compressive travel from the opening (e.g., bottom) region of the package 102 to the opposite (e.g., top) region of the package 102. During compression, the outer surfaces of the opposing surfaces 602, 604 can be configured to be 3 mm or less from each other, to apply sufficient force for compressing the package 102 and dispensing the product out of the package 102. The opposing surfaces 602, 604, of course, are some distance away from each other during compression due to the thickness of the walls of the package 102. For packages with geometries and/or dimensions other than the example shown in FIGS. 2A-2C, other appropriate distances between the surfaces of the opposing surfaces 602, 604 can be used.

Figure 12C:
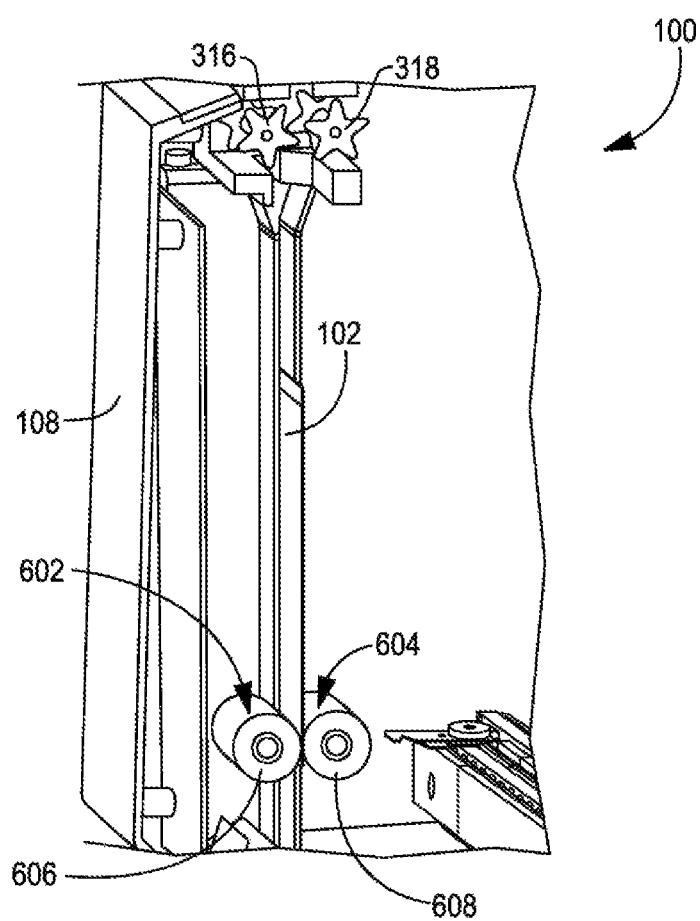
FIG. 12C is a cross-sectional view of the dispenser of FIG. 11C showing the opposing surfaces applying pressure to the flexible package and in a position near the opening thereof.

FIGS. 12A-12C are cross-sectional views of the dispenser 100 as the opposing surfaces 602, 604 are compressively moving the product toward and out of the newly created opening. FIG. 12A shows the opposing surfaces 602, 604 in a position near the upper edge of the package 102. FIG. 12B shows the opposing surfaces 602, 604 in a position near the middle of the package 102. FIG. 12C shows the opposing surfaces 602, 604 in a position near the lower edge of the package 102. The dispenser 100 can be configured to move the opposing surfaces 602, 604 in this manner all the way along the package from the edge of the package 102 distal to the opening to the opening.

Once the opposing surfaces 602, 604 arrive at or near the opening, the opposing surfaces 602, 604 will have pushed substantially all the product in the enclosed space 202 from the package 102. In an example, the opposing surfaces 602, 604 can be configured to stop movement along the package 102 near, but before reaching the opening of the package 102. If the opposing surfaces 602, 604 were to travel past or across the opening, they might come into contact with product at the opening. Stopping the opposing surfaces 602, 604 before they reach the opening reduces the likelihood of contact with product, which increases the cleanliness of the opposing surfaces 602, 604.

Figure 13:
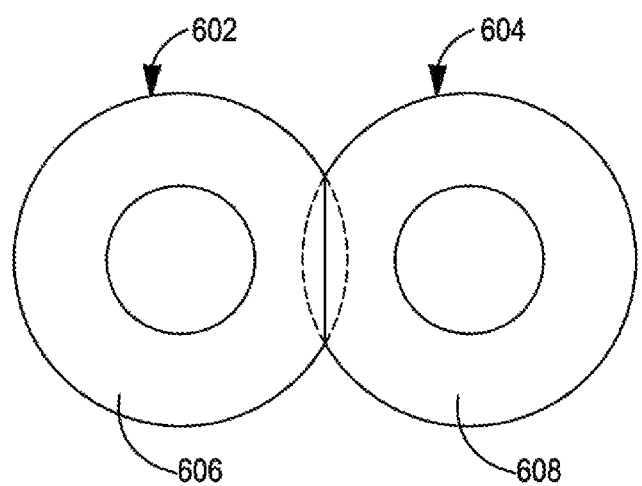
FIG. 13 is a cross-sectional view of the opposing surfaces of FIG. 5A brought together.

FIG. 13 is a cross-sectional view of example rollers 606, 608 in their brought together position. For simplicity, the package 102 is not shown in FIG. 13, but it should be understood that during compression the package 102 is disposed between the two rollers 606, 608. As shown, the pressure applied to the opposing surfaces 602, 604 and the compressibility of each roller 606, 608 can increase the contact area between the rollers 606, 608 and the package 102, and provide some tolerance in the positioning of the opposing surfaces 602, 604 and rollers 606, 608.

The opposing surfaces 602, 604 can be composed of any suitable material. In an example, the opposing surfaces 602, 604 are composed at least partially of an elastic material that is configured to compress when the opposing surfaces 602, 604 are brought together. For example, the opposing surfaces 602, 604 can be composed of a thick and textured tape, which provides elasticity as well as grip.

Figure 14:
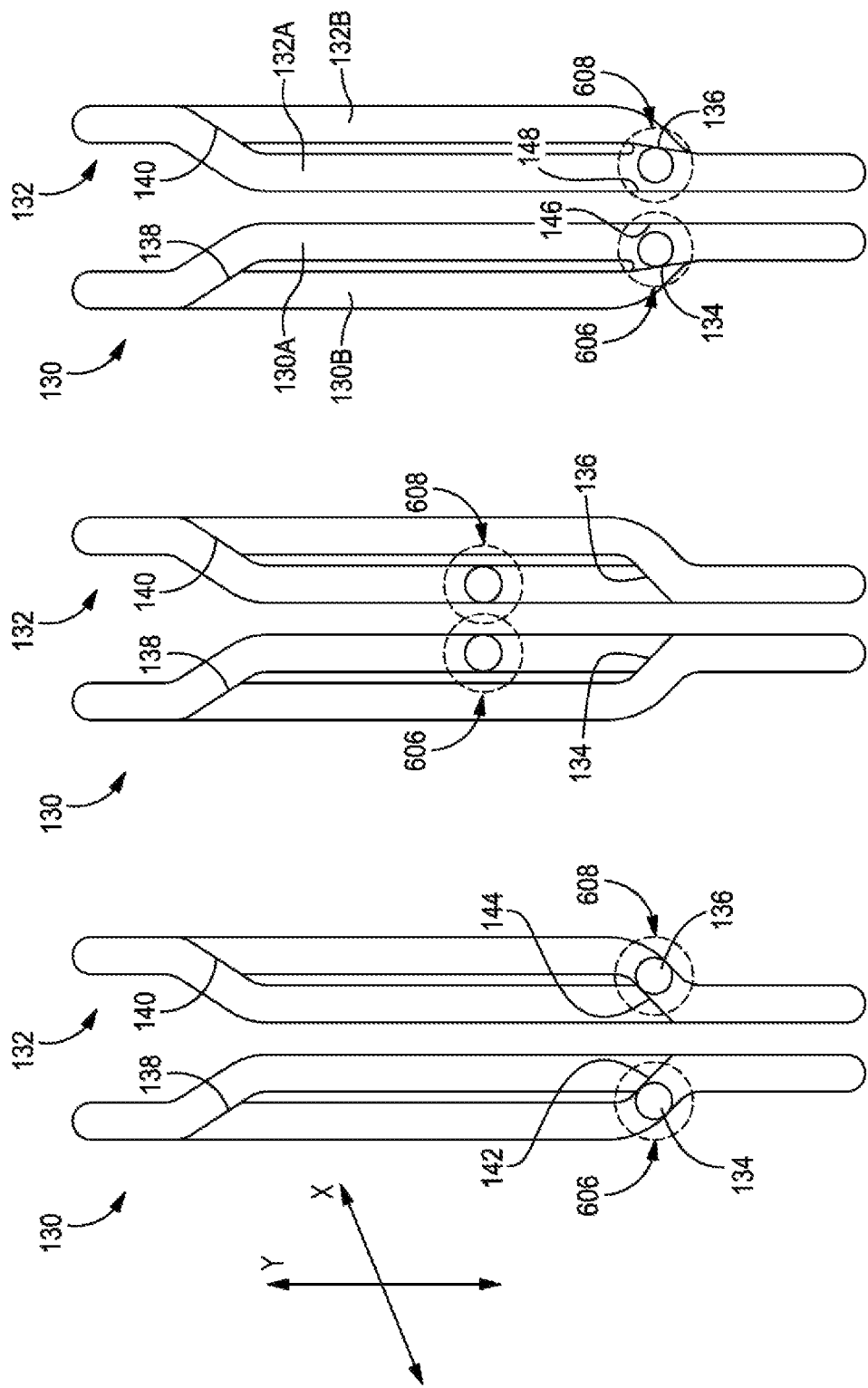
FIGS. 14A, 14B, and 14C are cross-sectional views of one embodiment of a guiding mechanism for guiding the movement of the opposing surfaces of FIG. 13 while applying pressure to a flexible package.

FIGS. 14A, 14B, and 14C are cross-sectional views of one embodiment of a mechanism for guiding the movement of opposing surfaces 602, 604 when compressing package 102, in those embodiments wherein the opposing surfaces are rollers 606, 608. As shown, the example guiding mechanism includes rails 130, 132, and pins 134, 136. Each roller 606, 608 can have a pin 134, 136 extending outward from opposite ends about the axis of rotation. Thus, the first roller 606 can include a first pin 134 extending out of a first end about the axis of rotation and a second pin (not shown) extending out of a second, opposite, end about the axis of rotation. In some examples, the first pin 134 can be connected to the second pin (not shown) internally through the roller 606. Similarly, the second roller 608 can include a first pin 136 extending out of a first end about the axis of rotation and a second pin (not shown) extending out of a second, opposite, end about the axis of rotation.

Each pin 134, 136 can be engaged in between sets of rails 130, 132. The rails 130, 132 guide the motion of the respective rollers 606, 608 by allowing the pins 134, 136 to rotate between the sets of rails 130, 132, while preventing movement in other directions. Moreover, opposing rails of each set, i.e., rails on opposing ends of rollers 606, 608, provide a path that is a mirror image of the path provided by its opposing rail.

FIGS. 14A, 14B, and 14C illustrate one rail 130 for the first roller 606 and one rail 132 for the second roller 608. Rail 130 guides the pin 134, which is attached to a first end of the first roller 606. A third rail (not shown) is a mirror image of rail 130 and guides a pin attached to a second end of the first roller 606. Rail 132 guides the pin 136, which is attached to a first end of the second roller 608. A fourth rail (also not shown) is a mirror image of rail 132 and guides a pin attached to a second end of the second roller 608.

The rails 130, 132 include an inner track 130A, 132A and an outer track 130B, 132B. When the rollers 606, 608 are following the outer tracks 130B, 132B the rollers 606, 608 are kept separated. When the rollers 606,608 are following the inner tracks 130A, 132A the rollers 606, 608 are held together. Desirably, the longest dimension of rails 130, 132 and/or inner tracks 130A, 132A, i.e., the vertical, y-dimension as arranged within dispenser 100, is at least equal to the portion of the x-dimension (as shown in FIG. 2B) of package 102 desirably compressed. The rails 130, 132 also include two common areas that extend from each end of each track 130A, 130B, 132A, 132B where the rollers 606, 608 are directed to move between the inner 130A, 132A and outer tracks 130B, 132B.

Spring-loaded members 138, 140 are disposed at the top junction between the inner 130A, 132A and outer tracks 130B, 132B of each rail 130, 132 to switch the corresponding pin 134, 136 for the respective roller 606, 608 between the outer track 130B, 132B and the inner track 130A, 132A. Spring-loaded members 142, 144 are disposed at the bottom junction between the inner/outer tracks of each rail 130, 132 to switch the corresponding pin 134, 136 between the inner track and outer track. That is, spring-loaded member 138 is provided at the top junction of inner and outer tracks 130A and 130B of rail 130, and spring-loaded member 142 is provided at the bottom junction of inner and outer tracks 130A, 130B of rail 130. Similarly, spring-loaded member 140 is provided at the top junction of inner and outer tracks 132A, 132B of rail 132 and spring-loaded member 144 is provided at the bottom junction of inner and outer tracks 132A, 132B of rail 132.

Spring loaded members 138, 140, 142, 144 are configured to be held in a first position via spring-load. The first position is configured to direct the corresponding pin 134, 136 as it moves within the corresponding common area on the corresponding end of the corresponding rail to the outer or inner track respectively. In particular, each spring-loaded member 138, 140, 142, 144 is configured to direct pins 134, 136 into the track that is different than the track on which the pin 134, 136 entered the common area. Thus, the pins 134, 136 are directed back and forth between the inner tracks 130A, 132A and the outer tracks 130B, 132B.

The spring-loaded members 138, 140, 142, 144 can be configured to flex out of the way as the pins 134, 136 contact them when the pins exit the track 130A, 130B, 132A, 132B which the spring-loaded member 138, 140, 142, 144 extends across, allowing the corresponding pin 134, 136 to move into the common area of the rails 130, 132. Once the corresponding pin 134, 136 has traveled past the corresponding spring-loaded member 138, 140, 142, 144 the spring-loaded member 138, 140, 142, 144 springs back across the track that the pin 134, 136 just came from thus directing the pin 134, 136 onto the other track.

Advantageously, the bottom junction spring-loaded member 142, 144 that flexes out of the way as its corresponding pin 134, 136 exits the inner track, can also act to hold or press the pin 134, 136 in a position of the bottom junction that allows rollers 606, 608 to maintain pressure against a package (not shown in FIGS. 14A-14C) therebetween. That is, and as is shown in FIG. 14C, spring-loaded members 142 and 144 act to hold pins 134, 136 against or near an inner surface 146, 148 of rails 130, 132. Spring loaded members 142, 144 thus allow dispenser 100 to apply pressure to a portion of the package (not shown in FIGS. 14A-14C) disposed between surfaces 146 and 146, which may be a lower end or opening region 410 of the package. Spring loaded members 142, 144 can be configured to do so by providing them with a length such that, when flexed into an open position via contact with pins 134, 136, spring loaded members 142, 144 contact a surface, e.g., of rails 130, 132. Or, spring loaded members 142, 144 can have a spring constant large enough to stop flexing without contacting another surface.

As best shown in FIG. 14C, the dispenser 100 can be configured to flex the bottom junction spring-loaded member 142, 144 out of the path of the inner track to enable the corresponding pin 134, 136 to move upward from the lower common area into the inner track during upward motion of the opposing surfaces 602, 604 so that opposing surfaces 602, 604 can be used to clear product from opening region 410. The dispenser 100 can flex the bottom junction spring-loaded member 142, 144 out of the path of the inner track in any suitable manner, including by mechanically pulling bottom junction spring-loaded member 142, 148.

Figure 15:
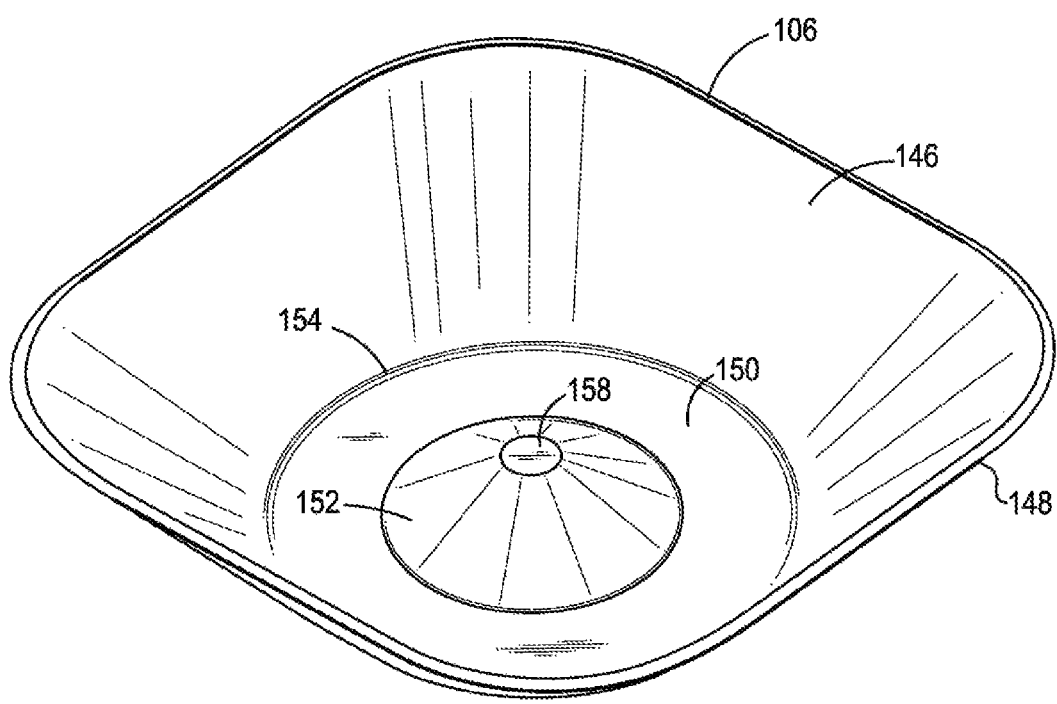
FIG. 15 is a perspective view of one embodiment of a serving receptacle.

Product is dispensed from flexible package 102 onto a dispensing surface, which may advantageously comprise a serving receptacle 106. In order to provide even, temperate heating to the food product in those embodiments wherein the same is contemplated, the serving receptacle 106 may be shaped to enhance the even distribution of the food product within the serving receptacle 106 and/or to increase the surface area of the food product that contacts the inner surface(s) of the serving receptacle 106. One embodiment of a serving receptacle 106 is shown in FIG. 15.

As shown, serving receptacle 106 includes side wall 146 having an upper edge 148, and base 150. A central protrusion 152 extends upward from base 150 and together with side wall 146 defines a channel 154. That is, channel 154 is the area between the protrusion 152 and the side wall 146. Protrusion 152 acts to direct food into the channel 154, and thus can prevent food deposited onto protrusion 152 and into the serving receptacle 106 from mounding in the center of the serving receptacle 106. Ultimately, protrusion 152 can result in a more even distribution of food across the base 150 of the serving receptacle 106.

Desirably, the uppermost surface 158 of protrusion 152 does not extend above the upper edge 148 of serving receptacle 106. In some embodiments, protrusion 152 is sized such that the food product deposited into serving receptacle 106 will cover substantially all of protrusion 152, including the uppermost surface 158 thereof. This may be desired or advantageous in those embodiments wherein heating of the food product dispensed into serving receptacle 106 is desired, not only to provide for more even and efficient heating of the food product, but also to prevent consumer contact with exposed heated areas of serving receptacle 106. For example, protrusion 152 may desirably be no more than 75% of the height of sidewall 146, or no more than 50% of the height of sidewall 146, or even no more than 30%, or 25% of the height of sidewall 146.

As with sidewall 146, protrusion 152 may desirably be comprised of heat conductive material, at least for that portion thereof expected to come into contact with food product. Protrusion 152 may also be comprised of both heat conductive and non-heat conductive materials, with non-heat conductive materials being used for an uppermost surface 158 of protrusion 152 if such uppermost surface 158 is not contemplated to be covered by the food product. In those embodiments wherein the protrusion 152 is, e.g., 50% or less of the height of the sidewall 146, protrusion 152 may desirably be comprised entirely of heat conductive material.

Heat conductivity may also be provided to those portions of serving receptacle wherein the same is desired via a coating comprising heat conductive material. Or, the entirety of serving receptacle 106 may comprise heat conductive material, and the portion thereof not expected to contact food product, or contemplated to be used for handling the serving receptacle 106 may be provided with a coating of a non-heat conductive material.

Heat conductive materials suitable for use in serving receptacle 106 include any that are suitable for contact with food.

Dispenser 100 may include a removable tray 107, within base 114, that accepts serving receptacle 106 and holds it in place to receive food product as it is dispensed by dispenser 100 and to be operably disposed relative to a heating mechanism provided in base 114. To do so, tray 107 may include an aperture sized and shaped to accept serving receptacle 106 in a contacting position with a heating mechanism provided in base 114. On example of such an embodiment is shown in FIG. 16.

Figure 16:
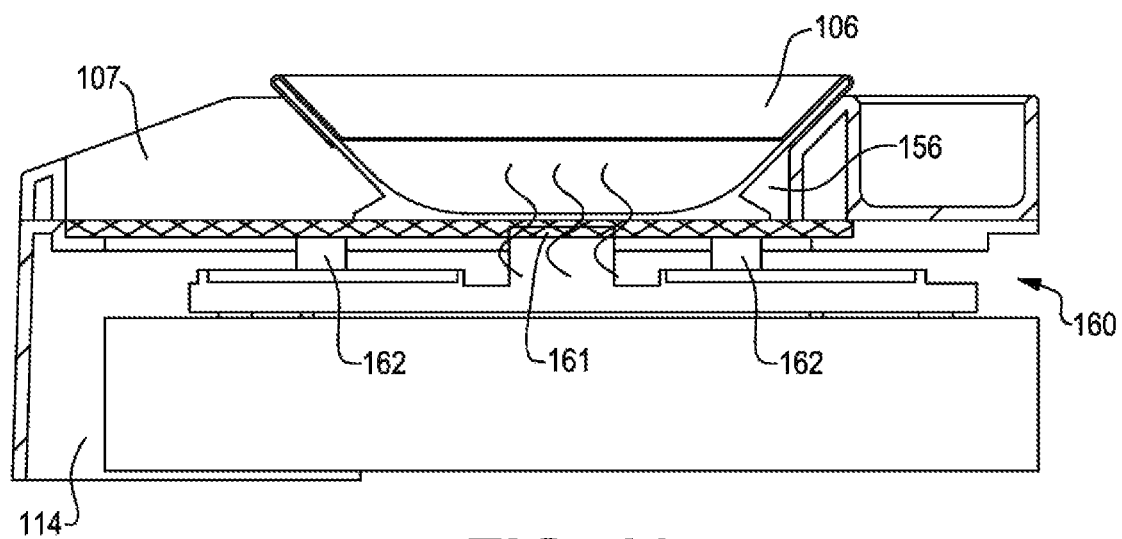
FIG. 16 is a cross-sectional view of the serving receptacle of FIG. 15, shown coupled with the heating mechanism of the dispenser of FIG. 1A.

As shown, in FIG. 16, serving receptacle 106 is seated within aperture 156 of tray 107. Aperture 156 is positioned and sized to allow heat transfer between heating element 160 within base 114 and serving receptacle 106.

Heating element 160 can be any element capable of emitting heat. In some embodiments, heating element 160 may have a heat emitting surface 161 that contacts the base 150 of serving receptacle 106 when serving receptacle 106 is positioned within the aperture 156 of tray 107. Any suitable type and arrangement of a heat source may be used for heating element 160.

For example, heating element 160 may comprise one or more electric heating coils, such as conventional electrical resistance heating wires or coils, arranged in a heat emitting path, such as a helical path, which can be interconnected in different ways to provide nominal power ratings to heating element 160, such that heating element 160 will attain a desired temperature when connected to an electrical source. Such heating coils may desirably be provided in heat emitting surface 161, as by casting heating coils within heat emitting surface 161, in those embodiments wherein heat emitting surface is e.g., aluminum. In such embodiments, heat tempered glass may cover a portion or all of heat emitting surface 161. Heating element 160 may desirably have a maximum power consumption of 1000-W or less.

Heat emitting surface 161 has terminal ends housed within posts 162 which protrude downward out of the heat emitting surface 161 for electrical connection with other components. Terminal ends 162 also provide space between heat emitting surface 161 and heating element 160 for ventilation within base 114 to help dissipate heat from the heating element 160 and the base 114. Any sources of electrical sparks or ignition included in heating element 160 are enclosed within base 114 in a manner that meets the relevant portions of the Underwriters Laboratory UL-823 and UL-674 specifications for hot plates and motors, respectively.

In some embodiments, heating element 160 may also be an inductive heating element. As is known in the art, inductive heating elements comprise a glass surface with a coil of copper wire beneath. The coil is charged with a current that oscillates between positive and negative repetitively, thereby creating an alternating electromagnetic field. Ferromagnetic material placed on an inducting heating element 160 will heat due to the alternating magnetic field created within the cookware, while the heating element itself will remain cool. In those embodiments wherein the heating element 160 is an inductive heating element, serving receptacle 106 may desirably comprise ferromagnetic material, or, a ferromagnetic interface may be placed within aperture 156 of tray 107 and in contact with heating element 160. Inductive heating elements 160 may be used in certain advantageous embodiments, where they impart the benefits of energy efficiency and heatless surfaces.

However powered, heating element 160 is configured to reach temperatures of up to 220° C., whereas the ambient temperature around the other components of the dispenser 100 should preferably be at a substantially lower temperature. And so, the remaining components of the dispenser 100, i.e., those housed within case 108, are desirably thermally isolated from the temperatures associated with the base 114 and heating element 160. Indeed, venting or other heat dissipation means may be provided in outer case 108 to provide venting to dissipate any heat that may be generated by the operation of dispenser 100.

Heating element 160 maybe provided with a temperature sensor and configured to respond thereto, and/or heating element 160 may be configured to communicate with a processor in communication with a sensor that provides a signal indicative of whether a food product is present within serving receptacle 106, and/or indicative of when the dispensing operation of the dispenser 100 has been completed.

The dispensing surface is desirably capable of rapid heating and cooling, and further desirably will be provided with one or more safety mechanisms precluding the dispensing surface from heating when a serving receptacle 106 is not disposed thereupon and/or ceasing heating and/or initiating cooling once the removal of the serving receptacle is detected.

And, although it is contemplated that mild heating of the product dispensed from package 102 by dispenser 100 will render the product more appealing and/or appetizing, it is also recognized that not all intended consumers may consume the product in an amount of time that precludes microbiological growth in the product, as may be particularly inclined to happen in those embodiments wherein the product is heated. And so, in such embodiments, one or more indicators of heat and or time may be provided in conjunction with the serving receptacle or dispenser 100.

For example, serving receptacle 106 may be comprised of material that changes color with temperature or be provided with separate temperature indicator so that a user may be advised when the serving receptacle 106 and product therein have reached a certain temperature. Or, dispenser 100 may be provided with a sensor that detects when a heated serving receptacle has been removed from the dispensing surface. Such a sensor may be in communication with a timer, processor and/or communication device to provide an indication of the amount of time that has elapsed since the serving receptacle has been removed. Audible cues may also be provided notifying a user than unconsumed product should be appropriately handled or stored after a certain amount of time or when a certain temperature is reached.

Figure 17A:
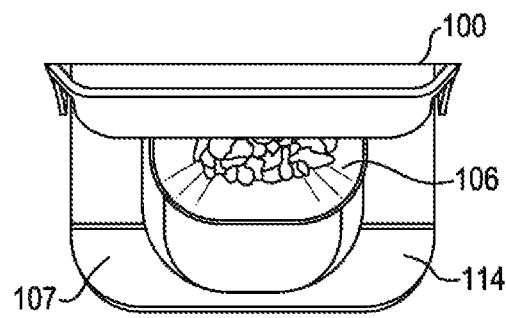
FIGS. 17A, 17B and 17C are top and side views of the dispenser of FIG. 1A, showing the tray extending outward after the product has been dispensed into the serving receptacle to be accessible to a pet.
Figure 17B:
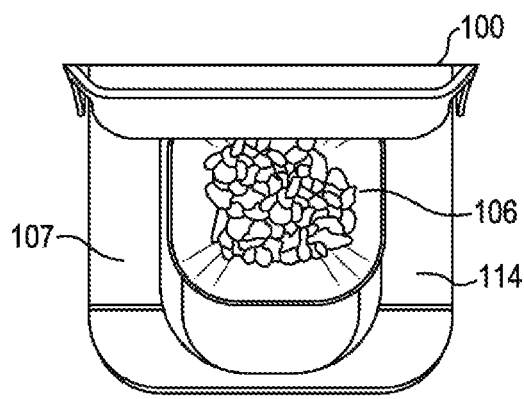
Figure 17C:
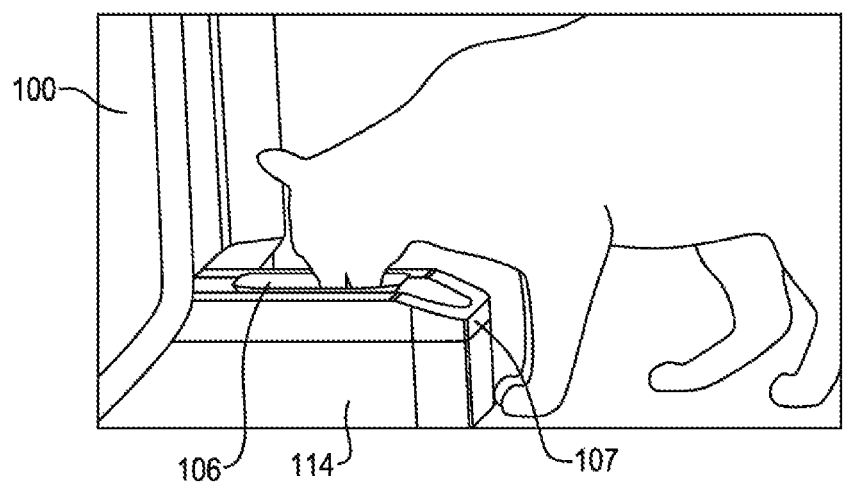

In some embodiments, base 114 of dispenser 100 is moveable, and slides from a first, dispensing position to a second, feeding position. Such functionality enhances the safety of the device and the serving receptacle 106 may be generally inaccessible when in the dispensing position, i.e., when at least a portion of serving receptacle 106 is intersected by vertical plane of the package 102 during dispensing. FIGS. 17A-17C illustrate this function of the dispenser 100. As shown in FIG. 17A, the food product has been dispensed into serving receptacle 106, optionally heated, and base 114 has begun to move or slide outward. FIG. 17B shows the base 114, including serving receptacle moved further outward, and FIG. 17C shows base 114 and serving receptacle 106 in a serving position.

Dispenser 100 can incorporate a timer and processing unit operably disposed relative thereto to initiate and stop heating, to initiate outward motion of base 114, or even to initiate withdrawal of base 114 back into a dispensing position. Such an embodiment can be used to address any potential food safety concerns, i.e., by withdrawing the base 114 and serving receptacle 106 after a certain period of time after which bacterial or microbial growth may be expected to occur, into a dispensing position. When in the dispensing position, serving receptacle 106 and any food therein are not readily accessible from a position in front of the dispenser 100.

The operation of dispenser 100, from the insertion of a flexible package into opening 104 until base 114 reaches a serving position occurs efficiently, and without manual manipulation of a pet owner after insertion of the package. Desirably, the entire operation from insertion to serving takes less than about 10 minutes, or less than about 8 minutes, or less than 6 minutes, or less than 4 minutes. Each step of the operation, i.e., positioning of the package, clearance of product from an opening region, opening of the package, dispensing of product, heating of product and presentation of heated food via sliding base 114 may be controlled by one or more sensors, including sensor 612. Further, the progress of operation can be indicated by status indicator 112, or any other suitable status indicator.

Figure 18A:
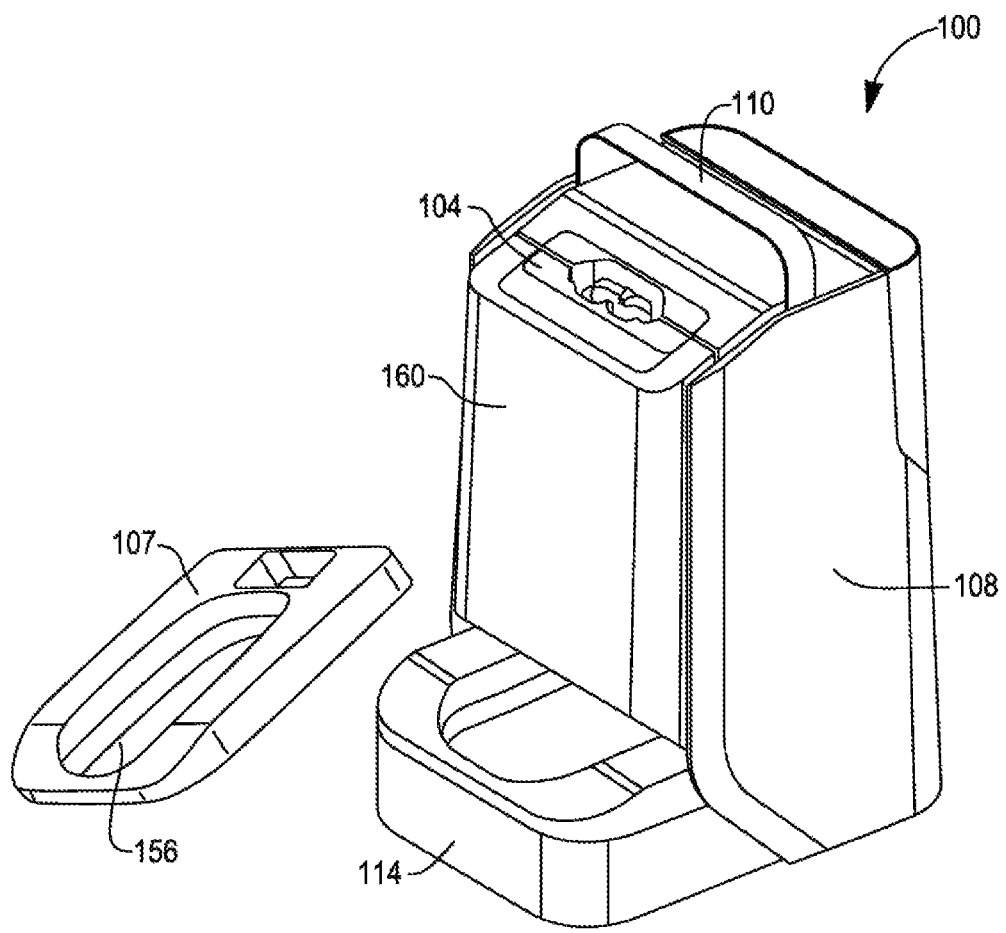
FIGS. 18A, 18B and 18C are perspective (18A and 18B) and cross-sectional (18C) views of the dispenser of FIG. 1A, showing the tray being removed therefrom, the outer case opened, and the release of the package from the dispenser after dispensing, respectively.
Figure 18B:
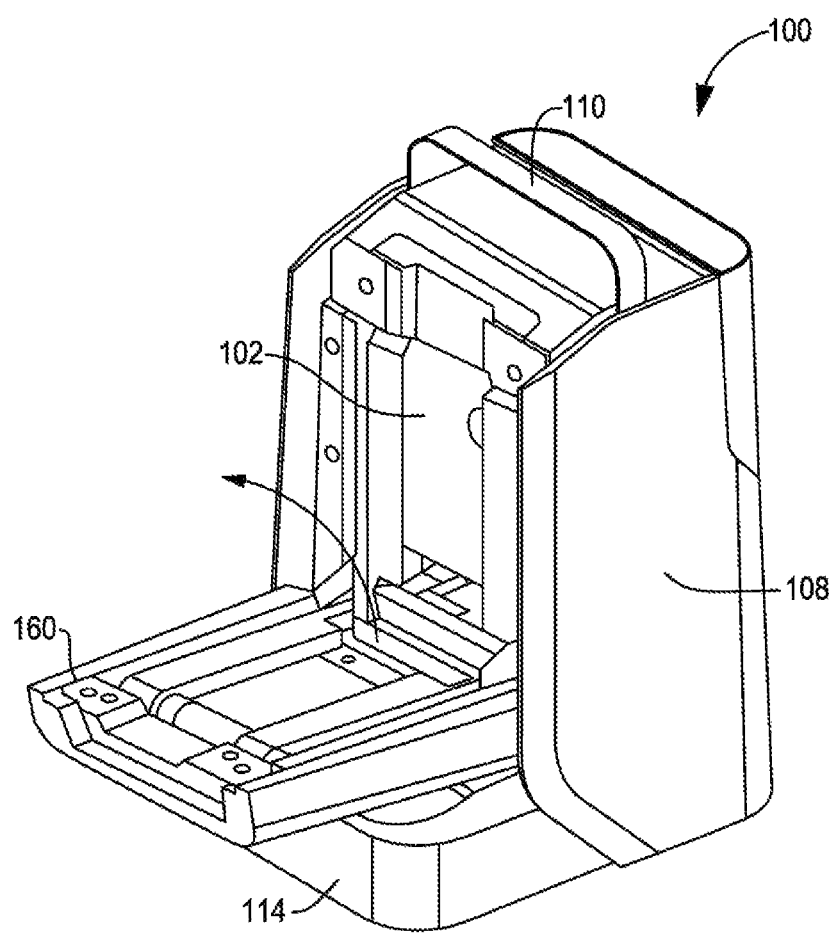
Figure 18C:
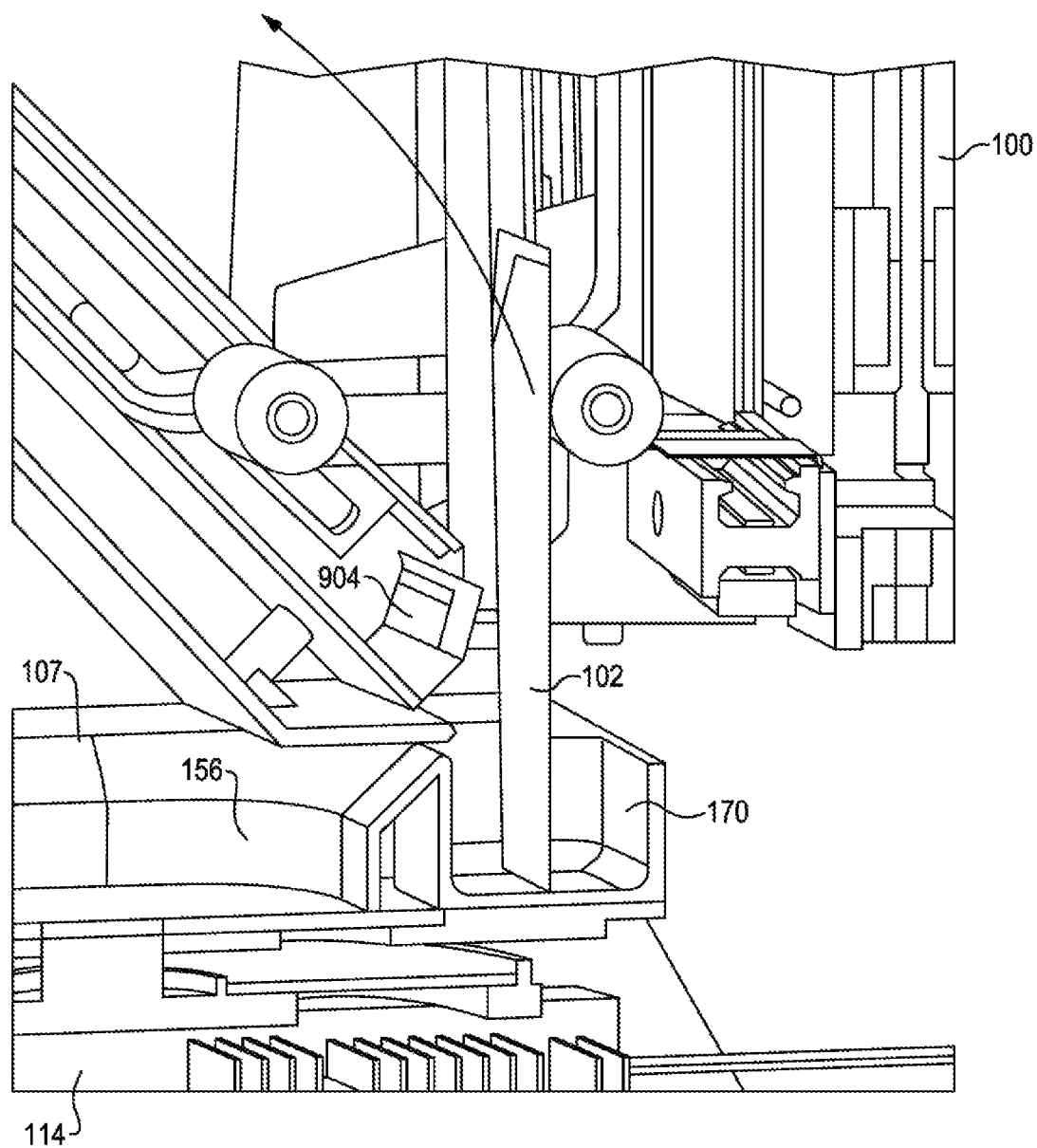
Figure 19:
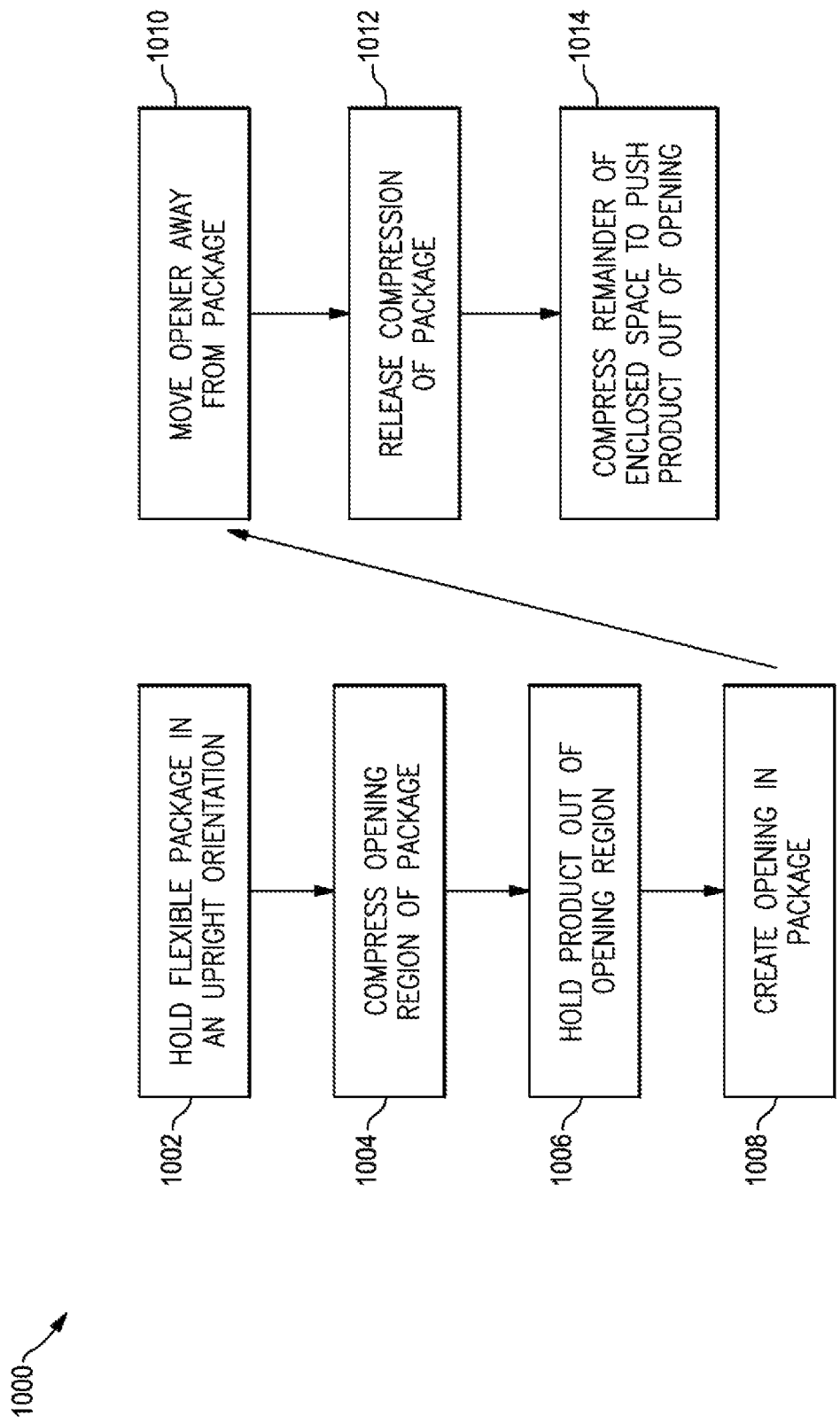
FIG. 19 is a flow chart of one embodiment of a method of dispensing product form a flexible package using the dispenser of FIG. 1A.

Outer case 108 of dispenser 100 can be opened to access the interior chamber of the dispenser 100 for periodic cleaning, if desired or required, and/or to remove emptied packages 102. Such an operation is shown in FIGS. 18A-18C. As shown in FIG. 18A, lever 110 is rotated to its open position, thereby allowing access to front panel 160, which is hingedly connected to outer case 108 at a lower edge thereof. Tray 107 is removed from base 114, which provides clearance for front panel 160 to be lowered without impinging on tray 107, thereby providing access into the internal chamber of dispenser 100 and emptied package 102 as shown in FIG. 18B. As shown in FIG. 18C, the opening of front panel 160 also releases package 102 and package 102 falls into package receptacle 170. A consumer may also access catch tray 902 to access cut-off portion 904 with front panel 160 lowered to this position.

FIG. 20 is a flow chart of an example method 1000 for dispensing product from a flexible package 102 using the dispenser 100. To dispense product from the package 102, the dispenser 100 can hold the package 102 in an upright orientation (block 1002). Prior to opening the package 102, the dispenser 100 can compress an opening region 310 of the package 102 to push product in the opening region 310 into other regions of the enclosed space 202 of the package 102 (block 1004). Compressing the opening region 310 can include rolling two rollers 306, 308 upward from a lower edge of the enclosed space 202 to push product in the enclosed space 202 upwards. To keep product out of the opening region 310, the dispenser 100 can hold the rollers 306, 308 together after rolling across the opening region 310, or hold compression on the opening region 310 while an opening is being created (block 1006). The dispenser 100 can then create an opening in the package 102 (block 1008). The dispenser 100 can create an opening in the package 102 by cutting off a lower portion of the package 102 above a lower edge of the enclosed space 202.

Once the opening is created, the dispenser 100 can move the opener 301 away from the package 102 (block 1010) and then release the compression on the package 102/opening region 310 to allow product to fall out of the opening onto a serving bowl 106 (block 1012). For viscous products, at least a portion of the product will likely remain in the package 102 after the compression has been released. The dispenser 100, therefore, can compress the remainder of the enclosed space 202 to push the product out of the opening and onto the serving bowl 106 (block 1014). The dispenser 100 can compress the remainder of the enclosed space 202 by rolling the rollers 306, 308 downwards from an upper edge of the enclosed space 202 towards the opening to push product in the enclosed space 202 out of the opening.

Advantageously, the methods and dispenser 100 described herein can be used with packages in which the primary or sole intended use of the package is for operation on and use by the dispenser 100, as well as conventional packages that are designed for uses other than by the dispenser 100 (e.g., designed for hand opening and dispensing). In particular, the acts of squeezing product out of the opening region 310 and cutting-off the lower portion of the package 102 to create the opening can be used on virtually any package that has a generally planar geometry, including many of commonly used pouches.

It is to be understood that while certain forms of the presently disclosed dispensing devices and methods have been illustrated and described herein, it is not to be limited to the specific forms or arrangement of parts described and shown. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The invention claimed is:

1. A dispensing device comprising:
    an opening defining an insertion path extending through an internal chamber thereof;
    two fragmentation rollers aligned with each other within the internal chamber, and with the insertion path extending therebetween;
    a sensor configured to sense a package within the insertion path;
    a first securing device having opposing surfaces configured to secure the package within the insertion path;
    a second securing device having opposing surfaces configured to secure the package within the insertion path;
    a cam operatively connecting the first and second securing devices; and
    an opener configured to provide an opening in the package to allow the product to leave the package.

2. The dispensing device of claim 1, further comprising a stop moveable between a first position within the insertion path and a second position out of the insertion path.

3. The dispensing device of claim 2, wherein the sensor comprises a light sensor, wherein the stop is configured to move between the first and second positions in response to communication generated by the sensor, wherein the dispensing device further comprises a light emitter disposed such that light projects from the emitter, across the insertion path, and is received by the sensor.

4. The dispensing device of claim 1, wherein the cam is configured to operate the first and second securing devices in response to a signal from the sensor.

5. The dispensing device of claim 1, wherein the first and second securing devices are configured to move the package within the insertion path.

6. The dispensing device of claim 1, wherein the insertion path is downward, and wherein the first and second securing devices are configured to clamp the package at longitudinal sides.

7. The dispensing device of claim 1, wherein each of the fragmentation rollers comprises projections that extend radially from an axis thereof.

8. The dispensing device of claim 7, wherein the projections of the fragmentation rollers are at least one of misaligned or star shaped.

9. The dispensing device of claim 1, wherein the fragmentation rollers are caused to rotate and drive the package into the insertion path.

10. The dispensing device of claim 1, wherein the opener comprises a safety mechanism in communication with the sensor.

11. The dispensing device of claim 1, wherein the first securing device comprises a first clamp and wherein the second securing device comprises a second clamp.

12. The dispensing device of claim 11, further comprising a lever mechanically coupled to the first and second clamps, wherein the first and second clamps are configured to engage first and second longitudinal seals of the flexible package.

13. The dispensing device of claim 12, further comprising a pair of rollers configured to progressively compress the package, with the progressive compression occurring in an area between the first and second clamps.

14. A method of dispensing a product from a flexible package, comprising:
    inserting a package into an insertion path within an internal chamber of a dispensing device;
    fragmenting, by two fragmentation rollers aligned with each other within the internal chamber, the product in the package;
    sensing, by a sensor in the dispensing device, the package within the insertion path;
    clamping, with first and second securing devices operatively connected by a cam, a first and second edge of the package;
    opening the package; and
    removing the product from the package.

15. The method of claim 14, further comprising stopping movement of the package along the insertion path, by a stop moveable between a first position within the insertion path and a second position out of the insertion path.

16. The method of claim 15, wherein the sensor comprises a light sensor, further comprising moving the stop between the first and second positions in response to communication generated by the sensor, wherein the sensor senses light emitted by a light emitter disposed across the insertion path.

17. The method of claim 14, further comprising operating the first and second securing devices with the cam in response to a signal from the sensor; moving the package within the insertion path with the first and second securing devices, and clamping the package at longitudinal sides within the first and second securing devices, wherein the insertion path is downward.

18. The method of claim 14, wherein each of the fragmentation rollers comprises projections that extend radially from an axis thereof.

19. The method of claim 18, wherein the projections of the fragmentation rollers are at least one of misaligned or star shaped.

20. The method of claim 19, further comprising causing the fragmentation rollers to rotate and drive the package into the insertion path.

21. The method of claim 14, wherein the first securing device comprises a first clamp and the second securing device comprises a second clamp.

22. The method of claim 21, further comprising clamping the package between the first and second clamps by operation of a lever, and engaging first and second longitudinal seals of the flexible package with the first and second clamps.

23. The method of claim 22, further comprising progressively compressing the package with a pair of rollers, with the progressive compression occurring in an area between the first and second clamps.

* * * * *